US010623455B2

(12) United States Patent
Hinohara et al.

(10) Patent No.: US 10,623,455 B2
(45) Date of Patent: Apr. 14, 2020

(54) MANAGEMENT SYSTEM, TRANSMISSION SYSTEM, MANAGEMENT METHOD, AND COMPUTER-READABLE RECORDING MEDIUM

(71) Applicants: Hiroshi Hinohara, Kanagawa (JP); Naoki Umehara, Kanagawa (JP); Yuya Akimoto, Tokyo (JP)

(72) Inventors: Hiroshi Hinohara, Kanagawa (JP); Naoki Umehara, Kanagawa (JP); Yuya Akimoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 600 days.

(21) Appl. No.: 15/016,902

(22) Filed: Feb. 5, 2016

(65) Prior Publication Data

US 2016/0156684 A1 Jun. 2, 2016

Related U.S. Application Data

(63) Continuation of application No. PCT/JP2014/068503, filed on Jul. 10, 2014.

(30) Foreign Application Priority Data

Aug. 9, 2013 (JP) ................. 2013-166943

(51) Int. Cl.
*H04L 29/06* (2006.01)
*H04N 7/15* (2006.01)
*H04N 7/14* (2006.01)

(52) U.S. Cl.
CPC ........... *H04L 65/403* (2013.01); *H04N 7/147* (2013.01); *H04N 7/15* (2013.01)

(58) Field of Classification Search
None
See application file for complete search history.

(56) References Cited

U.S. PATENT DOCUMENTS 7,155,722 B1 * 12/2006 Hilla .................. G06F 9/505
718/105
8,582,504 B2 11/2013 Umehara et al.
(Continued)

FOREIGN PATENT DOCUMENTS

CN 102196238 A 9/2011
CN 102970511 A 3/2013
(Continued)

OTHER PUBLICATIONS

Extended European Search Report dated Jul. 26, 2016 in Patent Application No. 14834213.2.
(Continued)

*Primary Examiner* — Kevin T Bates
*Assistant Examiner* — Dae Kim
(74) *Attorney, Agent, or Firm* — Oblon, McClelland, Maier & Neustadt, L.L.P.

(57) ABSTRACT

A management system includes a transmission/reception unit configured to receive transmission terminal identification information of a plurality of transmission terminals used for transmitting/receiving content data, a relay device extracting unit configured to specify relay device identification information of a relay device that can be used to be common to the plurality of transmission terminals among the relay device identification information managed by a relay device selection managing unit based on the received transmission terminal identification information, and a selection unit configured to select a relay device based on relay device identification information for which acceptability/unacceptability information managed by the relay device managing unit represents being acceptable among specified relay device identification information as a relay device relaying transmission/reception of the content data.

11 Claims, 36 Drawing Sheets

(56) References Cited

U.S. PATENT DOCUMENTS

| | | | |
|---|---|---|---|
| 9,401,945 B2 | 7/2016 | Kato et al. | |
| 2009/0293016 A1* | 11/2009 | Potevin | H04M 1/72569 |
| | | | 715/810 |
| 2010/0165889 A1* | 7/2010 | Madabhushi | H04M 3/2227 |
| | | | 370/261 |
| 2011/0216699 A1 | 9/2011 | Umehara et al. | |
| 2012/0002003 A1* | 1/2012 | Okita | H04L 12/1827 |
| | | | 348/14.11 |
| 2012/0069987 A1* | 3/2012 | Fan | H04M 3/5183 |
| | | | 379/266.01 |
| 2012/0278379 A1* | 11/2012 | Hu | H04L 45/12 |
| | | | 709/201 |
| 2012/0314019 A1 | 12/2012 | Asai | |
| 2013/0060926 A1 | 3/2013 | Kato et al. | |
| 2013/0117373 A1 | 5/2013 | Umehara | |
| 2013/0222528 A1 | 8/2013 | Hinohara et al. | |
| 2014/0029518 A1 | 1/2014 | Umehara et al. | |
| 2014/0129641 A1 | 5/2014 | Umehara | |
| 2014/0240770 A1 | 8/2014 | Hinohara et al. | |
| 2014/0269333 A1* | 9/2014 | Boerjesson | H04L 45/123 |
| | | | 370/238 |
| 2015/0009281 A1 | 1/2015 | Okita et al. | |
| 2015/0256998 A1 | 9/2015 | Umehara | |

FOREIGN PATENT DOCUMENTS

| | | |
|---|---|---|
| EP | 2 363 994 A1 | 9/2011 |
| JP | 2008-227577 | 9/2008 |
| JP | 2012-044623 | 3/2012 |
| JP | 2012-050063 | 3/2012 |
| JP | 2013-055403 | 3/2013 |
| WO | WO 2011/078411 A1 | 6/2011 |

OTHER PUBLICATIONS

Combined Chinese Office Action and Search Report dated Jan. 29, 2018 in Chinese Patent Application No. 201480044371.8 (with English language translation) citing documents AO and AP therein, 24 pages.

International Search Report dated Sep. 16, 2014 in PCT/JP2014/068503 filed Jul. 10, 2014 (with English translation).

Written Opinion dated Sep. 16, 2014 in PCT/JP2014/068503 filed Jul. 10, 2014.

* cited by examiner

CHANGE QUALITY MANAGEMENT TABLE

| IP ADDRESS OF RELAY DESTINATION TERMINAL | IMAGE QUALITY OF RELAYED IMAGE DATA (QUALITY OF IMAGE QUALITY) |
|---|---|
| 1.3.2.4 | HIGH IMAGE QUALITY |
| 1.3.1.3 | LOW IMAGE QUALITY |
| 1.3.2.3 | MEDIUM IMAGE QUALITY |
| ... | ... |

LOW RESOLUTION
(a)

MEDIUM RESOLUTION
(b)

HIGH RESOLUTION
(c)

FIG.9

RELAY DEVICE MANAGEMENT TABLE

| RELAY DEVICE ID | ACCEPTABILITY/ UNACCEPT- ABILITY | OPERATION STATE | RECEPTION DATE AND TIME | IP ADDRESS OF RELAY DEVICE | MAXIMUM DATA TRANSMISSION SPEED (Mbps) |
|---|---|---|---|---|---|
| 111a1 | ACCEPTABLE | ONLINE | 2009.11.10.13:00 | 1.2.1.2 | 100 |
| 111a2 | ACCEPTABLE | ONLINE | 2009.11.10.13:00 | 1.2.1.6 | 100 |
| 111b1 | ACCEPTABLE | ONLINE | 2009.11.10.13:10 | 1.2.2.2 | 1000 |
| 111b2 | UNACCEPTABLE | ONLINE | 2009.11.10.13:10 | 1.2.2.6 | 1000 |
| 111c1 | UNACCEPTABLE | OFFLINE | 2009.11.10.13:20 | 1.3.1.2 | 100 |
| 111c2 | UNACCEPTABLE | OFFLINE | 2009.11.10.13:20 | 1.3.1.6 | 100 |
| 111d1 | ACCEPTABLE | ONLINE | 2009.11.10.13:30 | 1.3.2.2 | 10 |
| 111d2 | ACCEPTABLE | ONLINE | 2009.11.10.13:30 | 1.3.2.6 | 10 |
| 111e1 | UNACCEPTABLE | ONLINE | 2009.11.10.13:30 | 1.1.1.3 | 1000 |
| 111e2 | ACCEPTABLE | ONLINE | 2009.11.10.13:30 | 1.1.1.4 | 1000 |

FIG.10

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 11

TERMINAL MANAGEMENT TABLE

| TERMINAL ID | DESTINATION NAME | OPERATION STATE | COMMUNICA-TION STATE | RECEPTION DATE AND TIME | IP ADDRESS OF TERMINAL |
|---|---|---|---|---|---|
| 01aa | JAPAN TOKYO OFFICE TERMINAL AA | ONLINE | None | 2009.11.10.13:40 | 1.2.1.3 |
| 01ab | JAPAN TOKYO OFFICE TERMINAL AB | OFFLINE | | 2009.11.09.12:00 | 1.2.1.4 |
| ... | ... | ... | ... | ... | ... |
| 01ba | JAPAN OSAKA OFFICE TERMINAL BA | ONLINE | Calling | 2009.11.10.13:45 | 1.2.2.3 |
| 01bb | JAPAN OSAKA OFFICE TERMINAL BB | ONLINE | None | 2009.11.10.13:50 | 1.2.2.4 |
| ... | ... | ... | ... | ... | ... |
| 01ca | U.S. NEW YORK OFFICE TERMINAL CA | OFFLINE | | 2009.11.10.12:45 | 1.3.1.3 |
| 01cb | U.S. NEW YORK OFFICE TERMINAL CB | ONLINE | None | 2009.11.10.13:55 | 1.3.1.4 |
| ... | ... | ... | ... | ... | ... |
| 01da | U.S. WASHINGTON OFFICE TERMINAL DA | ONLINE | Busy | 2009.11.08.12:45 | 1.3.2.3 |
| 01db | U.S. WASHINGTON OFFICE TERMINAL DB | ONLINE | None | 2009.11.10.12:45 | 1.3.2.4 |
| ... | ... | ... | ... | ... | ... |

FIG.12

DESTINATION LIST MANAGEMENT TABLE

| REQUEST SOURCE TERMINAL ID | DESTINATION TERMINAL ID |
|---|---|
| 01aa | 01ab,···,01ba,01bb,···,01ca,01cb···,01da,01db,··· |
| 01ab | 01aa,01ca,01cb |
| 01ba | 01aa,01ab,01ca,01cb,01da,01db |
| ... | ... |
| 01db | 01aa,01ab,01ba,···,01da,01ca,01cb···,01da |
| ... | ... |

FIG.13

SESSION MANAGEMENT TABLE

| SESSION ID | RELAY DEVICE ID | REQUEST SOURCE TERMINAL ID | DESTINATION TERMINAL ID | DELAY TIME (ms) | DELAY INFORMATION RECEPTION DATE AND TIME |
|---|---|---|---|---|---|
| se1 | 111a1 | 01aa | 01bb,01cb,01db | 200 | 2009.11.10.14:00 |
| se2 | 111b2 | 01ba | 01ca | 50 | 2009.11.10.14:10 |
| se3 | 111d2 | 01bb | 01da | 400 | 2009.11.10.14:20 |
| ... | ... | ... | ... | ... | ... |

FIG.14

QUALITY MANAGEMENT TABLE

| DELAY TIME (ms) | IMAGE QUALITY OF IMAGE DATA (QUALITY OF IMAGE) |
|---|---|
| 0 TO 100 | HIGH IMAGE QUALITY |
| 100 TO 300 | MEDIUM IMAGE QUALITY |
| 300 TO 500 | LOW IMAGE QUALITY |
| 500 TO | (STOP) |

FIG.15

RELAY DEVICE SELECTION MANAGEMENT TABLE

| TERMINAL ID | RELAY DEVICE ID |
|---|---|
| 01aa | 111a1 |
| 01aa | 111a2 |
| 01aa | 111e1 |
| 01aa | 111e2 |
| 01ab | 111a1 |
| 01ab | 111a2 |
| 01ab | 111e1 |
| 01ab | 111e2 |
| ... | ... |
| 01ba | 111b1 |
| 01ba | 111b2 |
| 01ba | 111e1 |
| 01ba | 111e2 |
| 01bb | 111b1 |
| 01bb | 111b2 |
| 01bb | 111e1 |
| 01bb | 111e2 |
| ... | ... |
| 01ca | 111c1 |
| 01ca | 111c2 |
| 01ca | 111e1 |
| 01ca | 111e2 |
| 01cb | 111c1 |
| 01cb | 111c2 |
| 01cb | 111e1 |
| 01cb | 111e2 |
| ... | ... |
| 01da | 111d1 |
| 01da | 111d2 |
| 01da | 111e1 |
| 01da | 111e2 |
| 01db | 111d1 |
| 01db | 111d2 |
| 01db | 111e1 |
| 01db | 111e2 |
| ... | ... |

FIG.16

STATE CHANGE MANAGEMENT TABLE

| CHANGE REQUEST INFORMATION | BEFORE-CHANGE STATE INFORMATION | CHANGE INFORMATION |
|---|---|---|
| Call | None | Accepted |
| Join | Accepted | Busy |
| Leave | Busy | None |

FIG.17

STATE CHANGE MANAGEMENT TABLE

| CHANGE REQUEST INFORMATION | TERMINAL INFORMATION | BEFORE-CHANGE STATE INFORMATION | CHANGE INFORMATION |
|---|---|---|---|
| Invite | REQUEST SOURCE | None | Calling |
| | DESTINATION | None | Ringing |
| | OWN TERMINAL SELECTION | None | Accepted |
| Accept | REQUEST SOURCE | Calling | Accepted |
| | | Accepted | Accepted |
| | DESTINATION | Ringing | Accepted |
| Cancel | REQUEST SOURCE | Accepted | Accepted |
| | | Calling | None |
| | DESTINATION | Ringing | None |

FIG.18

STATE CHANGE MANAGEMENT TABLE

| CHANGE REQUEST INFORMATION | TERMINAL INFORMATION | DETERMINATION INFORMATION | BEFORE-CHANGE STATE INFORMATION | CHANGE INFORMATION |
|---|---|---|---|---|
| Reject | REQUEST SOURCE | PART | Calling | Calling |
| | | ALL | Calling | None |
| | | PART | Accepted | Accepted |
| | DESTINATION | | Ringing | None |

FIG.22

MANAGEMENT SYSTEM, TRANSMISSION SYSTEM, MANAGEMENT METHOD, AND COMPUTER-READABLE RECORDING MEDIUM

CROSS-REFERENCE TO RELATED APPLICATIONS

This application is a continuation of PCT international Application Ser. No. PCT/JP2014/068503 filed on Jul. 10, 2014 which claims priority to Japanese Patent Application No. 2013-166943 filed in Japan on Aug. 9, 2013, which designates the United States; the entire contents of which are incorporated herein by reference.

BACKGROUND OF THE INVENTION

1. Field of the Invention

The present invention relates to a management system, a program, a transmission system, a management method, and a storage medium.

2. Description of the Related Art

In recent years, transmission systems realizing communications with a remote place to be like actual face-to-face communications such as a conference system executing a remote conference through a network such as the Internet are widely used.

For example, in a conference system, a terminal used by a participant of one side of a remote conference captures an image of the participant and collects an audio such as a remark of the participant and transmits the image and the remark to a terminal used by a participant of the other side of the remote conference through a relay device. Then, the terminal used by the participant of the other side receives the image and the audio through the relay device and outputs the audio together with displaying the image, whereby the remote conference is realized.

For example, in Japanese Patent Application Laid-open No. 2008-227577, a technology has been disclosed which improves the qualities of the video and the audio of a television conference by performing a conference with an optimal distributed television conference server among a plurality of distributed television conference servers relaying videos, audios, and the like being assigned thereto based on addresses of television conference terminals used for the conference.

However, in the conventional technology as described above, since a situation in which a relay device is not used for a conference cannot be intentionally formed, in a case where a maintenance operation of the relay device is executed, there is a certain influence on the conference that is currently held such as ending a conference that is performed using the relay device.

Therefore, there is a need to provide a management system, a transmission system, a management method, and a computer-readable recording medium capable of forming a situation in which a relay device is not used for a conference.

SUMMARY OF THE INVENTION

It is an object of the present invention to at least partially solve the problems in the conventional technology.

According to an embodiment, there is provided a management system that includes a relay device selection managing unit configured to manage transmission terminal identification information for identifying a transmission terminal and relay device identification information for identifying a relay device that is available for the transmission terminal in association with each other; a relay device managing unit configured to manage the relay device identification information of the relay device and acceptability/unacceptability information representing acceptability/unacceptability of a new session of the relay device in association with each other; a reception unit configured to receive the transmission terminal identification information for identifying a plurality of transmission terminals used for transmitting/receiving content data; a relay device specifying unit configured to specify relay device identification information of a relay device that is commonly available for the plurality of transmission terminals among the relay device identification information managed by the relay device selection managing unit, based on the received transmission terminal identification information; and a selection unit configured to select, as a relay device relaying transmission/reception of the content data, a relay device based on relay device identification information for which the acceptability/unacceptability information managed by the relay device managing unit represents being acceptable among the specified relay device identification information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a conceptual diagram that illustrates a relay device management table;

FIG. 10 is a conceptual diagram that illustrates a terminal authentication management table;

FIG. 11 is a conceptual diagram that illustrates a terminal management table;

FIG. 12 is a conceptual diagram that illustrates a destination list management table;

FIG. 13 is a conceptual diagram that illustrates a session management table;

FIG. 14 is a conceptual diagram that illustrates a quality management table;

FIG. 15 is a conceptual diagram that illustrates a relay device selection management table.

FIG. 16 is a conceptual diagram that illustrates a state change management table;

FIG. 17 is a conceptual diagram that illustrates a state change management table;

FIG. 18 is a conceptual diagram that illustrates a state change management table;

FIG. 22 is a conceptual diagram that illustrates a destination list according to this embodiment;

DETAILED DESCRIPTION OF THE PREFERRED EMBODIMENTS

Overall Configuration of Embodiment

Figure 1:
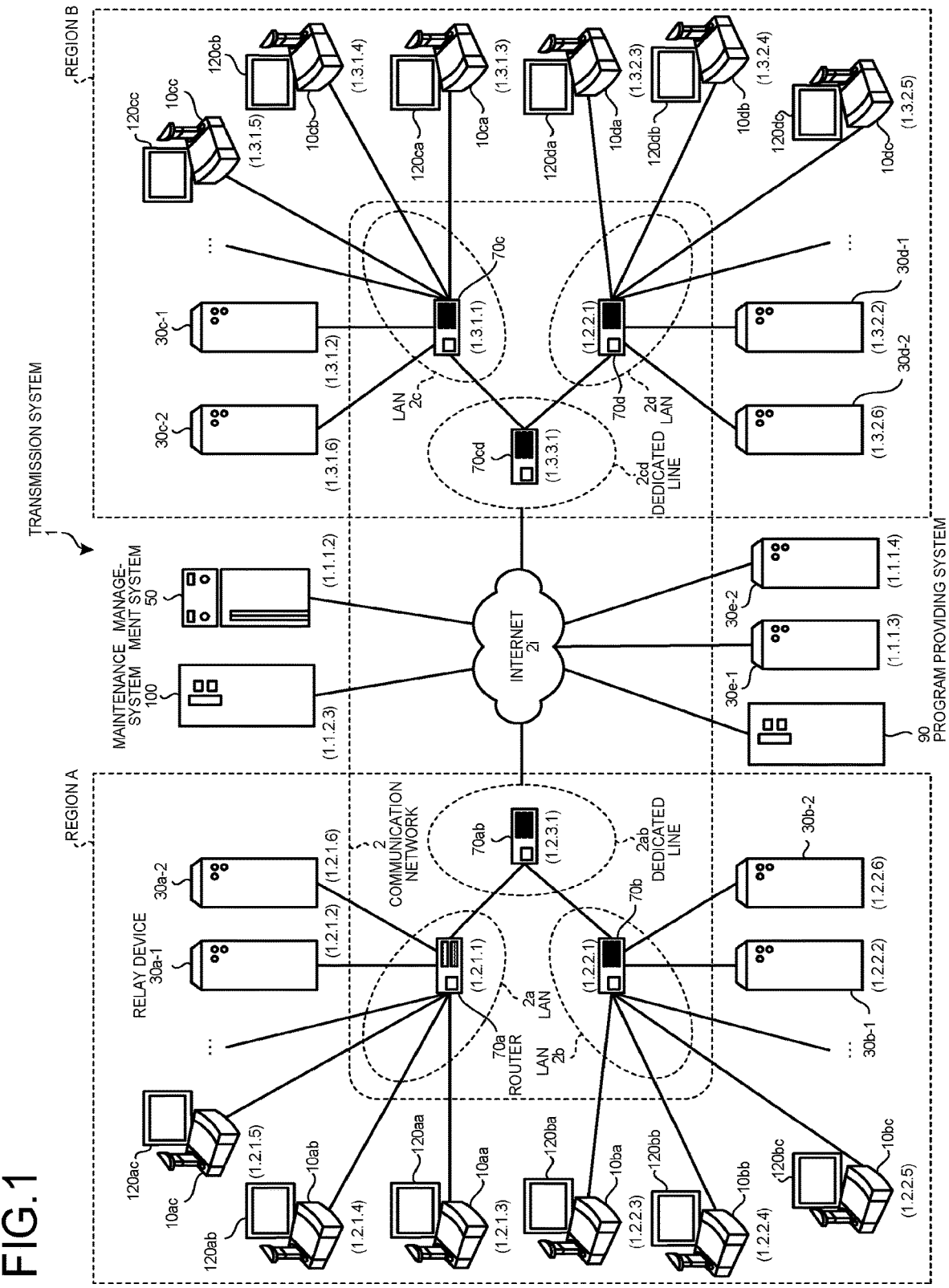
FIG. 1 is a schematic diagram of a transmission system according to an embodiment.

Hereinafter, an embodiment of the present invention will be described with reference to FIGS. 1 to 41. FIG. 1 is a schematic diagram of a transmission system 1 according to an embodiment of the present invention. First, an overview of this embodiment will be described with reference to FIG. 1.

The transmission system includes a data providing system that unidirectionally transmits content data from a transmission terminal of one side to a transmission terminal of the other side through a transmission management system and a communication system that delivers information, feelings, and the like among a plurality of transmission terminals through a transmission management system. This communication system is a system used for delivering information, feelings, and the like among a plurality of communication terminals (corresponding to "transmission terminals") through a communication management system (corresponding to a "transmission management system"), and examples thereof include a television conference system, a video phone system, an audio conference system, an audio phone system, a PC (personal computer) screen sharing system, and the like.

In this embodiment, a television conference system as an example of the communication system, a television conference management system as an example of the communication management system, and a television conference terminal as an example of the communication terminal will be assumed, and the transmission system, the transmission management system, and the transmission terminal will be described. In other words, the transmission terminal and the transmission management system according to the present invention are applied not only to the television conference system but also to the communication system or the transmission system.

The transmission system 1 illustrated in FIG. 1 is built by: a plurality of transmission terminals (10aa, 10ab, ...); displays (120aa, 120ab, ...) used for the transmission terminals (10aa, 10ab, ...); a plurality of relay devices (30a-1, 30a-2, 30b-1, 30b-2, 30c-1, 30c-2, 30d-1, 30d-2, 30e-1, and 30e-2); a transmission management system 50; a program providing system 90; and a maintenance system 100.

In this embodiment, in a case where an arbitrary transmission terminal among the transmission terminals (10aa, 10ab, ...) is to be represented, a "transmission terminal 10" will be used, in a case where an arbitrary display among the displays (120aa, 120ab, ...) is to be represented, a "display 120" will be used, and, in a case where an arbitrary relay device among the relay devices (30a-1, 30a-2, 30b-1, 30b-2, 30c-1, 30c-2, 30d-1, 30d-2, 30e-1, and 30e-2) is to be represented, a "relay device 30" will be used.

The transmission terminal 10 transmits/receives image data and audio data as examples of content data. Hereinafter, "transmission terminal" will be simply represented as "terminal", and "transmission management system" will be simply represented as "management system". A telephone call according to this embodiment includes not only transmission/reception of audio data but also transmission/reception of image data. In other words, the terminal 10 according to this embodiment transmits/receives image data and audio data. However, the terminal 10 may be configured to transmit/receive audio data without transmitting/receiving image data.

In this embodiment, while a case will be described in which an image of the image data is a moving image, the image may be a still image instead of a moving image. The image of the image data may include both a moving image and a still image. The relay device 30 relays image data and audio data among a plurality of terminals 10. The management system 50 integrally manages the terminals 10 and the relay devices 30.

A plurality of routers (70a, 70b, 70c, 70d, 70ab, and 70cd) illustrated in FIG. 1 select an optimal route of image data and audio data. In this embodiment, in a case where an arbitrary router among the routers (70a, 70b, 70c, 70d, 70ab, and 70cd) is to be represented, a "router 70" will be used.

The program providing system 90 includes a hard disk (HD), in which a terminal program used for realizing various functions or various means in the terminal 10 is stored, not illustrated in the drawing and can transmit the terminal program to the terminal 10. In addition, in the HD of the program providing system 90, a relay device program used for realizing various functions or various means in the relay device 30 and can transmit the relay device program to the relay device 30. Furthermore, in the HD of the program providing system 90, a transmission management program used for realizing various functions or various means in the management system 50 is stored and can transmit the transmission management program to the management system 50.

The maintenance system 100 is a computer used for maintaining, managing, or performing maintenance of at least one of the terminal 10, the relay device 30, the management system 50, and the program providing system 90. For example, in a case where the maintenance system 100 is installed in the country, and the terminal 10, the relay device 30, the management system 50, or the program providing system 90 is installed outside the country, the maintenance system 100 remotely performs maintenance such as maintaining, management, maintenance of at least one of the terminal 10, the relay device 30, the management system 50, and the program providing system 90 through a communication network 2. In addition, the maintenance system 100 performs maintenance such as management of a model number, a serial number, a sales contact, an inspection, or a failure history of at least one of the terminal 10, the relay device 30, the management system 50, and the program providing system 90 through the communication network 2.

The terminals (10aa, 10ab, 10ac, 10a, . . . ), the relay devices (30a-1 and 30a-2), and the router 70a are communicably connected through a LAN 2a. The terminals (10ba, 10bb, 10bc, 10b, . . . ), the relay devices (30b-1 and 30b-2), and the router 70b are communicably connected through a LAN 2b. The LAN 2a and the LAN 2b are communicably interconnected through a dedicated line 2ab including the router 70ab and are built within a predetermined region A. For example, the region A is Japan, the LAN 2a is built inside a Tokyo office, and the LAN 2b is built inside an Osaka office.

The terminals (10ca, 10cb, 10cc, 10c, . . . ), the relay devices (30c-1 and 30c-2), and the router 70c are communicably connected through a LAN 2c. The terminals (10da, 10db, 10dc, 10d, . . . ), the relay devices (30d-1 and 30d-2), and the router 70d are communicably connected through a LAN 2d. The LAN 2c and the LAN 2d are communicably interconnected through a dedicated line 2cd including the router 70cd and are built within a predetermined region B. For example, the region B is U.S.A., the LAN 2c is built inside a New York office, and the LAN 2d is built inside a Washington D.C. office. The region A and the region B are communicably interconnected through the Internet 2i from the routers (70ab and 70cd).

The management system 50 and the program providing system 90 are connected to the terminal 10 and the relay device 30 in a communicable manner through the Internet 2i. The management system 50 and the program providing system 90 may be installed in the region A or the region B or in any other region.

The relay devices (30e-1, 30e-2) are connected to the terminal 10 through the communication network 2 in a communicable manner. At least one of the relay devices (30e-1 and 30e-2) are constantly operated and, in order to make it difficult for the relay devices to be influenced by the communication traffic within the local area of the region A or the region B, are installed to a region other than those regions. Accordingly, in a case where the terminal 10 has a telephone call with a terminal installed to any other region, at least one of the relay devices (30e-1 and 30e-2) is used as a relay device used for relaying telephone call data. When a telephone call is made between terminals installed to the same local area, even in a case where a relay device installed to this local area is not operated, any one of the relay devices (30e-1, 30e-2) is used as an emergency relay device.

In this embodiment, the communication network 2 according to this embodiment is built by the LAN 2a, the LAN 2b, the dedicated line 2ab, the Internet 2i, the dedicated line 2cd, the LAN 2c, and the LAN 2d. In this communication network 2, a place at which communication is executed not only in a wired manner but also in a wireless manner may be present.

In FIG. 1, numbers of four sets represented under each terminal 10, each relay device 30, the management system 50, each router 70, and the program providing system 90, and the maintenance system 100 illustrate IP addresses of general IPv4 in a simplified manner. For example, the IP address of the terminal 10aa is "1.2.1.3". While IPv6 may be used instead of IPv4, for the simplification of description, the IPv4 will be used for the description.

In this embodiment, each relay device 30 is mirrored, and a configuration is employed in which a conference can be started when one of the relay devices is stopped due to a maintenance operation or the like. However, a configuration may be employed in which the configuration for mirroring each relay device 30 is set as a fee-based option, and a relay device occupied by a specific client and the like may be configured not to be redundant.

Hardware Configuration of Embodiment

Next, the hardware configuration of this embodiment will be described. In this embodiment, a case will be described in which, when a delay occurs in the reception of image data using the terminal 10 as a relay destination (destination), the image data is transmitted to the terminal 10 as a relay destination after the resolution of an image of the image data is changed by the relay device 30.

Figure 37:
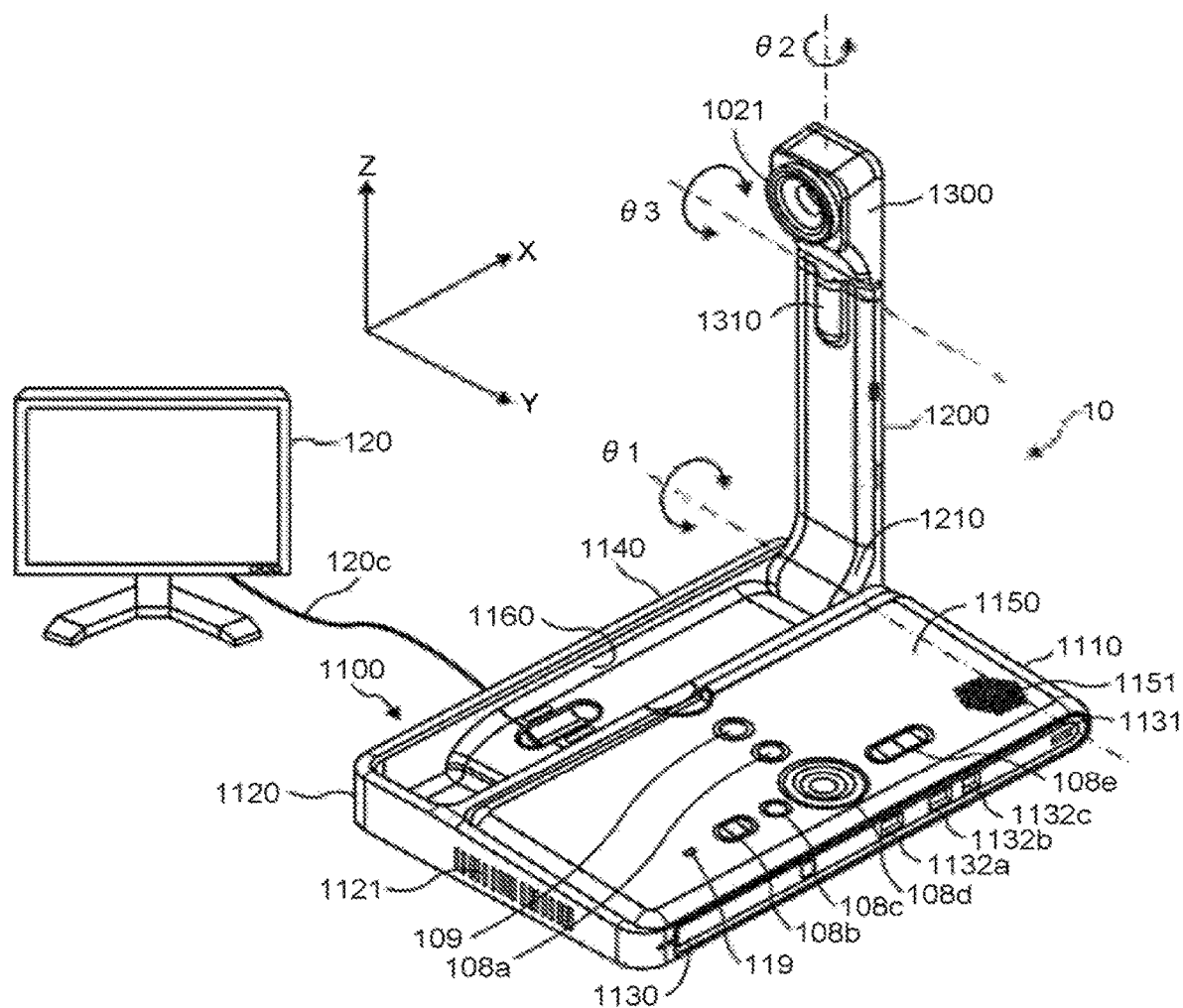
FIG. 37 is a diagram that illustrates an external appearance of a transmission terminal according to this embodiment.

FIG. 37 is a diagram that illustrates an external appearance of the terminal 10 according to this embodiment. Hereinafter, the longitudinal direction of the terminal 10 will be described as an X-axis direction, a direction perpendicular to the X-axis direction within the horizontal plane will be described as the Y-axis direction, and a direction (vertical direction) perpendicular to the X-axis direction and a Y-axis direction will be described as a Z-axis direction.

As illustrated in FIG. 37, the terminal 10 includes: a casing 1100; an arm 1200; and a camera housing 1300. Among these, on a front wall face 1110 of the casing 1100, an intake face, which is not illustrated in the drawing, formed by a plurality of intake holes is disposed, and, on a rear wall face 1120 of the casing 1100, an exhaust face 1121 on which a plurality of exhaust holes are formed is disposed. In this way, the open air of the rear side of the terminal 10 is taken in through the intake face not illustrated in the drawing by driving a cooling fan built in the casing 1100, and the air can be exhausted to the rear side of the terminal 10 through the exhaust face 1121. On a right wall face 1130 of the casing 1100, a sound collection hole 1131 is formed, and sounds such as speech, a sound, and a noise can be collected by a built-in microphone 114 to be described later.

On a right wall face 1130 side of the casing 1100, an operation panel 1150 is formed. On this operation panel 1150, a plurality of operation buttons (108a to 108e) to be described later, a power switch 109 to be described later, and an alarm lamp 119 to be described later are disposed, and a sound output face 1151 formed by a plurality of sound output holes used for allowing an output sound from a built-in speaker 115 to be described later to pass through it is formed. In addition, on a left wall face 1140 side of the casing 1100, a housing portion 1160 as a recessed portion used for housing the arm 1200 and the camera housing 1300 is formed. On the right wall face 1130 of the casing 1100, a plurality of connection ports (1132a to 1132c) used for electrically connecting cables to an external device connection I/F 118 to be described later are disposed. On the left wall face 1140 of the casing 1100, a connection port, which is not illustrated in the drawing, used for electrically connecting a cable 120c used for a display 120 to the external device connection I/F 118 to be described later is disposed.

Hereinafter, in a case where an arbitrary operation button among the operation buttons (108a to 108e) is to be represented, an "operation button 108" will be used, and, in a case where an arbitrary connection port among the connection ports (1132a to 1132c) is to be represented, a "connection port 1132" will be used for the description.

The arm 1200 is attached to the casing 1100 through a torque hinge 1210, and the arm 1200 is configured to be rotatable in the vertical direction with respect to the casing 1100 in the range of a tilt angle θ1 of 135 degrees. FIG. 37 illustrates a state in which the tilt angle θ1 is 90 degrees.

In the camera housing 1300, a built-in camera 112 to be described later is arranged, and a user, a document, a room, and the like can be captured. In addition, in the camera housing 1300, a torque hinge 1310 is formed. The camera housing 1300 is attached to the arm 1200 through the torque hinge 1310. The camera housing 1300 is attached to the arm 1200 through the torque hinge 1310, and the camera housing 1300 is configured to be rotatable with the arm 1200 in the vertical and horizontal directions in the range of a pan angle θ2 of ±180 degrees and in the range of a tilt angle θ3 of ±45 degrees with the state illustrated in FIG. 37 set as 0 degrees.

Each of the relay device 30, the management system 50, the program providing system 90, and the maintenance system 100 has the same external appearance as that of a general server or a computer, the external appearance will not be presented.

Figure 2:
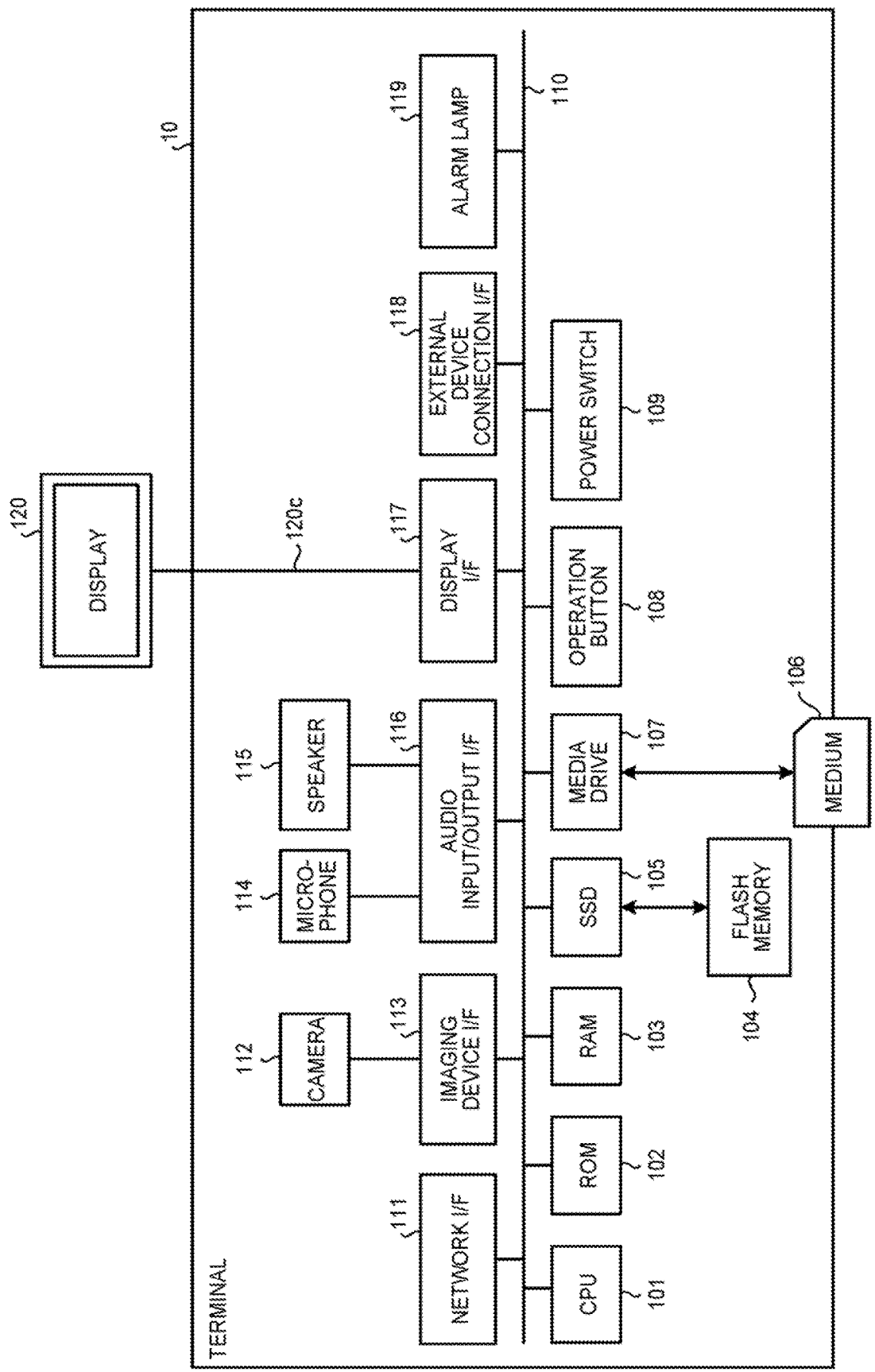
FIG. 2 is a hardware configuration diagram of a transmission terminal according to an embodiment.

FIG. 2 is a hardware configuration diagram of the terminal 10 according to an embodiment of the present invention. As illustrated in FIG. 2, the terminal 10 according to this embodiment includes: a CPU (central processing unit) 101 controlling the overall operation of the terminal 10; ROM (read only memory) 102 storing a terminal program; RAM (random access memory) 103 used as a work area of the CPU 101; flash memory 104 storing various kinds of data such as image data and audio data; an SSD (solid state drive) 105 controlling reading or writing various kinds of data for the flash memory 104 under the control of the CPU 101; a media drive 107 controlling reading or writing (storing) data for a recording medium 106 such as flash memory; operation buttons 108 operated in a case where the destination of the terminal 10 is selected or the like; a power switch 109 used for switching between On/Off of the power of the terminal 10; and a network I/F (interface) 111 used for transmitting data using the communication network 2 to be described later.

In addition, the terminal 10 includes: a built-in camera 112 acquiring an image by imaging a subject under the control of the CPU 101; an imaging device I/F 113 controlling the driving of the camera 112; a built-in speaker 115 outputting an audio; an audio input/output I/F 116 processing input/output of an audio signal between the microphone 114 and the speaker 115 under the control of the CPU 101; a display I/F 117 transmitting image data to an externally-attached display 120 under the control of the CPU 101; an external device connection I/F 118 used for connecting various external devices attached to the connection port 1132 illustrated in FIG. 37; an alarm lamp 119 alarming an abnormality of various functions of the terminal 10; and a bus line 110 such as an address bus or a data bus used for electrically connecting the constituent elements described above as illustrated in FIG. 2.

The display 120 is a display unit that is configured by a liquid crystal or an organic EL displaying an image of a subject, an icon for an operation, and the like. The display 120 is connected to the display I/F 117 through the cable 120c. This cable 120c may be an analog RGB (VGA) signal cable, a component video cable, an HDMI (registered trademark) (high-definition multimedia interface), or a DVI (digital video interactive) signal cable.

The camera 112 includes a lens and a solid-state imaging device that electronizes an image (video) of a subject by converting light into electric charge. As the solid-state imaging device, a CMOS (complementary metal oxide semiconductor), a CCD (charge coupled device), or the like is used.

To the external device connection I/F 118, external devices such as an externally-attached camera, an externally-attached microphone, and an externally-attached speaker can be connected using USB (universal serial bus) cables or the like. In a case where an externally-attached camera is connected, the externally-attached camera is driven prior to the built-in camera 112 under the control of the CPU 101. Similarly, in a case where an externally-attached microphone is connected or in a case where an externally-attached speaker is connected, the externally-attached microphone or the externally-attached speaker is driven prior to the built-in microphone 114 or the built-in speaker 115 under the control of the CPU 101.

The recording medium 106 is configured to be attachable/detachable to the terminal 10. The recording medium is not limited to the flash memory 104 as long as it is a nonvolatile memory reading or writing data in accordance with the control of the CPU 101, and EEPROM (electrically erasable and programmable ROM) or the like may be used.

In addition, the terminal program may be recorded as a file of an installable form or an executable form on a computer-readable recording medium such as the recording medium 106 and be circulated.

Figure 3:
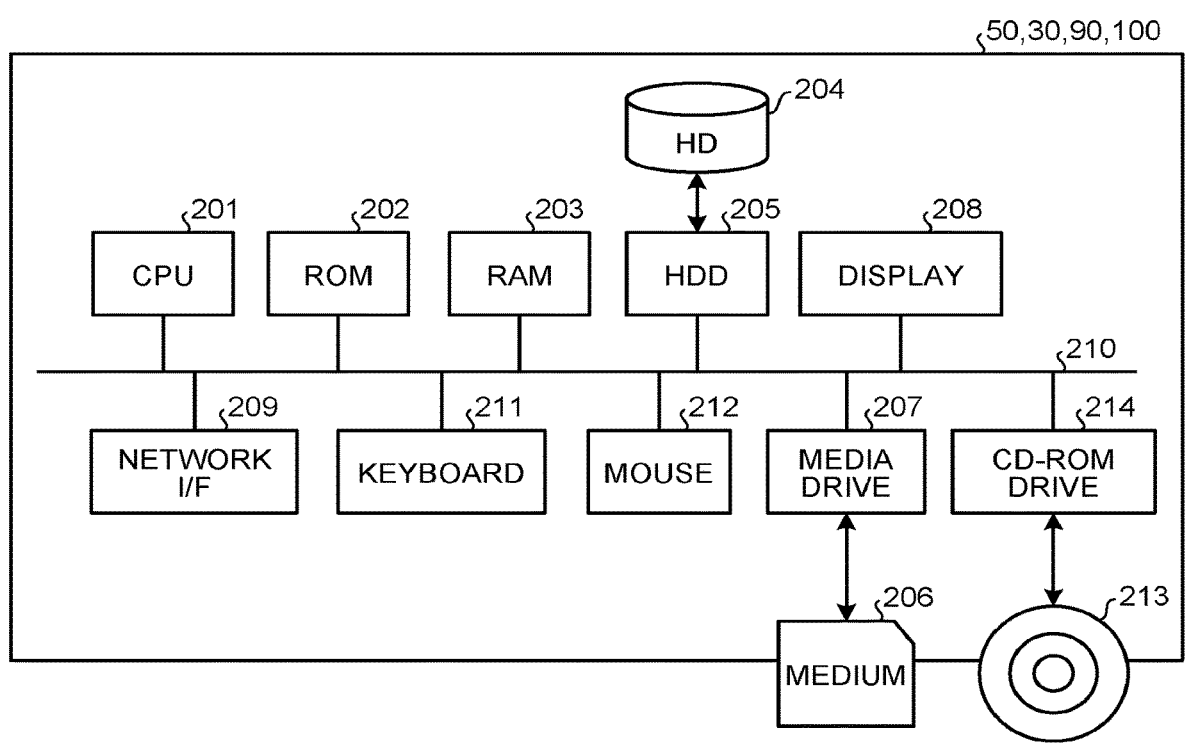
FIG. 3 is a hardware configuration diagram of a transmission management system, a relay device, a program providing system, or a maintenance system according to an embodiment.

FIG. 3 is a hardware configuration diagram of a management system according to an embodiment of the present invention. The management system 50 includes: a CPU 201 controlling the overall operation of the management system 50; ROM 202 storing a transmission management program;

RAM 203 used as a work area of the CPU 201; a HD (hard disk) 204 storing various kinds of data; an HDD (hard disk drive) 205 controlling reading or writing various kinds of data for the HD 204 under the control of the CPU 201; a media drive 207 controlling reading or writing (storing) data for a recording medium 206 such as flash memory; a display 208 displaying various kinds of information such as a cursor, a menu, a window, characters, an image, and the like; a network I/F 209 used for data transmission using the communication network 2 to be described later; a keyboard 211 including a plurality of keys used for inputting a character, a numerical value, various instructions, and the like; a mouse 212 selecting or executing various instructions, selecting a processing target, moving the cursor, and the like; a CD-ROM drive 214 controlling reading or writing data for a CD-ROM (compact disc read only memory) 213 as an example of the attachable/detachable recording medium; and a bus line 210 such as an address bus or a data bus used for electrically connecting the constituent elements described above as illustrated in FIG. 3.

In addition, the transmission management program described above may be recorded as a file of an installable form or an executable form on a computer-readable recording medium such as the recording medium 206 or the CD-ROM 213 and be circulated.

The relay device 30 has a hardware configuration similar to that of the management system 50, and thus description thereof will not be presented. However, in the ROM 202, a relay device program used for controlling the relay device 30 is recorded. Also in this case, the relay device program may be recorded as a file of an installable form or an executable form on a computer-readable recording medium such as the recording medium 206 or the CD-ROM 213 and be circulated.

In addition, the program providing system 90 has a hardware configuration similar to that of the management system 50, and thus, description thereof will not be presented. However, in the ROM 202, a program providing program used for controlling the program providing system 90 is recorded. Also in this case, the program providing program may be recorded as a file of an installable form or an executable form on a computer-readable recording medium such as the recording medium 206 or the CD-ROM 213 and be circulated.

In addition, the maintenance system 100 has a hardware configuration similar to that of the management system 50, and thus, description thereof will not be presented. However, in the ROM 202, a maintenance program used for controlling the maintenance system 100 is recorded. Also in this case, the maintenance program may be recorded as a file of an installable form or an executable form on a computer-readable recording medium such as the recording medium 206 or the CD-ROM 213 and be circulated.

The program described above may be recorded on a computer-readable recording medium such as a CD-R (compact disc recordable), a DVD (digital versatile disc), or a Blu-ray disk as another example of the attachable/detachable recording medium described above and be provided.

Functional Configuration of Embodiment

Figure 4:
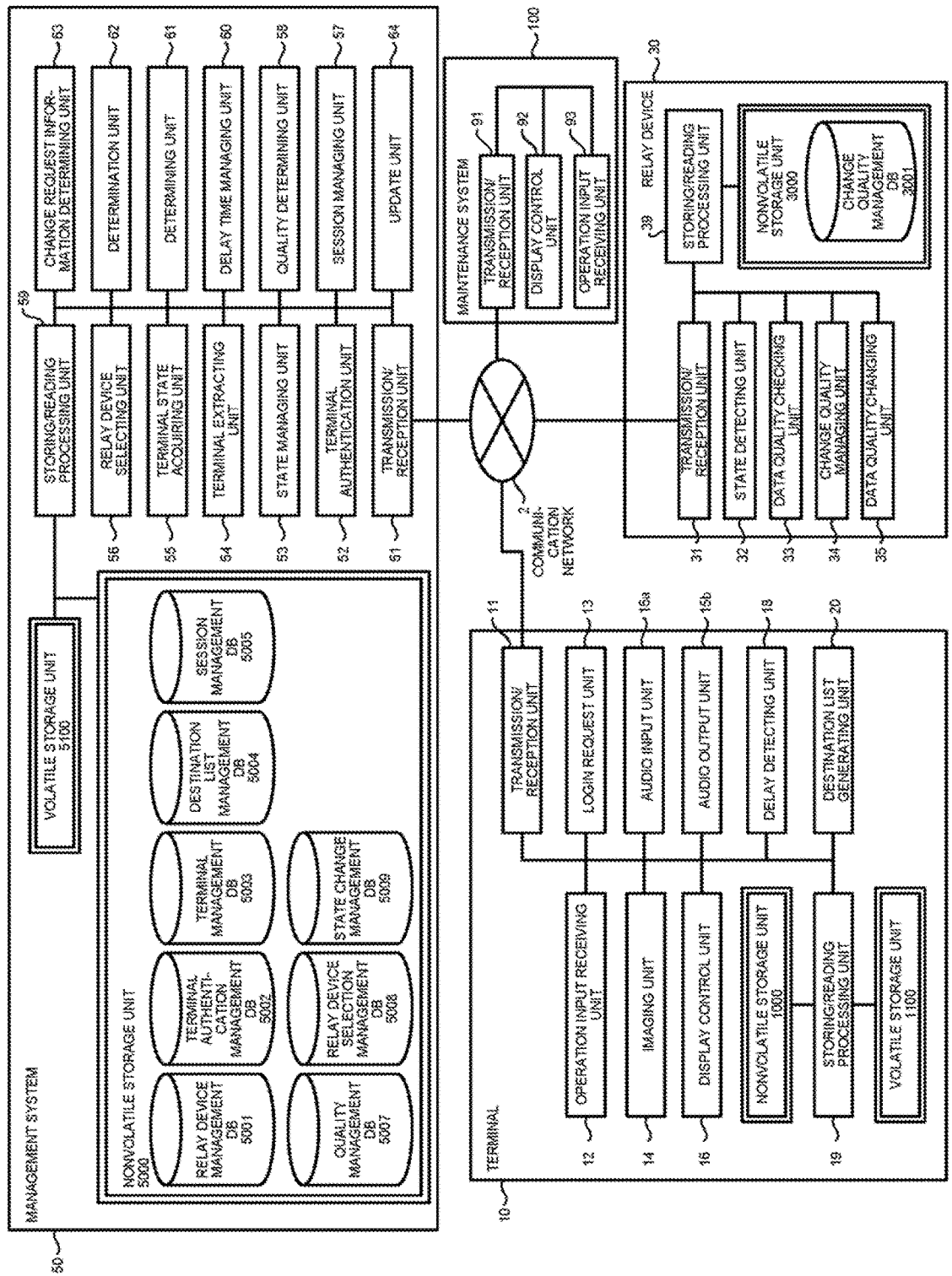
FIG. 4 is a functional block diagram of a terminal, a device, and a system configuring a transmission system according to an embodiment.

Next, the functional configuration of this embodiment will be described. FIG. 4 is a functional block diagram of a terminal, a device, and a system configuring the transmission system 1 according to this embodiment. As illustrated in FIG. 4, the terminal 10, the relay device 30, the management system 50, and the maintenance system 100 are interconnected through the communication network 2 for enabling data communication. The program providing system 90 illustrated in FIG. 1 is not illustrated in FIG. 4.

Functional Configuration of Terminal

The terminal 10 includes: a transmission/reception unit 11; an operation input receiving unit 12; a login requesting unit 13; an imaging unit 14; an audio input unit 15a; an audio output unit 15b; a display control unit 16; a delay detecting unit 18; a storing/reading processing unit 19; and a destination list generating unit 20. These units are functions or means realized as one of the constituent elements illustrated in FIG. 2 operates according to a command supplied from the CPU 101 based on the program stored in the ROM 102. In addition, the terminal 10 includes: a volatile storage unit 1000 built by the RAM 103 illustrated in FIG. 2; and a volatile storage unit 1100 built by the flash memory 104 illustrated in FIG. 2.

Each Function Unit of Terminal

Next, each unit of the terminal will be described in detail. The transmission/reception unit 11 of the terminal 10 is realized by the network I/F 111 illustrated in FIG. 2 and transmits/receives various kinds of data (information) to/from the other terminals, other devices, or other systems through the communication network 2. Before the start of a telephone call with a desired destination terminal, this transmission/reception unit 11 starts receiving each state information representing the state of each terminal as a destination candidate from the management system 50. This state information represents not only the operation state (an online state or an offline state) of each terminal 10 but also a detailed state such as being in the middle of a telephone call or being in the middle of standby in the online state. This state information represents various states including not only the operation state of each terminal 10 but also release of the cable from the terminal 10 in the terminal 10, audio output without image output, no audio output (mute), and the like. Hereinafter, as an example, a case will be described in which the state information represents the operation state.

The operation input receiving unit 12 is realized by the operation buttons 108 and the power switch 109 illustrated in FIG. 2 and receives various inputs from a user. For example, when a user turns on the power switch 109 illustrated in FIG. 2, the operation input receiving unit 12 illustrated in FIG. 4 receives the power-on operation and turns on the power.

The login requesting unit 13 is realized according to a command from the CPU 101 illustrated in FIG. 2 and automatically transmits login request information representing an indication of a login request and a current-time point IP address of the terminal 10 as a request source from the transmission/reception unit 11 to the management system 50 through the communication network 2 with being triggered upon the reception of the power on described above. When the user switches the power switch 109 from the On-state to the Off-state, the transmission/reception unit 11 transmits state information indicating power off to the management system 50, and then, the operation input receiving unit 12 completely turns off the power. In this way, the management system 50 side can recognize that the terminal 10 has been switched from a power-on state to a power-off state.

The imaging unit 14 is realized by a command supplied from the CPU 101 illustrated in FIG. 2, the camera 112 illustrated in FIG. 2, and the imaging device I/F 113 and images a subject and outputs image data acquired by the imaging process. The audio input unit 15a is realized by the audio input/output I/F 116 illustrated in FIG. 2 and, after user's speech is converted into an audio signal by the microphone 114, inputs audio data relating to the audio signal. The audio output unit 15*b* is realized by a command supplied from the CPU 101 illustrated in FIG. 2 and the audio input/output I/F 116 illustrated in FIG. 2, outputs an audio signal relating to audio data, and outputs an audio from the speaker 115.

The display control unit 16 is realized by the display I/F 117 illustrated in FIG. 2 and controls for transmitting image data to the externally-attached display 120. Before a terminal 10 as a request source starts a telephone call of a television conference with a terminal 10 as a desired destination, the display control unit 16 displays a destination list on the display 120 in which each destination name is included with the state information received after the start of reception executed by the transmission/reception unit 11 being reflected.

Figure 22:
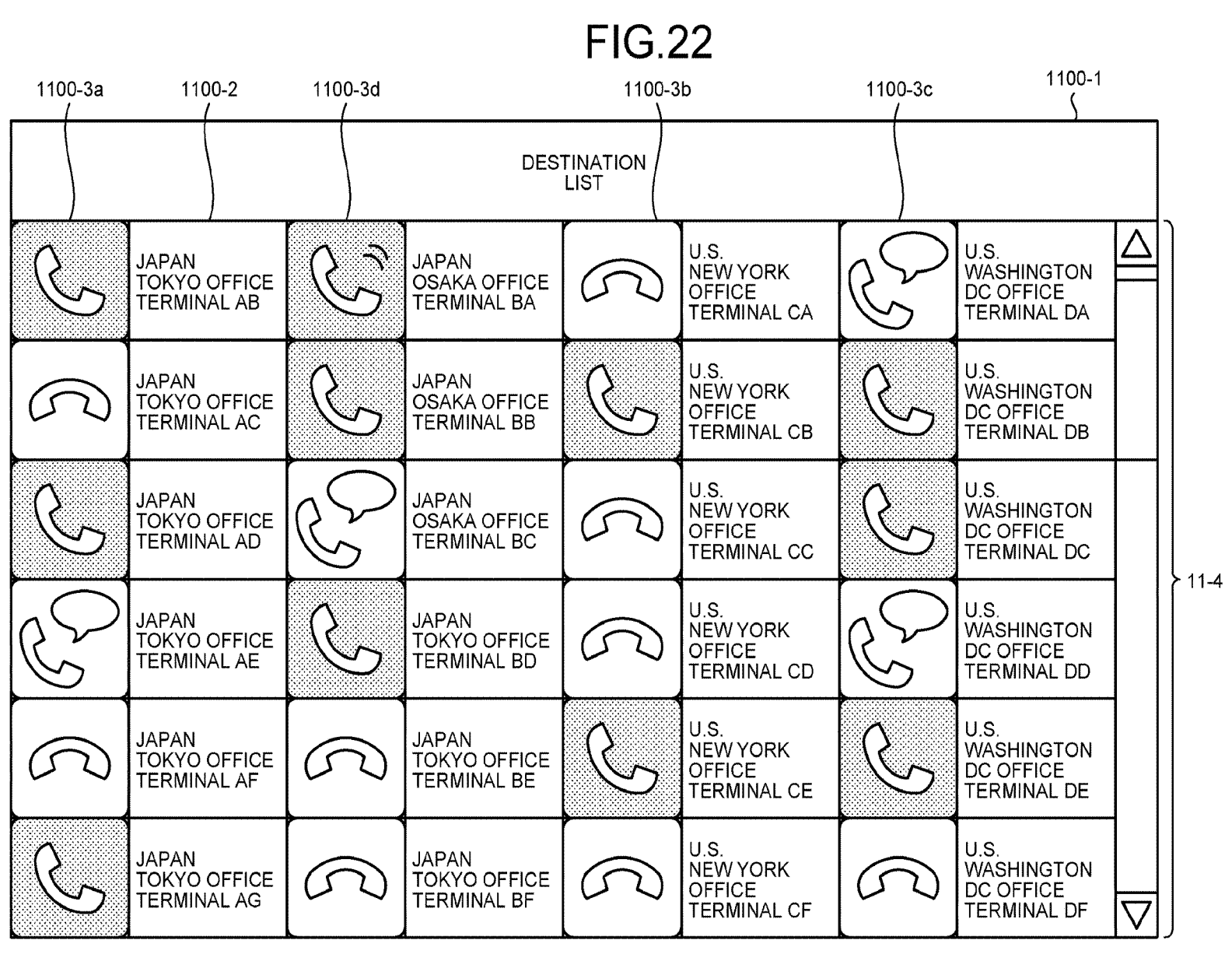

For example, on the display 120, a destination list range 1100-1 as illustrated in FIG. 22 is displayed by the display executing unit 16*a*. In this destination list range 1100-1, destination names such as a destination name "Japan Tokyo Office terminal AB" 1100-2 and the like are displayed, and icons (1100-3*a*, 1100-3*b*, 1100-3*c*, and 1100-3*d*) each representing a state relating to state information for each destination name are displayed. Among these, the icon 1100-3*a* represents that one terminal of a destination candidate is in the middle of standby in the online state, and thus, a telephone call with this terminal can be made. The icon 1100-3*b* represents that one terminal of a destination candidate is in the offline state, and a phone call with this terminal cannot be made. The icon 1100-3*c* represents a state in which one terminal of a destination candidate is in the middle of a telephone call with another terminal, and three-party communication or the like can be made by participating to this telephone call. The icon 1100-3*d* represents a state in which one terminal of a destination candidate requests for a telephone call with another terminal or receives a request for a telephone call from another terminal, and a telephone call with the one terminal of the destination candidate cannot be made. In addition to the states described above, the icon 1100-3*d* represents a state in which a telephone call with one terminal of the destination candidate cannot be made due to permitting a request for a telephone call with another terminal or a request for a telephone call with another terminal being permitted. In addition, in the destination list range 1100-1, a scroll bar 1100-4 is displayed on the right side, and, as an upward or downward icon having a triangular shape is selected, an icon representing the destination name and the state of a destination candidate not displayed in FIG. 22 are displayed.

The delay detecting unit 18 is realized by a command supplied from the CPU 101 illustrated in FIG. 2 and detects a delay time (ms) of image data or audio data transmitted from another terminal 10 through the relay device 30.

The storing/reading processing unit 19 is executed by a command supplied from the CPU 101 illustrated in FIG. 2 and, for example, an SSD 105 illustrated in FIG. 2 and executes the process of storing various kinds of data in the nonvolatile storage unit 1000 or reading various kinds of data stored in the nonvolatile storage unit 1000. In this nonvolatile storage unit 1000, a terminal ID (identification) used for identifying the terminal 10, a password, and the like are stored. In addition, the storing/reading processing unit 19 also executes the process of storing various kinds of data in the volatile storage unit 1100 or reading various kinds of data stored in the volatile storage unit 1100. In this volatile storage unit 1100, image data and audio data received at the time of executing a telephone call with a destination terminal are stored in an overlapping manner when the image data and the audio data are received. Among these, an image is displayed on the display 120 in accordance with the image data before the overwriting process, and a sound is output from the speaker 115 in accordance with the audio data before the overwriting process.

The destination list generating unit 20 generates and updates the destination list in which states of destination candidates are represented using icons as illustrated in FIG. 22 based on destination list information to be described later and the state information of the terminal 10 as each destination candidate that are received from the management system 50.

The terminal ID and a relay device ID, which will be described later, according to this embodiment represent identification information such as languages, characters, symbols, or various kinds of displays used for uniquely identifying each terminal 10 and each relay device 30. The terminal ID and the relay device ID may be identification information acquired by combining at least two or more of the languages, the characters, the symbols, and various kinds of displays.

Functional Configuration of Relay Device

Next, the functions or the means of the relay device 30 will be described. The relay device 30 includes: the transmission/reception unit 31; a state detecting unit 32; a data quality checking unit 33; a change quality managing unit 34; a data quality changing unit 35; and a storing/reading processing unit 39. These units are functions or means realized as one of the constituent elements illustrated in FIG. 3 operates according to a command supplied from the CPU 201 based on the program stored in the ROM 202. In addition, the relay device 30 includes a nonvolatile storage unit 3000 which is built by the HD 204 illustrated in FIG. 3 and in which storage of various kinds of data or information is maintained also when the power of the relay device 30 is turned off.

Change Quality Management Table

Figures 7, 8:
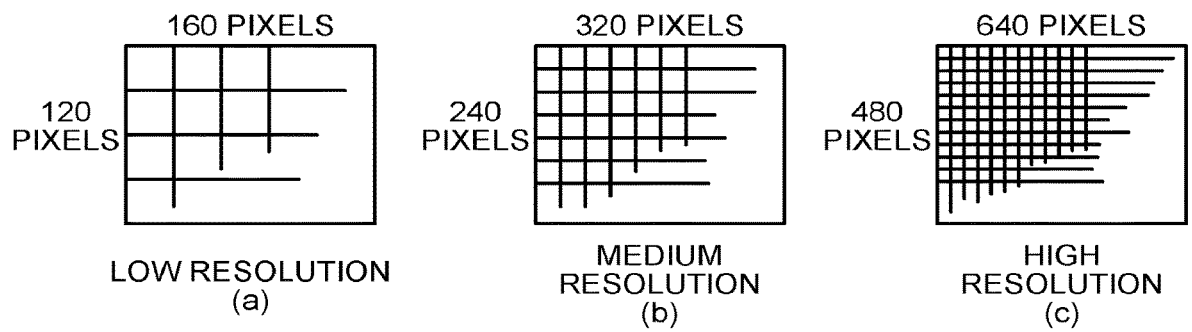
FIG. 7 is a conceptual diagram that illustrates a change quality management table.
FIG. 8 is a conceptual diagram that illustrates the image quality of image data.

In the nonvolatile storage unit 3000, a change quality management DB (database) 3001 configured by the change quality management table as illustrated in FIG. 7 is built. In the change quality management table, an IP address of the terminal 10 as a relay destination of image data and the image quality of the image data relayed by the relay device 30 to a relay destination are managed to be associated with each other.

Here, the resolution of the image of the image data handled in this embodiment will be described. There are a low-resolution image of which the horizontal side is formed by 160 pixels, and the vertical side is formed by 120 pixels as illustrated in FIG. 8(*a*) serving as a base image, a medium-resolution image of which the horizontal side is formed by 320 pixels, and the vertical side is formed by 240 pixels as illustrated in FIG. 8(*b*), and a high-resolution image of which the horizontal side is formed by 640 pixels, and the vertical side is formed by 480 pixels as illustrated in FIG. 8(*c*). Among these, in a case where the band is relatively narrow, image data of a low image quality formed by only image data of low resolution serving as the base image is relayed. In a case where the band is relatively wide, image data of low resolution serving as the base image and image data of a medium image quality formed by image data of medium resolution and relayed. In a case where the band is very wide, image data of low resolution serving as the base image, image data of medium resolution, and image data of a high image quality formed by image data of high resolution are relayed. For example, in the change quality management table illustrated in FIG. 7, in a case where the relay device 30 relays image data to a destination terminal having an IP address of "1.3.2.4", the image quality (the quality of the image) of the relayed image data is a "high quality".

Each Functional Unit of Relay Device

Next, each functional configuration of the relay device 30 will be described in detail. Hereinafter, in describing each unit of the relay device 30, relation with main constituent elements for realizing each unit of the relay device 30 among the constituent elements illustrated in FIG. 3 will be also described.

The transmission/reception unit 31 of the relay device 30 illustrated in FIG. 4 is realized by the network I/F 209 illustrated in FIG. 3 and transmits/receives various kinds of data (or information) to/from the other terminals, devices, or systems through the communication network 2. The state detecting unit 32 is realized according to a command supplied from the CPU 201 illustrated in FIG. 3 and detects the operation state of the relay device 30 including this state detecting unit 32. As the operation states, there are an "online" state, an "offline" state, and an "out-of-order" state.

The data quality checking unit 33 is realized according to a command supplied from the CPU 201 illustrated in FIG. 3, searches the change quality management table (see FIG. 7) using the IP address of a destination terminal as a search key, and extracts the image quality of corresponding relayed image data, thereby checking the image quality of the relayed image data. The change quality managing unit 34 is realized according to a command supplied from the CPU 201 illustrated in FIG. 3 and changes the content of the change quality management table of a change quality management DB 3001 based on quality information, which will be described later, transmitted from the management system 50. For example, in a case where a delay occurs in the reception of image data using a destination terminal (terminal 10db) in accordance with start of a television conference between a request source terminal (terminal 10bb) performing another television conference and a destination terminal (terminal 10ca) through the communication network 2 or the like in the middle of performing a television conference between a request source terminal (terminal 10aa) having a terminal ID of "01aa" and the destination terminal (terminal 10db) having a terminal ID of "01db" through transmission/reception of high-quality image data, the relay device 30 needs to lower the image quality of the image data that has been relayed until now from the high image quality to the medium image quality. In such a case, based on the quality information representing the medium image quality, the content of the change quality management table of the change quality management DB 3001 is changed such the image quality of the image data relayed by the relay device 30 is lowered from the high image quality to the medium image quality.

The data quality changing unit 35 is realized according to a command supplied from the CPU 201 illustrated in FIG. 3 and changes the image quality of image data transmitted from the transmission source terminal 10 based on the content of the change quality management table of the change quality management DB 3001 that has been changed as descried above. The storing/reading processing unit 39 is realized by the HDD 205 illustrated in FIG. 3 and executes the process of storing various kinds of data in a nonvolatile storage unit 3000 or reading various kinds of data stored in the nonvolatile storage unit 3000.

Functional Configuration of Management System

Next, the functions or means of the management system 50 will be described. The management system 50 includes: a transmission/reception unit 51; a terminal authentication unit 52; a state managing unit 53; a terminal extracting unit 54; a terminal state acquiring unit 55; a relay device selecting unit 56; a session managing unit 57; a quality determining unit 58; a storing/reading processing unit 59; a delay time managing unit 60; a determining unit 61; a determination unit 62; a change request information determining unit 63; and an update unit 64. These units are functions or means realized as one of the constituent elements illustrated in FIG. 3 operates according to a command supplied from the CPU 201 based on the program stored in the ROM 202. In addition, the management system 50 includes a nonvolatile storage unit 5000 which is built by the HD 204 illustrated in FIG. 3 and in which storage of various kinds of data or information is maintained also when the power of the management system 50 is turned off. In this nonvolatile storage unit 5000, the destination list range 1100-1 illustrated in FIG. 22 is stored. In addition, the management system 50 includes a volatile storage unit 5100 built by the RAM 203 illustrated in FIG. 3.

Relay Device Management Table

In the nonvolatile storage unit 5000, a relay device management DB 5001 that is configured by the relay device management table as illustrated in FIG. 9 is built. In this relay device management table, for the relay device ID of each relay device 30, acceptability/unacceptability information representing acceptability/unacceptability of a new session in the relay device 30, the operation state of each relay device 30, reception date and time at which the state information representing the operation state is received by the management system 50, the IP address of the relay device 30, and a maximum data transmission speed (Mbps) of the relay device 30 are managed to be associated with each other. In this embodiment, while the acceptability/unacceptability information represents the acceptability/unacceptability of a new conference in the relay device 30, the acceptability/unacceptability information is not limited thereto. In this embodiment, in a case where the acceptability/unacceptability information is "acceptable", it represents that a new conference start request can be accepted by the relay device. On the other hand, in a case where the acceptability/unacceptability information is "unacceptable", it represents that a new conference start request cannot be accepted by the relay device. Thus, in a case where the acceptability/unacceptability information is "unacceptable", a new conference cannot be started, but only participation to an existing conference or ending a conference can be executed. Accordingly, by ending all the existing conferences, a situation can be made in which the relay device is not used for a conference, whereby a maintenance operation of the relay device can be executed. For example, in the relay device management table illustrated in FIG. 9, it is represented that the acceptability/unacceptability information of the relay device 30a having a relay device ID of "Mal" is "acceptable", the operation state is "online", the date and time at which the state information is received by the management system 50 is "13:00" on "Nov. 10, 2009", the IP address of the relay device 30a is "1.2.1.2", and the maximum data transmission speed of the relay device 30a is 100 Mbps.

Terminal Authentication Management Table

In addition, in the nonvolatile storage unit 5000, a terminal authentication management DB 5002 configured by the terminal authentication management table as illustrated in FIG. 10 is built. In this terminal authentication management table, a password is managed to be associated with the terminal ID of each of all the terminals 10 managed by the management system 50. For example, in the terminal authentication management table illustrated in FIG. 10, it is represented that the terminal ID of the terminal 10*aa* is "01aa", and the password is "aaaa".

Terminal Management Table

In the nonvolatile storage unit 5000, a terminal management DB 5003 configured by the terminal management table as illustrated in FIG. 11 is built. In this terminal management table, for the terminal ID of each terminal 10, a destination name of a case where each terminal 10 is set as the destination, the operation state of each terminal 10, a communication state with another terminal, reception date and time when login request information to be described later is received by the management system 50, and the IP address of the terminal 10 are managed to be associated with each other. For example, in the terminal management table illustrated in FIG. 11, it is represented that, in the terminal 10*aa* having a terminal ID of "01aa", a terminal name is "Japan Tokyo office terminal AA", an operation state is "online", and a communication state is "None" representing a standby state not communicating with another terminal, date and time when the login request information is received by the management system 50 is "13:40 on Nov. 10, 2009", and the IP address of this terminal 10*aa* is "1.2.1.3". The communication state includes "Calling" representing a state being in the middle of calling another terminal, "Ringing" representing a state of being called from another terminal, "Accepted" representing a state of permitting a request for a call with another terminal or a request for a telephone call with another terminal being permitted, "Busy" representing a state of being in the middle of a telephone call with another terminal, and the like.

Destination List Management Table

In addition, in the nonvolatile storage unit 5000, a destination list management DB 5004 configured by the destination list management table as illustrated in FIG. 12 is built. In this destination list management table, the terminal ID of each request source terminal requesting the start of a telephone call in a television conference is managed to be associated with all the terminal IDs of destination terminals registered as destination terminal candidates. For example, in the destination list management table illustrated in FIG. 12, it is represented that destination terminal candidates capable of requesting the start of a telephone call from a request source terminal (terminal 10*aa*) having a terminal ID of "01aa" in a television conference are a terminal 10*ab* having a terminal ID of "01ab", a terminal 10*ba* having a terminal ID of "01ba", a terminal 10*bb* having a terminal ID of "01bb", and the like. These destination terminal candidates are updated by adding or removing a destination terminal candidate in accordance with an addition/removal request for the management system 50 from a request source terminal.

Session Management Table

Furthermore, in the nonvolatile storage unit 5000, a session management DB 5005 configured by the session management table as illustrated in FIG. 13 is built. In this session management table, for each session ID used for identifying a session in which communication for telephone call data is executed between terminals, a relay device ID of a relay device 30 used for relaying image data and audio data, a terminal ID of a request source terminal, a terminal ID of a destination terminal, a reception delay time (ms) at the time of reception of image data in the destination terminal, and reception date and time at which delay information representing the delay time is transmitted from the destination terminal and is received by the management system 50 are managed to be associated therewith. For example, in the session management table illustrated in FIG. 13, it is represented that a relay device 30*a* (relay device ID: "Ma1") selected in a session executed using a session ID "se1" relays image data and audio data between a request source terminal (terminal 10*aa*) having a terminal ID of "01aa" and a destination terminal (terminal 10*bb*) having a terminal ID of "01bb", a destination terminal (terminal 10*cb*) having a terminal ID of "01cb", and a destination terminal (terminal 10*db*) having a terminal ID of "01db" and that a delay time of image data at a time point of "14:00 on Nov. 10, 2009" is 200 (ms) in the destination terminal (terminal 10*db*). In a case where a television conference is executed between two terminals 10, based on delay information transmitted not from the destination terminal but from the request source terminal, the reception date and time of the delay information may be managed. However, in a case where a television conference is executed among three or more terminals 10, based on delay information transmitted from a terminal 10 disposed on the reception side of image data and audio data, the reception date and time of the delay information is managed.

Quality Management Table

In addition, in the nonvolatile storage unit 5000, a quality management DB 5007 configured by the quality management table as illustrated in FIG. 14 is built. In this quality management table, the image quality (the image quality of an image) of image data relayed by the relay device 30 is managed to be associated with a delay time (ms) of the image data in the request source terminal or the destination terminal Relay Device Selection Management Table Furthermore, in the nonvolatile storage unit 5000, a relay device selection management DB 5008 configured by the relay device selection management table as illustrated in FIG. 15 is built. In this quality management table, a relay device ID of a relay device 30 used for relaying image data and audio data is managed to be associated with each of terminal IDs of all the terminals 10 managed by the management system 50. In this embodiment, each relay device 30 is mirrored, and there are a plurality of relay devices 30 that can be used by the terminal 10, and accordingly, in the relay device selection management table, a plurality of relay device IDs are associated with one terminal ID.

State Change Management Table

In addition, in the nonvolatile storage unit 5000, a state change management DB 5009 configured by the state change management table as illustrated in FIGS. 16, 17, and 18 is built. In the state change management table illustrated in FIG. 16, change request information (an example of change information) representing a request for changing the communication state between terminals, before-change state information representing a communication state before a change made by the state changing unit 53*c*, and change information representing a state changed by the state changing unit 53*c* are managed to be associated with each other. In addition, in the state change management table illustrated in FIG. 17, change request information, terminal information used for identifying the request source terminals and the destination terminals, before-change state information, and change information are managed to be associated with each other. In the state change management table illustrated in FIG. 18, change request information, terminal information, determination information representing a result of a determination of whether or not change request information "Reject" has been received from all the plurality of terminals in a case where change request information "Reject" indicating rejection of start of communication has been received from any one of the plurality of terminals that have received change request information "Invite" indicating a request for starting communication, before-change state information, and change information are managed to be associated with each other. In the change request information, in addition to "Invite" and "Reject" described above, change request information "Accept" indicating a permission to start communication, change request information "Cancel" indicating cancellation of a request for starting communication, change request information "Join" indicating a request for starting relay of telephone call data, change request information "Call" indicating a request for a participation in a session in a case where the session has been set up between terminals, change request information "Leave" indicating a request for ending the communication, and the like are included.

Each Functional Unit of Management System

Next, each functional unit of the management system 50 will be described in detail. Hereinafter, in describing each unit of the management system 50, relation with main constituent elements used for realizing each unit of the management system 50 among the constituent elements illustrated in FIG. 3 will be described as well.

The transmission/reception unit 51 is executed by the network I/F 209 illustrated in FIG. 3 and transmits/receives various kinds of data (or information) to/from the other terminals, devices, or systems through the communication network 2. For example, the transmission/reception unit 51 receives terminal IDs of a plurality of transmission terminals used for the transmission/reception of content data or a request for updating acceptability/unacceptability information from the transmission terminal 10. The terminal authentication unit 52 searches the terminal authentication management table (see FIG. 10) of the nonvolatile storage unit 5000 using a terminal ID and a password included in login request information received through the transmission/reception unit 51 as a search key and determines whether the same terminal ID and the same password are managed in the terminal authentication management table, thereby executing terminal authentication.

The state managing unit 53, in order to manage the operation state of a request source terminal that has requested login, manages the terminal ID of the request source terminal, the operation state of the request source terminal, reception date and time at which the login request information is received by the management system 50, and the IP address of the request source terminal in association with each other in the terminal management table (see FIG. 11). For this reason, the state managing unit 53, according to a command supplied from the CPU 201 illustrated in FIG. 3, realizes the state setting unit 53a, the state acquiring unit 53b, and the state changing unit 53c illustrated in FIG. 5.

Among these, the state setting unit 53a, as the user using the terminal 10 turns the power switch 109 of the terminal 10 from the Off state to the On state, sets the operation state representing offline of the operation state of the terminal management table (see FIG. 11) to online based on the state information indicating turning on the power that is transmitted from the terminal. In addition, as the user using the terminal 10 turns the power switch 109 of the terminal 10 from the On state to the Off state, the state setting unit 53a sets the operation state representing online of the terminal management table (see FIG. 11) to offline based on the state information indicating turning off the power that is transmitted from the terminal.

When the change request information transmitted by the request source terminal or the destination terminal is received by the transmission/reception unit 51, the state acquiring unit 53b acquires the state information of at least one of the request source terminal and the destination terminal from the terminal management table (FIG. 11).

Based on the change request information received by the transmission/reception unit 51, the state changing unit 53c changes one or both of the state information of the request source terminal and the state information of the destination terminal managed by the terminal management table (see FIG. 11).

The terminal extracting unit 54 searches the destination list management table (see FIG. 12) using the terminal ID of the request source terminal that has requested login as the key and reads the terminal IDs of candidates for the destination terminal that can have a telephone call with the request source terminal, thereby extracting the terminal IDs. In addition, the terminal extracting unit 54 searches the destination list management table using the terminal ID of the request source terminal that has requested login as the key and extracts the terminal ID of another request source terminal having the terminal ID of the request source terminal being registered as a candidate for the destination terminal as well.

The terminal state acquiring unit 55 searches the terminal management table (see FIG. 11) using the terminal IDs of the candidates for the destination terminal that are extracted by the terminal extracting unit 54 as search keys and reads the operation state for each of the terminal IDs extracted by the terminal extracting unit 54. In this way, the terminal state acquiring unit 55 can acquire the operation states of the candidates for the destination terminal that can have a telephone call with the request source terminal that has requested login. In addition, the terminal state acquiring unit 55 searches the terminal management table using the terminal ID extracted by the terminal extracting unit 54 as a search key and acquires also the operation state of the request source terminal that has requested the login.

The relay device selecting unit 56 executes a process for finally narrowing down a plurality of relay devices 30 into one relay device 30. For this reason, the relay device selecting unit 56, according to a command supplied from the CPU 201 illustrated in FIG. 3, realizes the session ID generating unit 56a, the relay device extracting unit 56b, and the selection unit 56c.

Among these, the session ID generating unit 56a generates a session ID used for identifying a session in which telephone call data is transmitted and received between terminals. The relay device extracting unit 56b, based on the terminal ID of the request source terminal and the terminal ID of the destination terminal, which are included in start request information transmitted from the request source terminal, specifies (extracts) the relay device ID of a relay device 30 that can be commonly used by the terminals 10 represented by the terminal IDs among relay device identification information managed by the relay device selection management table (see FIG. 15). The selection unit 56c selects a relay device based on the relay device ID for which the acceptability/unacceptability information managed by the relay device management table (see FIG. 9) represents "acceptable" among the relay device IDs specified by the relay device extracting unit 56b as a relay device 30 relaying the transmission/reception of content data. Described in more detail, the selection unit 56c selects a relay device ID for which the acceptability/unacceptability information managed by the relay device management table (see FIG. 9)

represents "acceptable", and the operation state is "online" among the relay device IDs extracted by the relay device extracting unit 56b.

The session managing unit 57 manages the session ID generated by the session ID generating unit 56a, the terminal ID of the request source terminal, and the terminal IDs of the destination terminals by storing them in the session management table (see FIG. 13) of the nonvolatile storage unit 5000 in association with each other. In addition, the session managing unit 57 manages the relay device ID of one relay device 30 that has been finally selected to be stored in the session management table for each session ID.

The quality determining unit 58 searches the quality management table (see FIG. 14) using the delay time as a search key and extracts the image quality of corresponding image data, thereby determining the image quality of image data to be relayed by the relay device 30. The storing/reading processing unit 59 is executed by the HDD 205 illustrated in FIG. 3 and executes a process of storing various kinds of data in the nonvolatile storage unit 5000 or reading various kinds of data stored in the nonvolatile storage unit 5000. The delay time managing unit 60 extracts a corresponding terminal ID by searching the terminal management table (see FIG. 11) using the IP address of the destination terminal as a search key and manages a delay time represented in the delay information to be stored in a field part of the delay time in a record in which the extracted terminal ID is included in the session management table (see FIG. 13).

The determining unit 61 determines a countermeasure for changing the communication state between terminals based on the change request information received by the transmission/reception unit 51. In a case where the change request information "Reject" indicating rejecting the start of communication is received from any one of a plurality of terminals receiving the change request information "Invite" indicating requesting for the start of communication, the determination unit 62 determines whether or not the change request information "Reject" indicating rejecting the start of communication has been received from all the plurality of terminals. The change request information determining unit 63 determines whether the change request information received by the transmission/reception unit 51 is specific change request information representing not only the communication state of the terminal (one of the request source terminal and the destination terminal) transmitting the change request information but also a request for changing the communication state of the terminal (the other of the request source terminal and the destination terminal) of the other party side. For example, the change request information "Invite" indicating a request for starting communication not only changes the communication state of the request source terminal to a calling state "Calling" but also changes the communication state of the destination terminal as a called state "Ringing" and thus is determined to be the specific change request information. Similarly, in this embodiment, "Invite" described above, "Accept" indicating a permission for starting communication, "Reject" indicating a rejection to the start of communication, and "Cancel" indicating cancellation of a request for starting communication are determined to be the specific change request information. The update unit 64 updates the acceptability/unacceptability information of the relay device management table (see FIG. 9) based on a request for updating the acceptability/unacceptability information.

Functional Configuration of Maintenance System

Next, the functions or means of the maintenance system 100 will be described. The maintenance system 100 includes: a transmission/reception unit 91; a display control unit 92; and an operation input receiving unit 93. Each of these units is a function or means realized as one of the constituent elements illustrated in FIG. 3 operates according to a command supplied from the CPU 201 based on a program stored in the ROM 202.

Functional Unit of Maintenance System

Next, each functional configuration of the maintenance system 100 will be described in detail. Hereinafter, in describing each unit of the maintenance system 100, relation with main constituent elements used for realizing each unit of the maintenance system 100 among the constituent elements illustrated in FIG. 3 will be described as well.

The transmission/reception unit 91 of the maintenance system 100 illustrated in FIG. 4 is realized by the network I/F 209 illustrated in FIG. 3 and transmits/receives various kinds of data (or information) to/from other terminals, devices, or systems through the communication network 2. For example, the transmission/reception unit 91 transmits a request for updating the acceptability/unacceptability information to the management system 50.

The display control unit 92 is realized by the display 208 illustrated in FIG. 3. The display control unit 92, for example, displays an editing screen used for the request for updating the acceptability/unacceptability information.

The operation input receiving unit 93 is realized by the keyboard 211 and the mouse 212 illustrated in FIG. 3 and receives various kinds of user's inputs. The operation input receiving unit 93, for example, receives an input for requesting to update the acceptability/unacceptability information.

Process or Operation According to Embodiment

Figure 19:
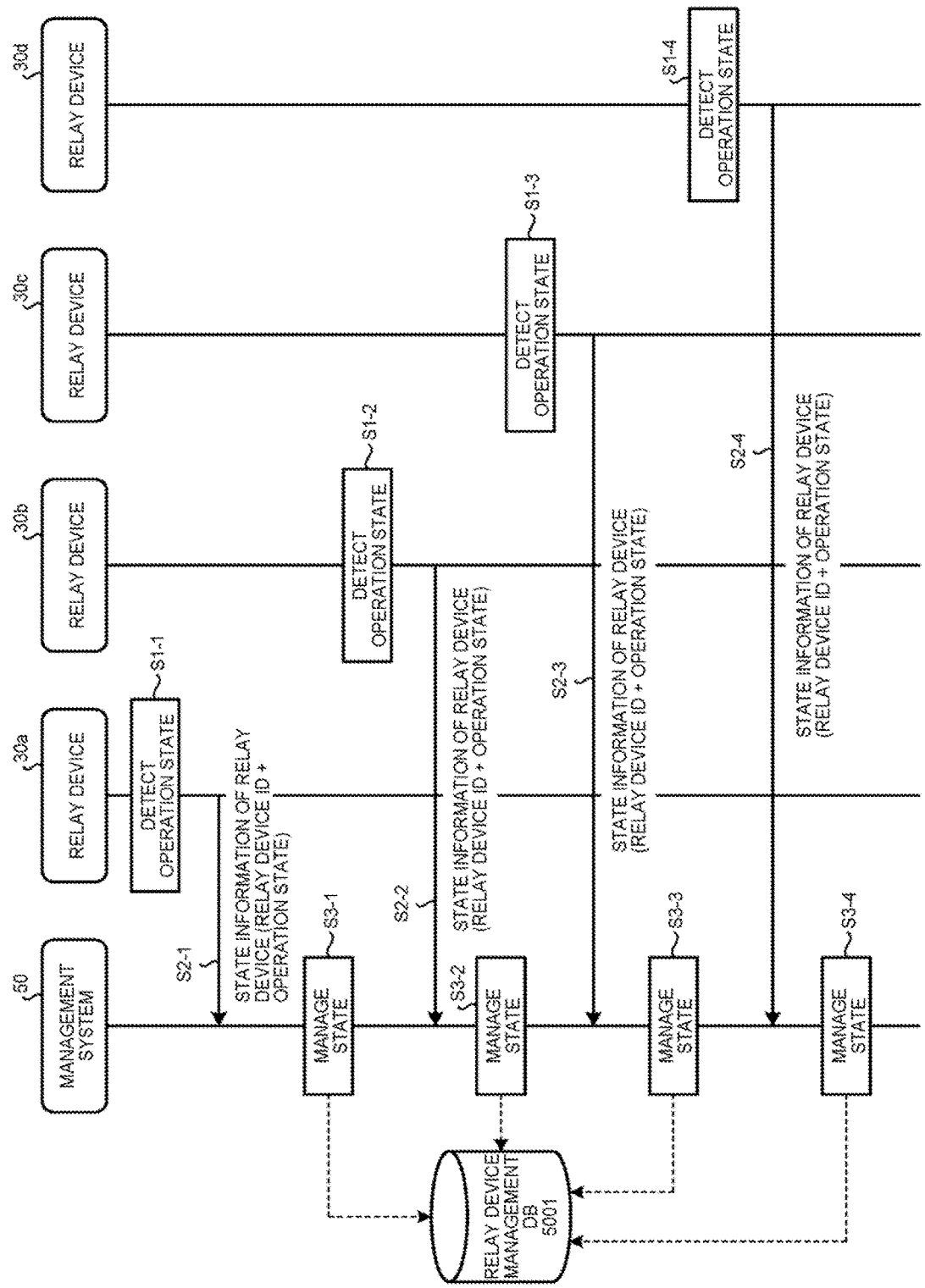
FIG. 19 is a sequence diagram that illustrates the process of managing state information representing an operation state of each relay device.
Figure 20:
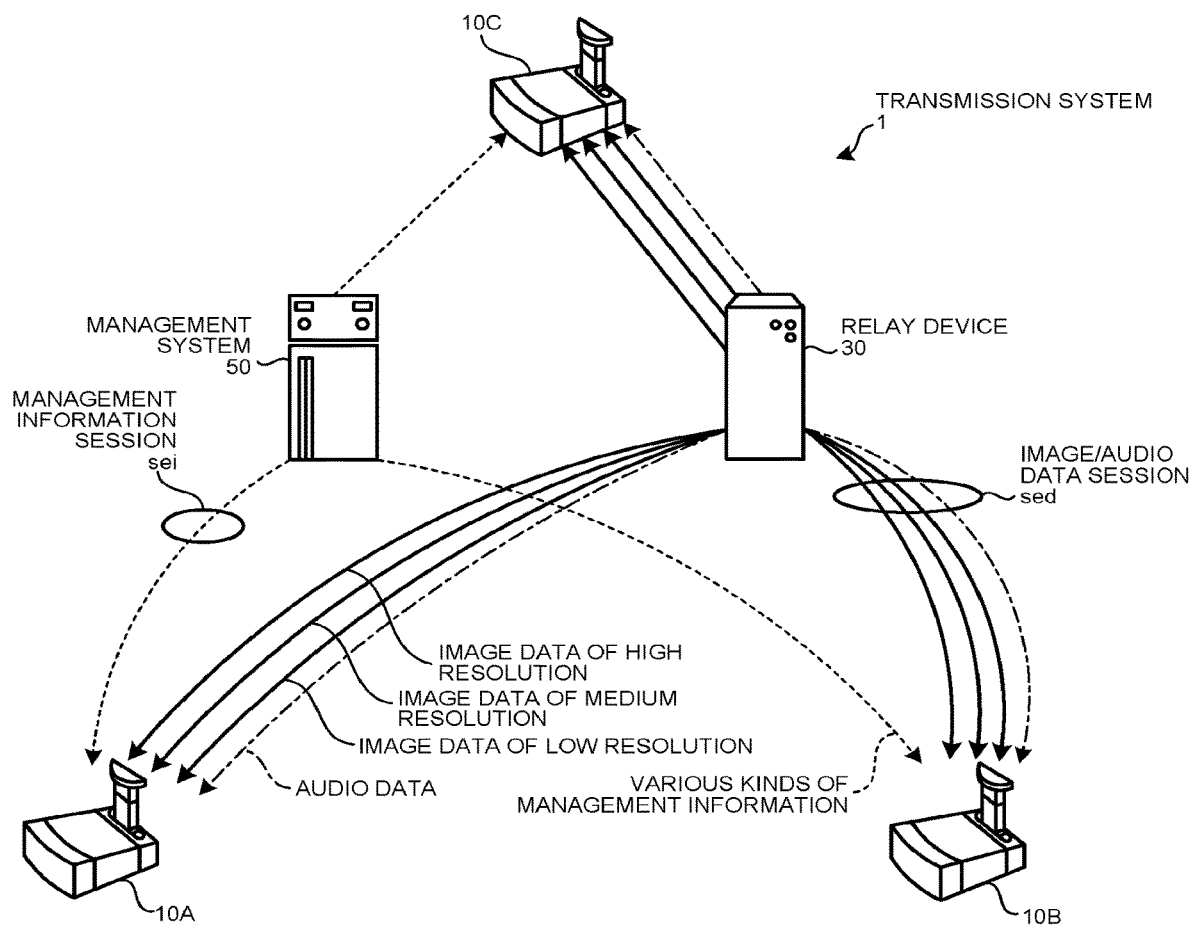
FIG. 20 is a conceptual diagram that illustrates transmission/reception states of image data, audio data, and various kinds of management information in a transmission system.
Figure 21:
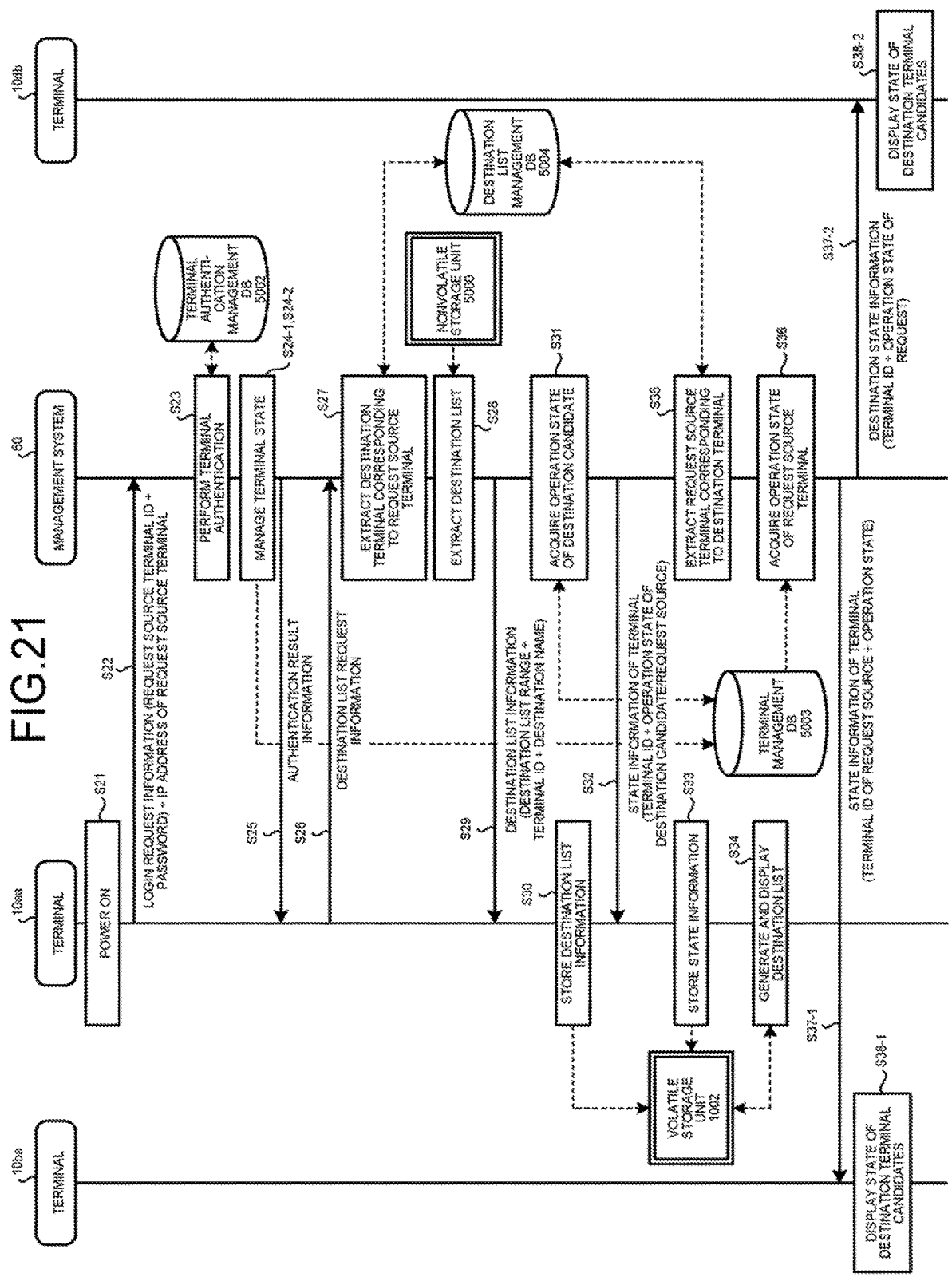
FIG. 21 is a sequence diagram that illustrates the process of a preparation step for starting a telephone call between transmission terminals.
Figure 23:
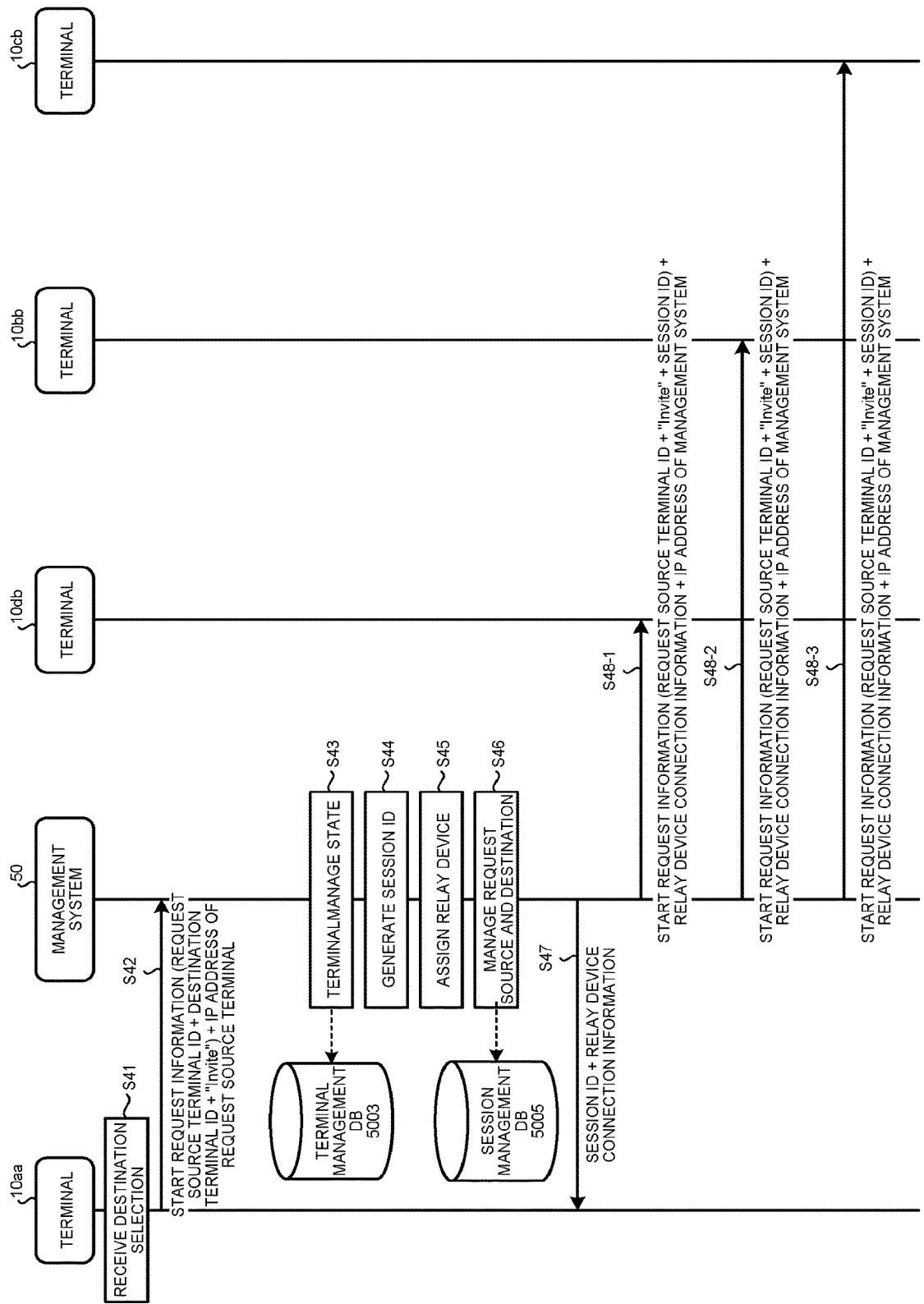
FIG. 23 is a sequence diagram that illustrates the process of requesting start of communication.
Figure 24:
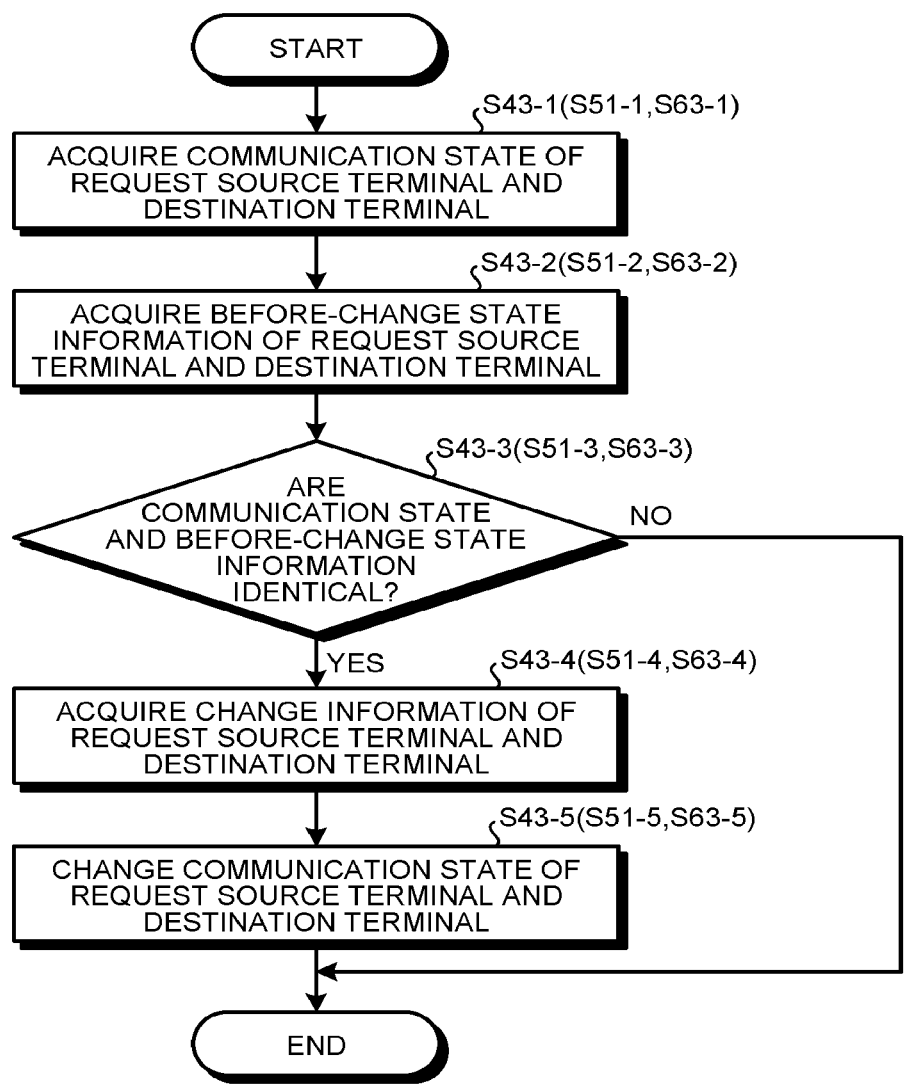
FIG. 24 is a process flowchart that illustrates the process of changing a communication state.
Figure 25:
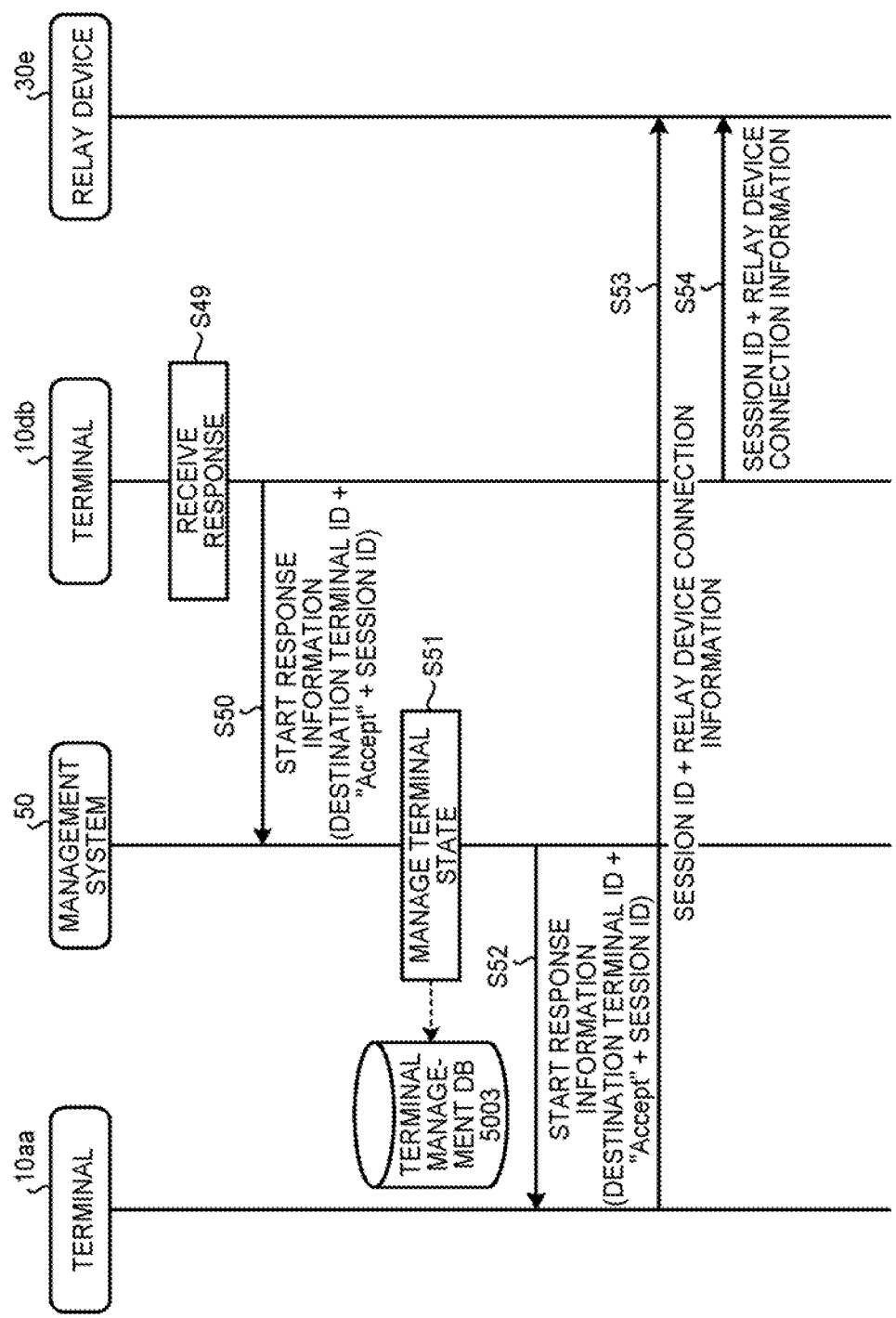
FIG. 25 is a sequence diagram that illustrates the process of permitting a request for starting communication.
Figure 26:
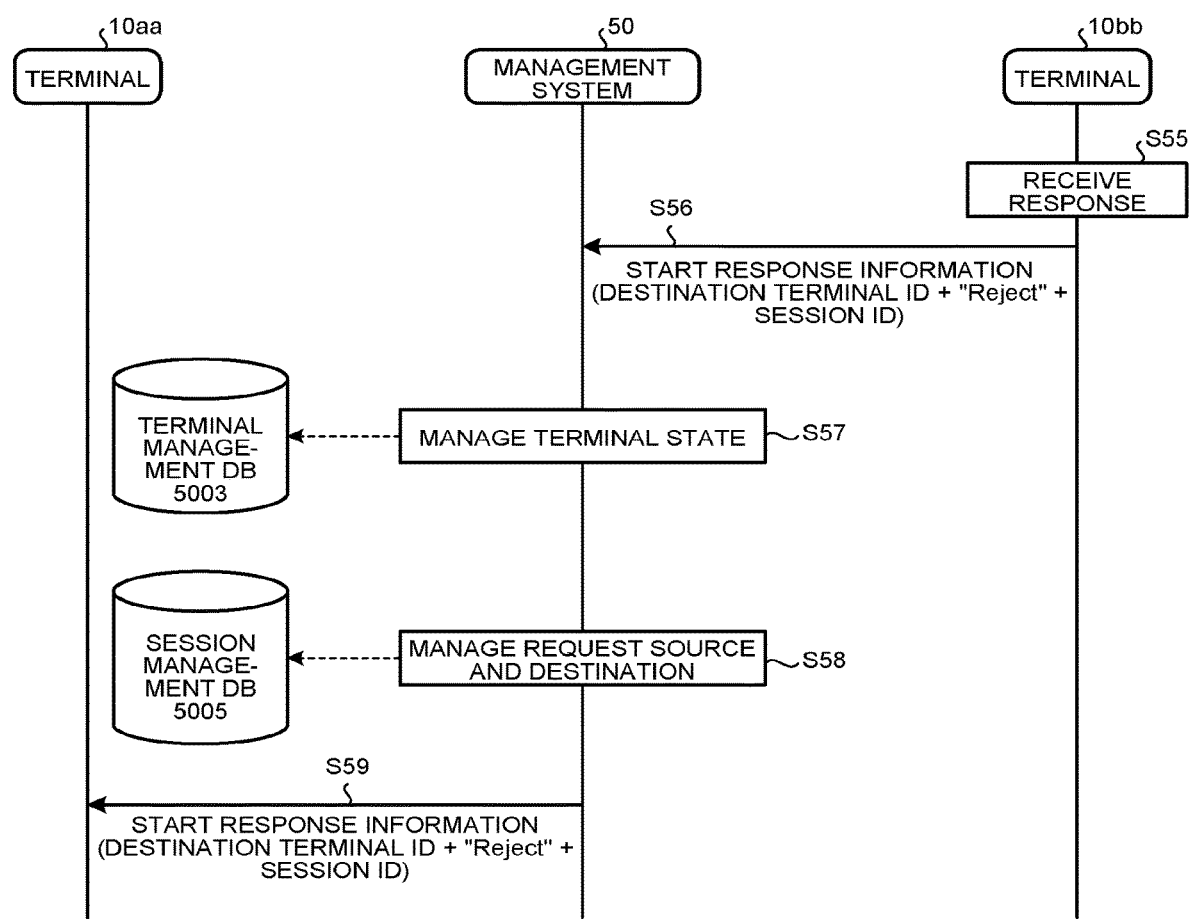
FIG. 26 is a sequence diagram that illustrates the process of rejecting a request for starting communication.
Figure 27:
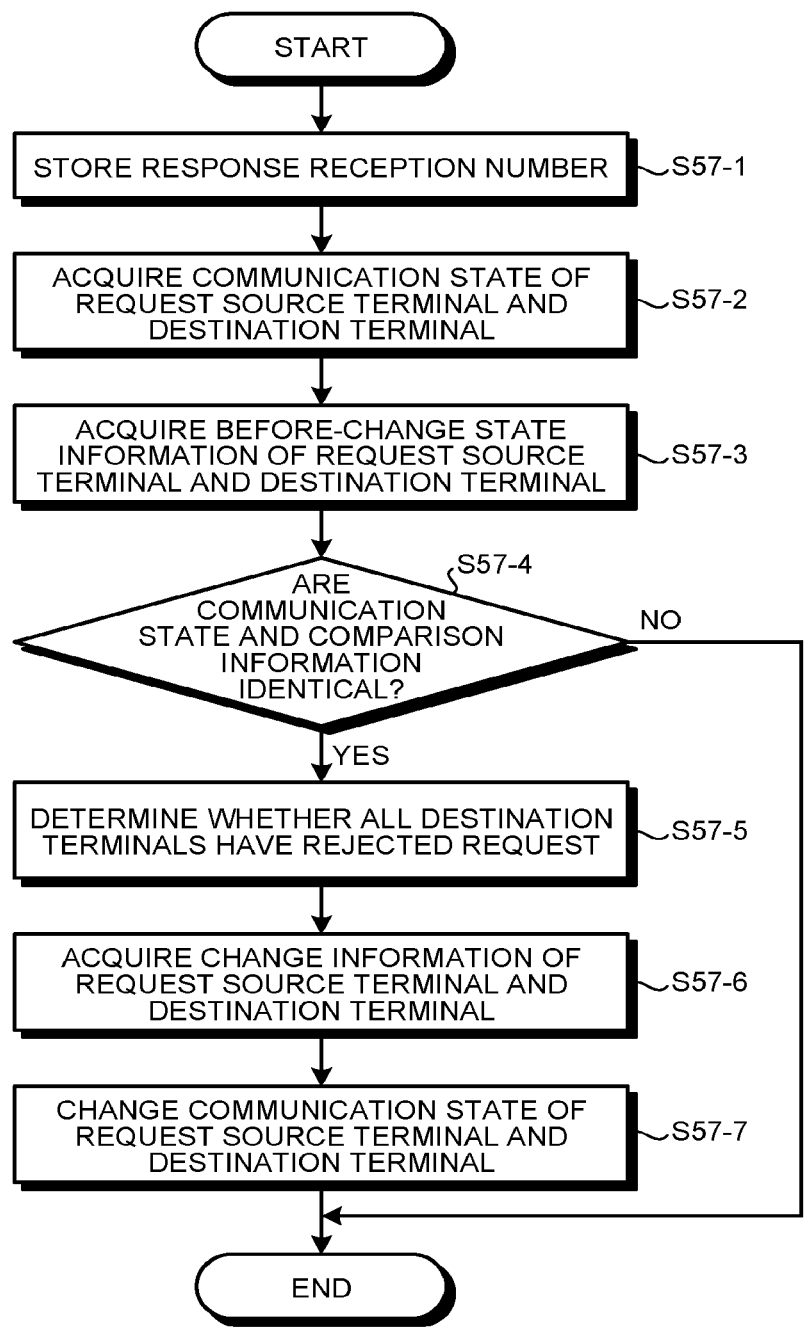
FIG. 27 is a process flowchart that illustrates the process of changing a communication state.
Figure 28:
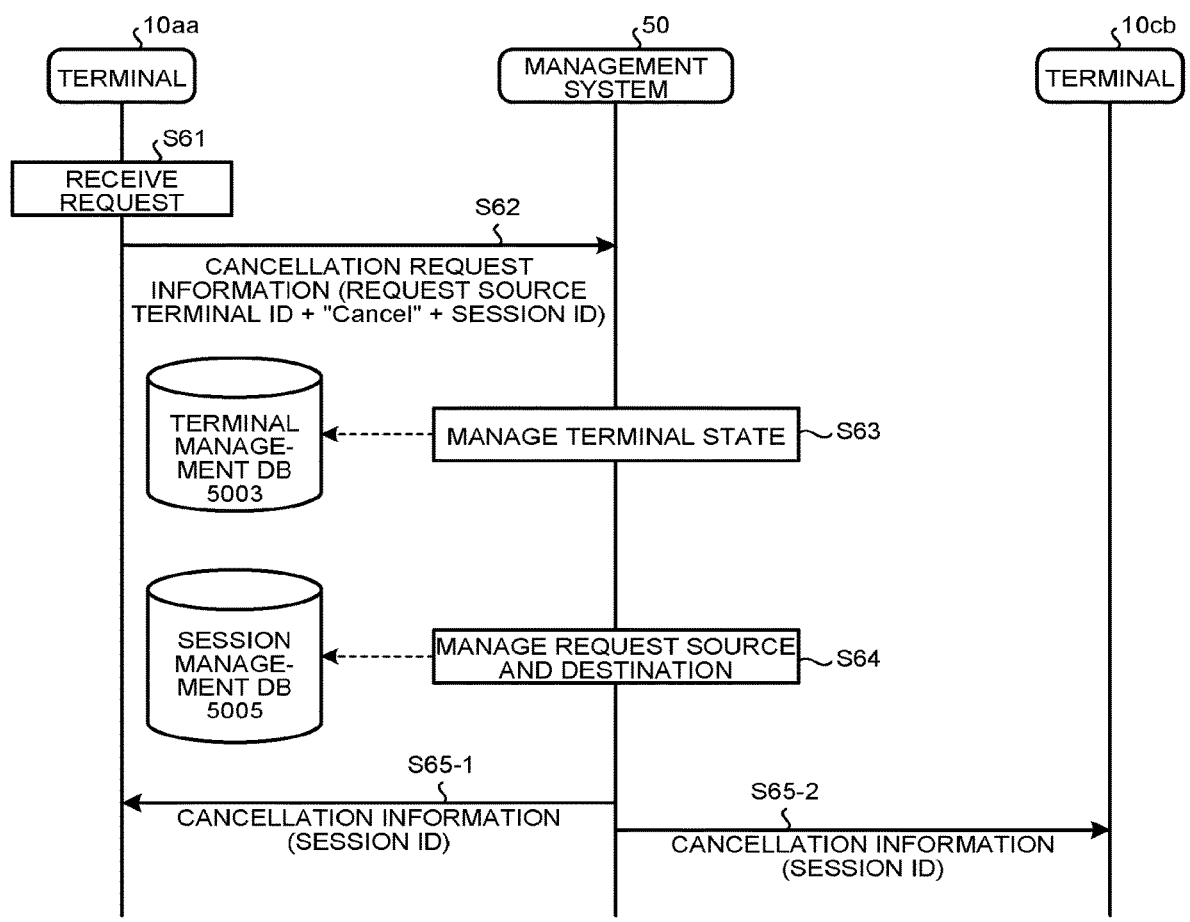
FIG. 28 is a sequence diagram that illustrates the process of cancelling a request for starting communication.
Figure 29:
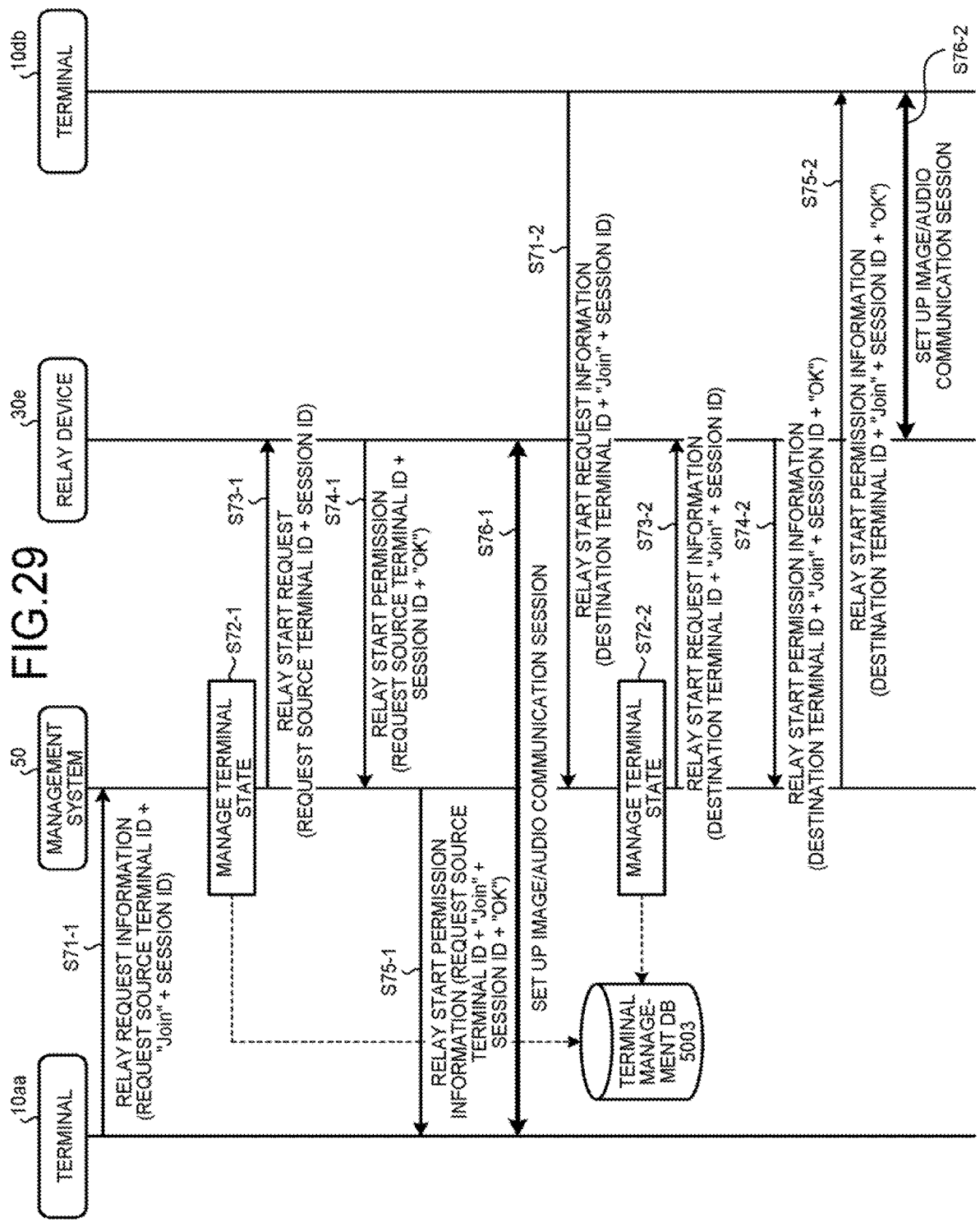
FIG. 29 is a sequence diagram that illustrates the process of requesting relay of telephone call data.
Figure 30:
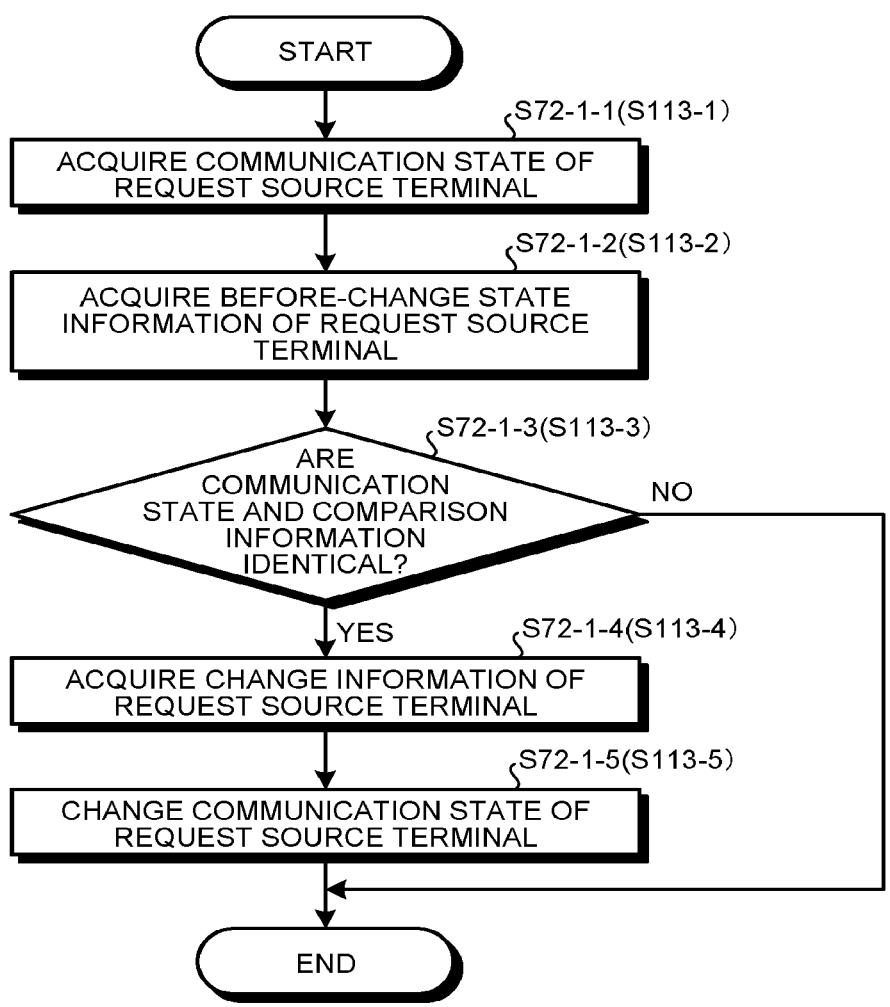
FIG. 30 is a flowchart that illustrates the process of changing a communication state.
Figure 31:
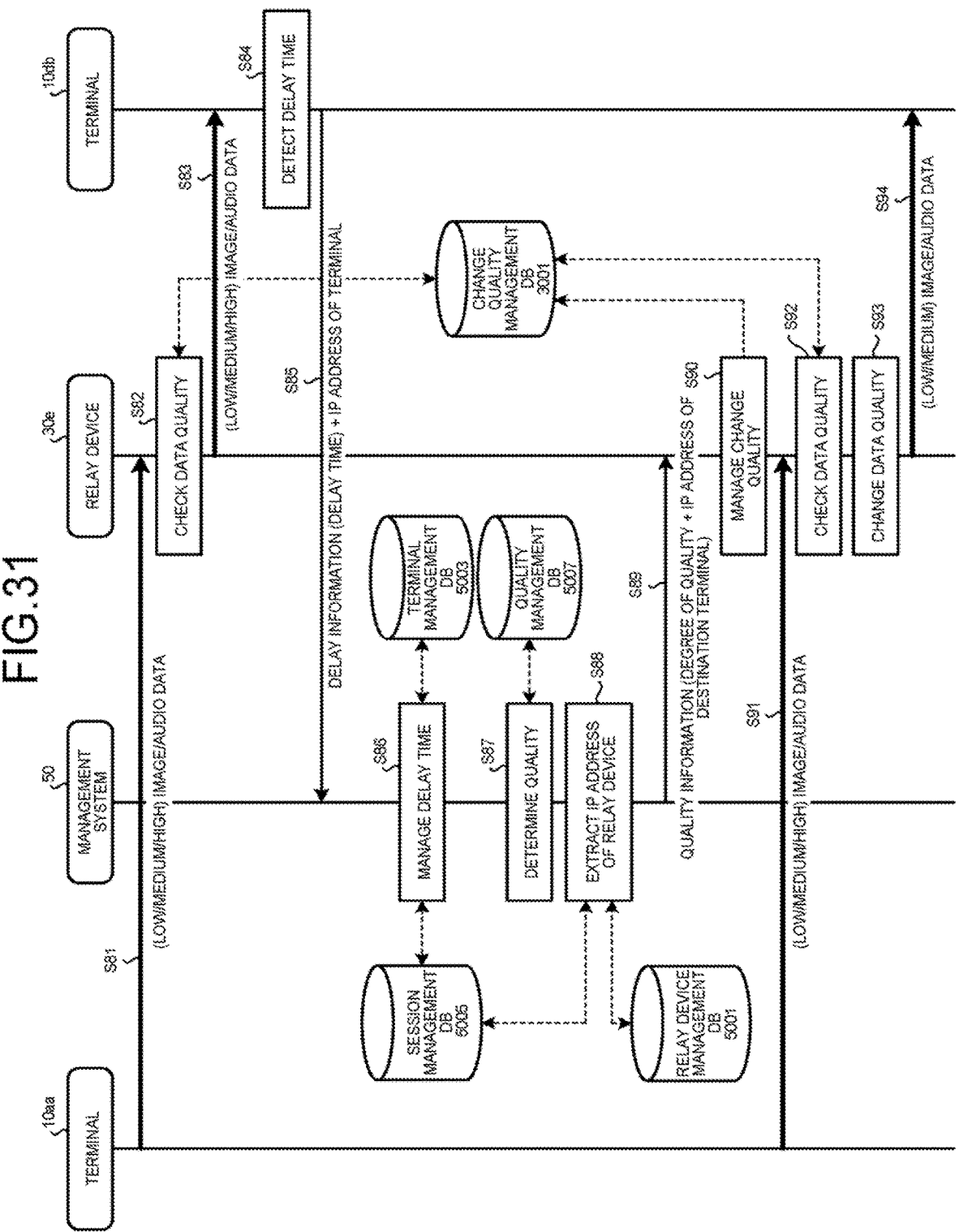
FIG. 31 is a sequence diagram that illustrates the process of transmitting/receiving image data and audio data between transmission terminals.
Figure 32:
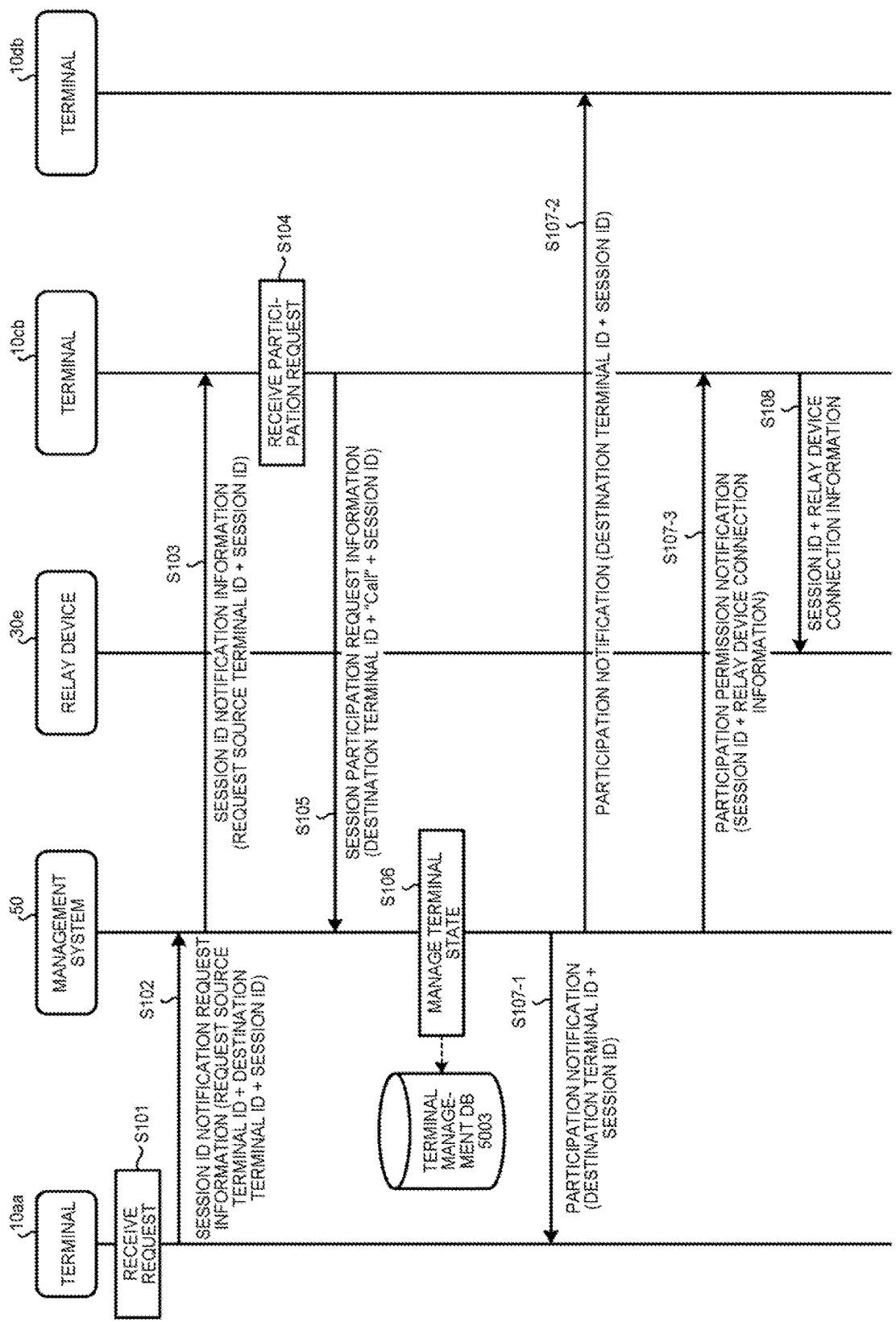
FIG. 32 is a sequence diagram that illustrates the process of requesting participation in a session for telephone call data.
Figure 33:
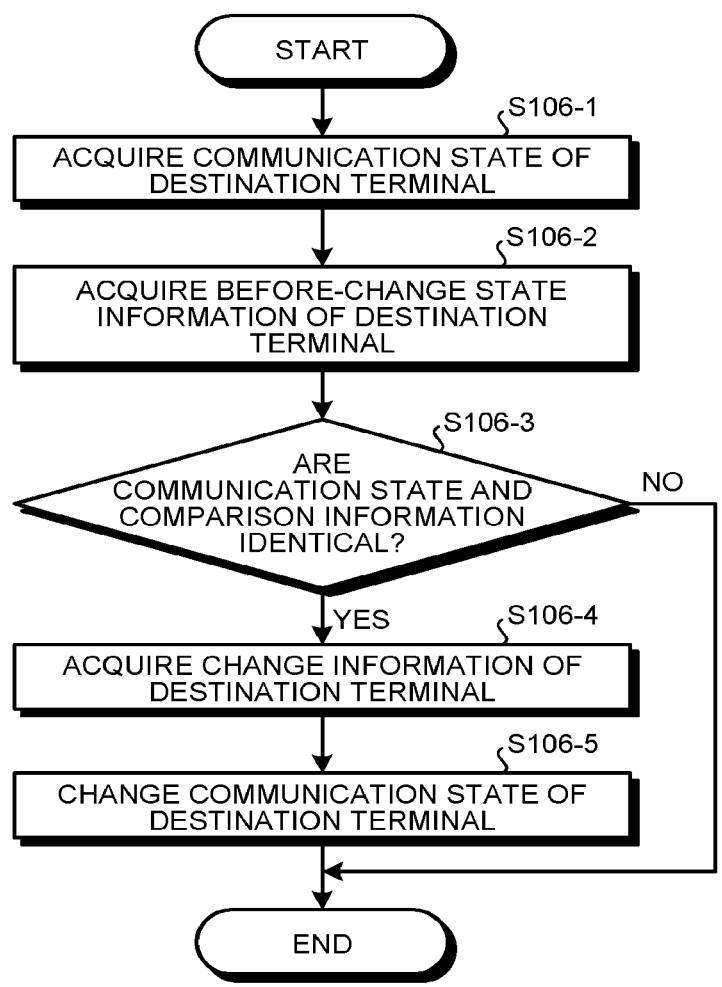
FIG. 33 is a process flowchart that illustrates the process of changing a communication state.
Figure 34:
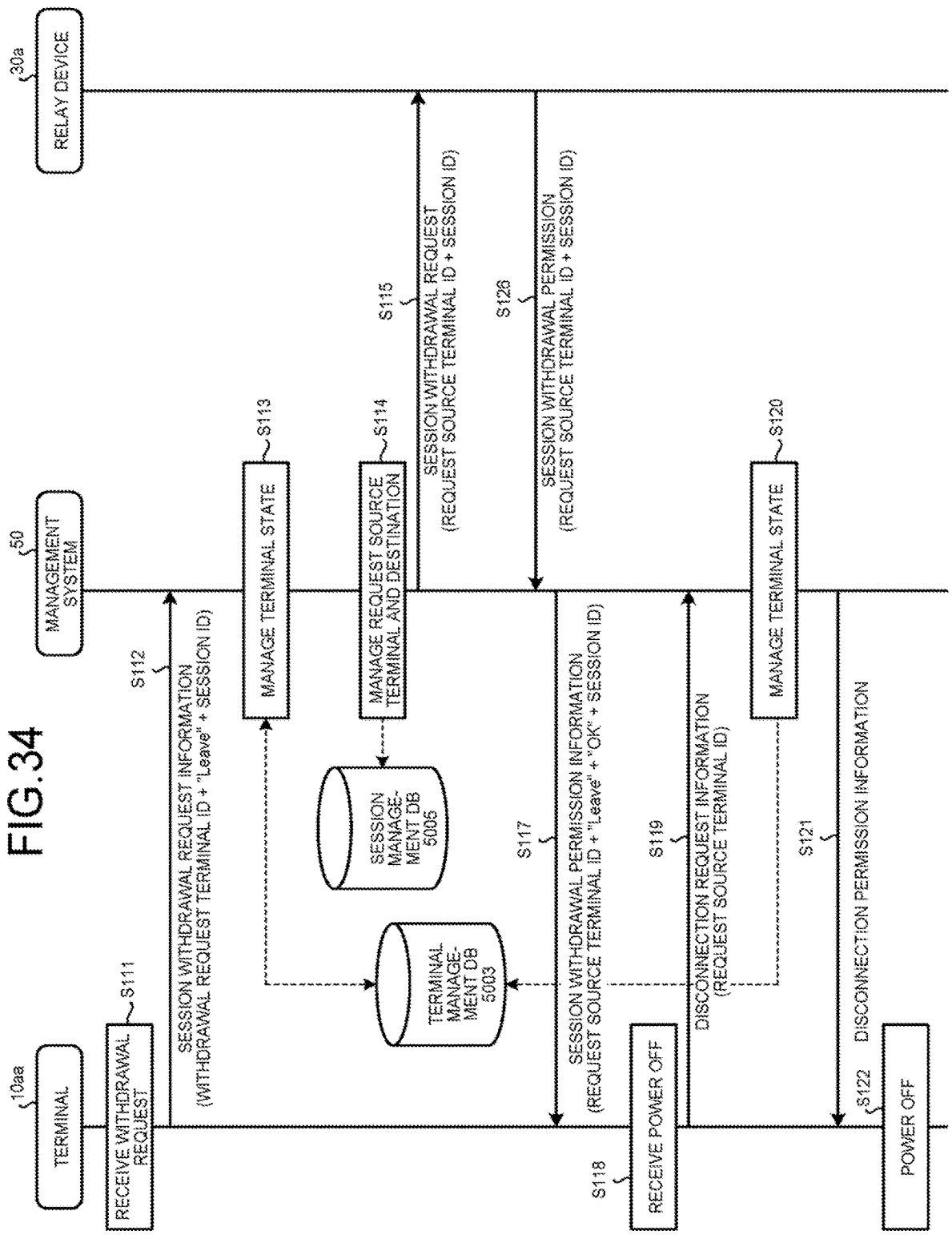
FIG. 34 is a sequence diagram that illustrates the process of requesting a withdrawal from a session used for telephone call data.
Figure 35:
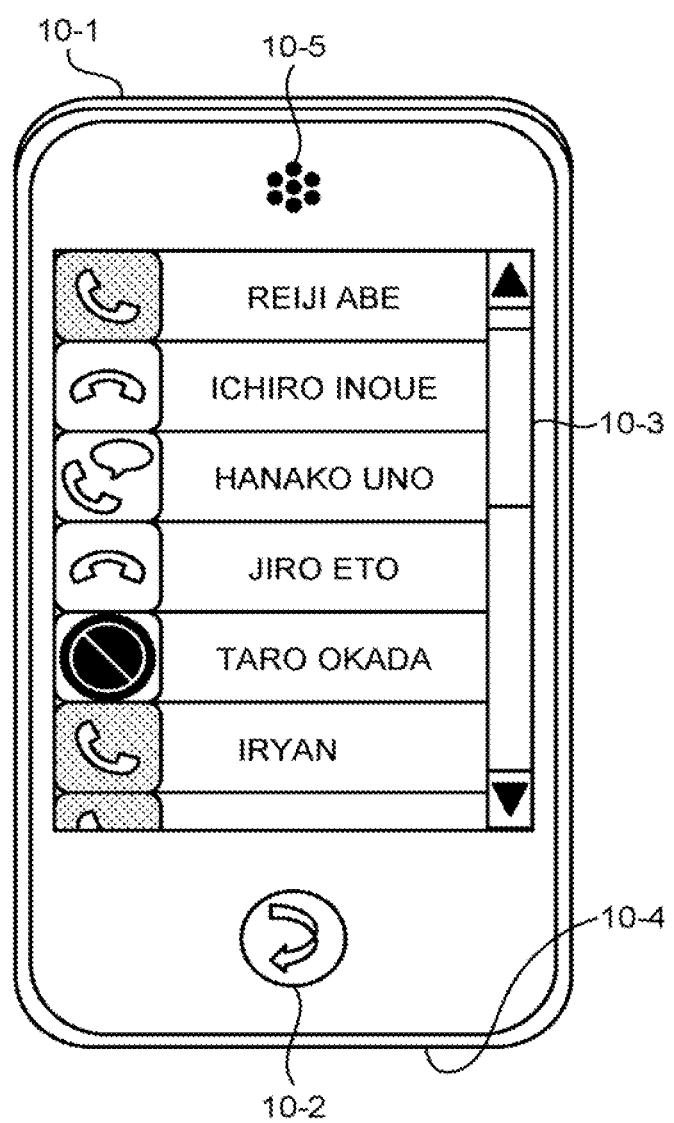
FIG. 35 is a conceptual diagram that illustrates a destination list according to another embodiment.
Figure 36:
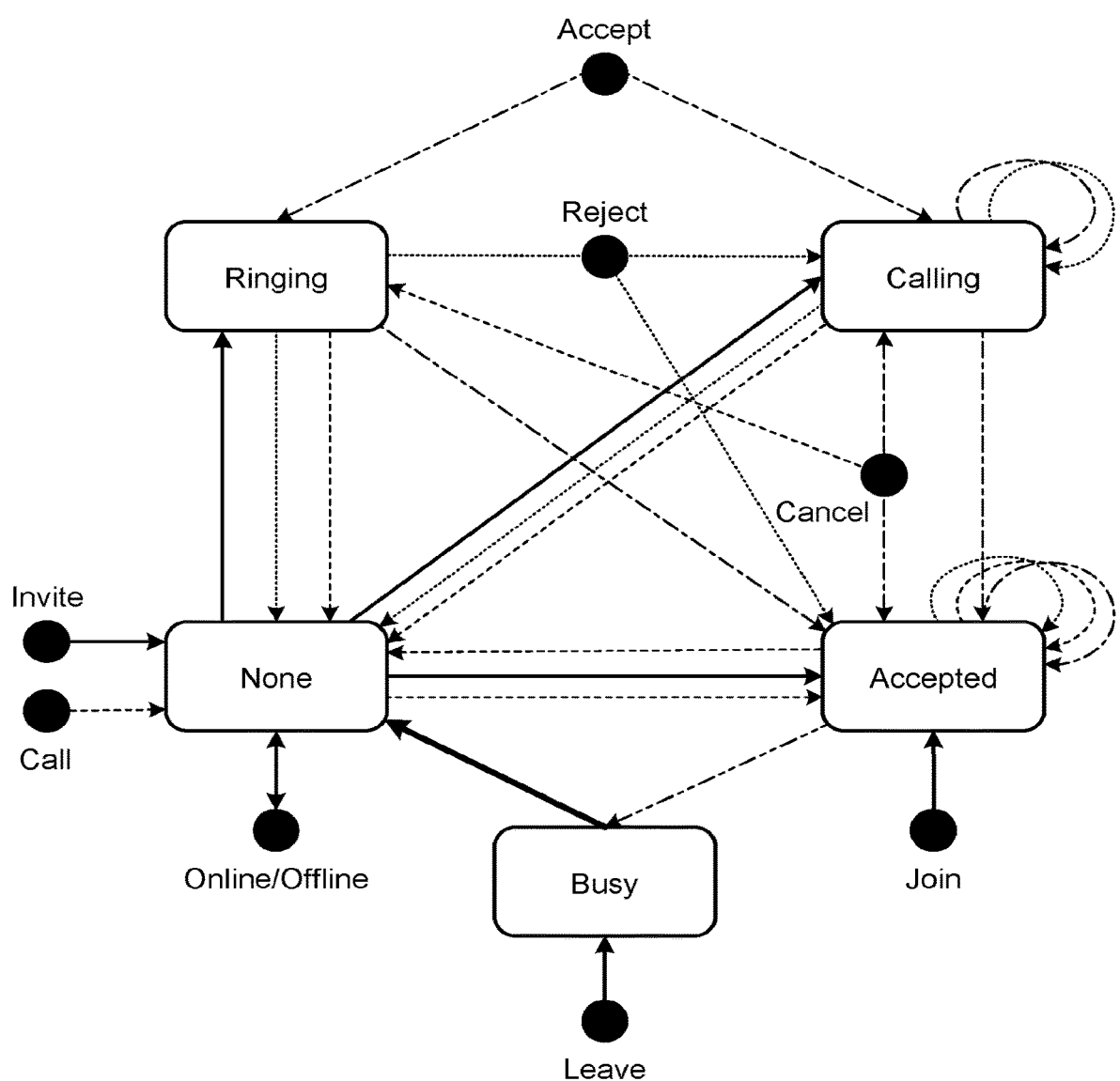
FIG. 36 is a state transition diagram that illustrates transitions among communication states.
Figure 38:
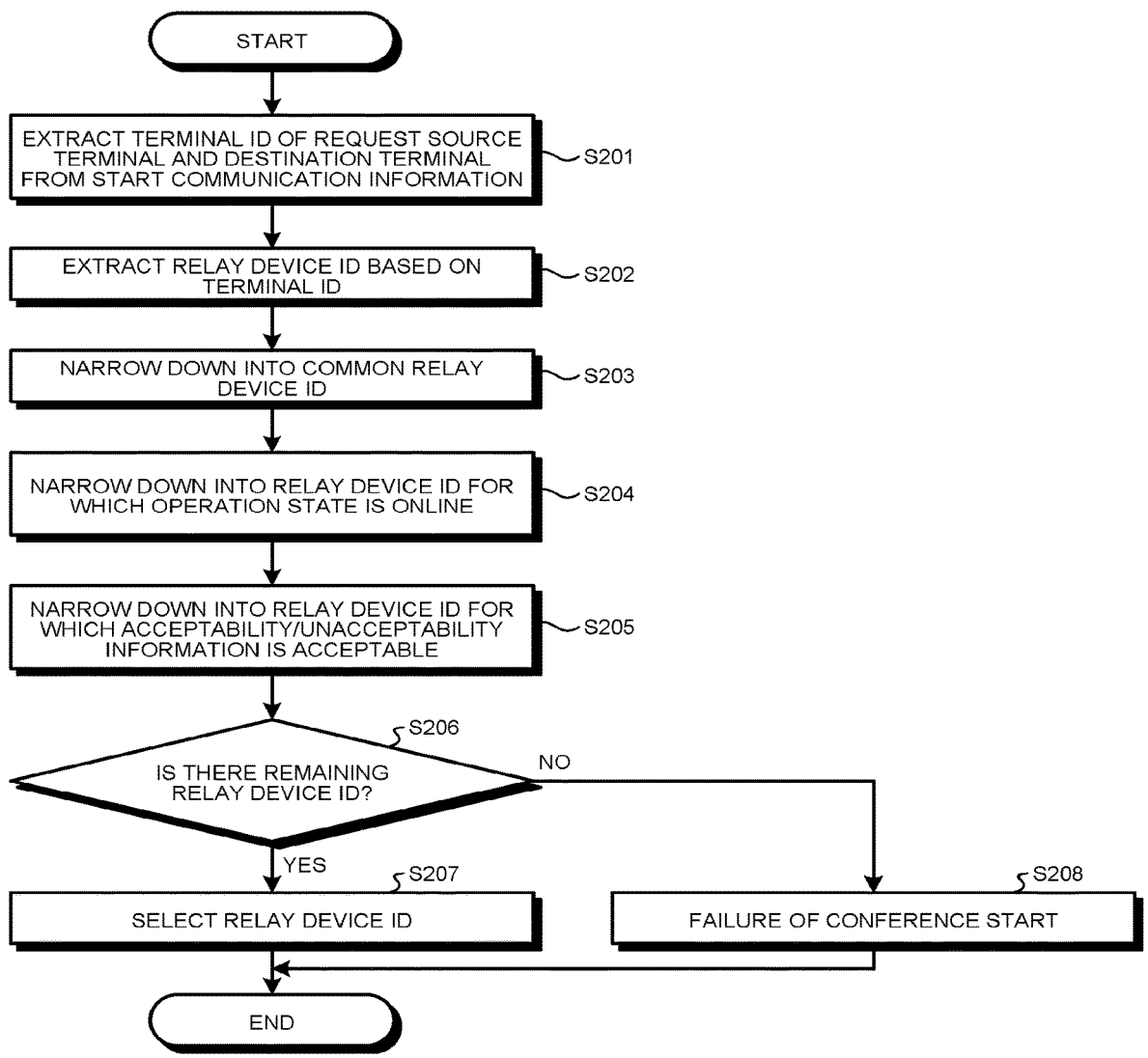
FIG. 38 is a process flowchart that illustrates the process of selecting a relay device.
Figure 39:
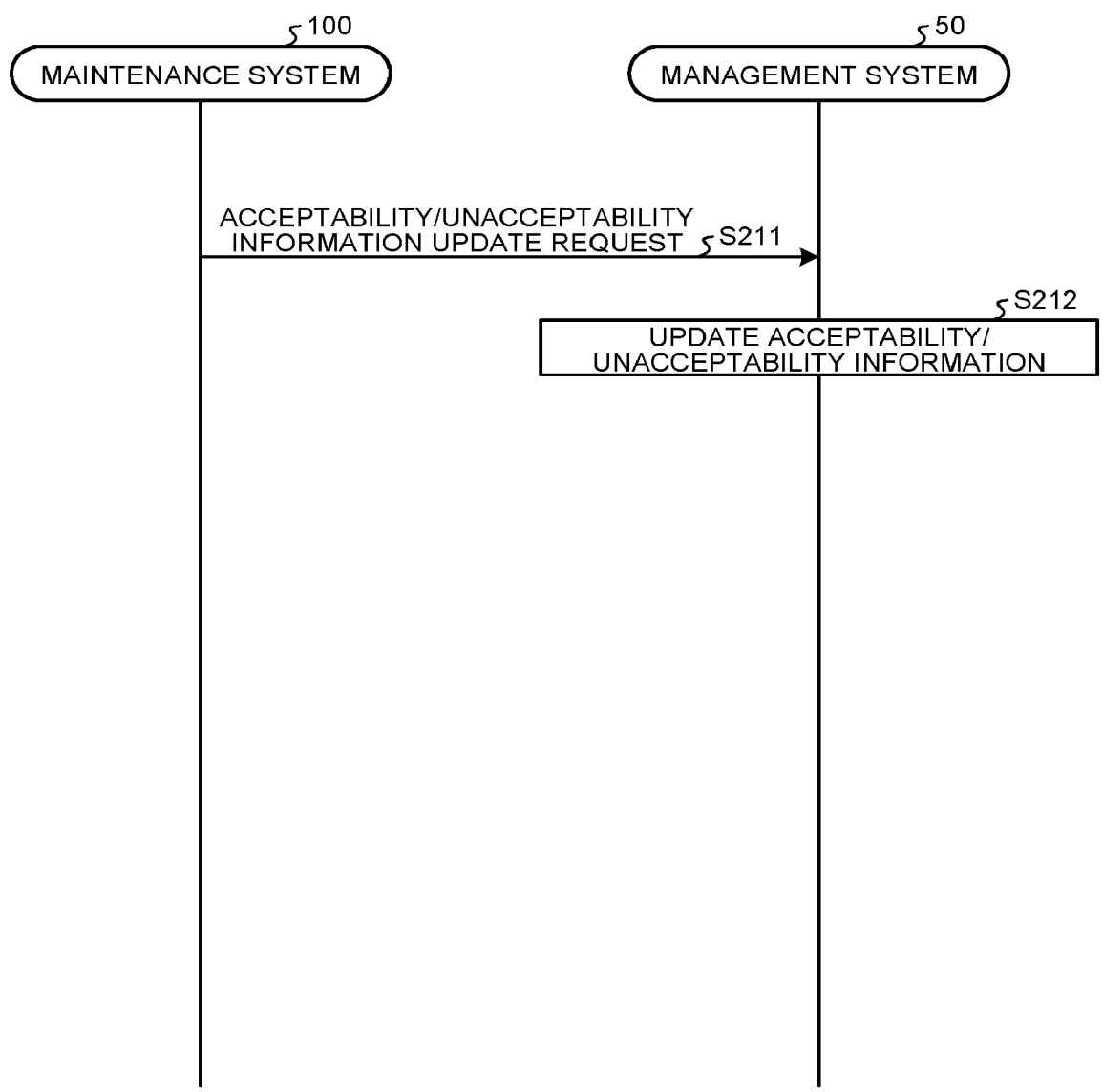
FIG. 39 is a sequence diagram that illustrates a process of updating acceptability/unacceptability information.

As above, the description of the configuration and the functions (or means) of the transmission system 1 according to this embodiment has been presented, and, subsequently, a processing method executed in the transmission system 1 according to this embodiment will be described with reference to FIGS. 19 to 39. FIG. 19 is a sequence diagram that illustrates the process of managing state information representing the operation state of each relay device. FIG. 20 is a conceptual diagram that illustrates transmission/reception states of image data, audio data, and various kinds of management information in the transmission system. FIG. 21 is a sequence diagram that illustrates the process of a preparation step for starting a telephone call between terminals. FIG. 22 is a conceptual diagram that illustrates a destination list according to this embodiment. FIG. 23 is a sequence diagram that illustrates the process of requesting start of communication. FIG. 24 is a process flowchart that illustrates the process of changing the communication state. FIG. 25 is a sequence diagram that illustrates the process of permitting a request for starting communication. FIG. 26 is a sequence diagram that illustrates the process of rejecting a request for starting communication. FIG. 27 is a process flowchart that illustrates the process of changing the communication state. FIG. 28 is a sequence diagram that illustrates the process of cancelling a request for starting communication. FIG. 29 is a sequence diagram that illustrates the process of requesting relay of telephone call data. FIG. 30 is a flowchart that illustrates the process of changing the communication state. FIG. 31 is a sequence diagram that illustrates the process of transmitting/receiving image data and audio data between terminals. FIG. 32 is a sequence diagram that illustrates the process of requesting participation in a session for telephone call data. FIG. 33 is a process flowchart that illustrates the process of changing the communication state. FIG. 34 is a sequence diagram that illustrates the process of requesting a withdrawal from a session used for telephone call data. FIG. 35 is a conceptual diagram that illustrates a destination list according to another embodiment. FIG. 36 is a state transition diagram that illustrates transitions among communication states. FIG. 37 is a diagram that illustrates an external appearance of a transmission terminal according to this embodiment. FIG. 38 is a process flowchart that illustrates the process of selecting a relay device. FIG. 39 is a sequence diagram that illustrates the process of updating the acceptability/unacceptability information.

First, the process of managing the state information representing the state of each relay device 30 that is transmitted from each relay device 30 to the management system 50 will be described with reference to FIG. 19. First, in each relay device 30, the state detecting unit 32 illustrated in FIG. 4 regularly detects the operation state of the relay device 30 that is the own device (Steps S1-1 to S1-4). Then, the transmission/reception unit 31 of each relay device 30 regularly transmits each state information to the management system 50 through the communication network 2 such that the management system 50 side can manage the operation state of each relay device 30 in real time (Steps S2-1 to S2-4). In each state information, a relay device ID of each relay device 30 and the operation state detected by the state detecting unit 32 of the relay device 30 relating to each relay device ID are included. In this embodiment, while the relay devices (30a, 30b, and 30d) are normally operated to be represented as "online", there are cases where the relay device 30c is operated but is represented as "offline" due to a defect occurring in a program used for executing the relay operation of the relay device 30c.

Next, in the management system 50, each state information transmitted from each relay device 30 is received by the transmission/reception unit 51, and the state information is stored and managed for each relay device ID in the relay device management table (see FIG. 9) of the nonvolatile storage unit 5000 through the storing/reading processing unit 59 (Steps S3-1 to S3-4). In this way, in the relay device management table as illustrated in FIG. 9, one operation state of "online", "offline" and "Out of order" is stored and managed for each relay device ID. At this time, for each relay device ID, reception date and time at which the state information is received by the management system 50 is also stored and managed. In a case where the state information is not transmitted from the relay device 30, the field part of the operation state and the field part of the reception date and time in each record of the relay device management table illustrated in FIG. 9 are configured as blanks or represent the operation state and the reception date and time at the time of previous reception.

Next, the concept of the transmission/reception states of image data, audio data, and various kinds of management information in the transmission system 1 will be described with reference to FIG. 20. As illustrated in FIG. 20, in the transmission system 1, a management information session sei used for transmitting/receiving various kinds of management information is set up among terminals 10A, 10B, and 10C through the management system 50. In addition, among the terminals 10A, 10B, and 10C, four sessions used for transmitting/receiving four types of data including image data having high resolution, image data having medium resolution, image data having low resolution, and audio data are set up through the relay device 30. Here, the four sessions are represented together as an image/audio/data session sed.

Next, the transmission/reception process of each management information in a preparation step before the start of a telephone call from the terminal 10aa will be described with reference to FIG. 21. In FIG. 21, the process of transmission/reception of various kinds of management information is executed by using management information sessions sei.

First, when a user using the terminal 10aa turns the power switch 109 illustrated in FIG. 2 to the On state, the operation input receiving unit 12 illustrated in FIG. 4 accepts power on and turns on the power (Step S21). Then, the login requesting unit 13 automatically transmits login request information representing a login request from the transmission/reception unit 11 to the management system 50 through the communication network 2 (Step S22). In this login request information, a terminal ID used for identifying the terminal 10aa that is the own terminal as a request source and a password are included. The terminal ID and the password are data that is read from the nonvolatile storage unit 1000 through the storing/reading processing unit 19 and is transmitted to the transmission/reception unit 11. When the login request information is transmitted from the terminal 10aa to the management system 50, the management system 50 that is the reception side can acquire the IP address of the terminal 10aa that is the transmission side.

Next, the terminal authentication unit 52 of the management system 50 searches the terminal authentication management table (see FIG. 10) of the nonvolatile storage unit 5000 using the terminal ID and the password included in the login request information received through the transmission/reception unit 51 as a search key and determines whether or not the same terminal ID and the same password are managed in the terminal authentication management DB 5002, thereby executing terminal authentication (Step S23).

In a case where the same terminal ID and the same password are managed by the terminal authentication unit 52, and thus, a login request from the terminal 10 having proper use authorization is determined, the state managing unit 53 stores reception date and time at which the login request information has been received and the IP address of the terminal 10aa in the terminal management table (see FIG. 11) in association with each other for each record in which the terminal ID of the terminal 10aa and the destination name are represented (Step S24-1). In this way, in the terminal management table illustrated in FIG. 11, reception date and time "2009. 11. 10. 13:40" and a terminal IP address of "1.2.1.3" are managed in association with each other in the terminal ID "01aa".

Subsequently, the state setting unit 53a of the state managing unit 53 sets the operation state of the terminal 10aa as "online" and the communication state "None" and stores the operation state and the communication state in the terminal management table (see FIG. 11) in association with each other for each record in which the terminal ID of the terminal 10aa and the destination name are represented (Step S24-2). In this way, in the terminal management table illustrated in FIG. 11, the operation state "online" and the communication state "None" are managed in the terminal ID of "01aa" in association with each other.

Then, the transmission/reception unit 51 of the management system 50 transmits authentication result information in which an authentication result acquired by the terminal authentication unit 52 is represented to the request source terminal (terminal 10aa) that has requested the login through the communication network 2 (Step S25). In this embodiment, the description of a case where a terminal having proper use authorization is determined by the terminal authentication unit 52 will be continued as below.

When the terminal 10aa receives authentication result information in which a result of the determination of a terminal having proper use authorization is represented, the transmission/reception unit 11 transmits destination list request information in which an indication of requesting for a destination list is represented to the management system 50 through the communication network 2 (Step S26). In this way, the transmission/reception unit 51 of the management system 50 receives the destination list request information.

Next, the terminal extracting unit 54 searches the destination list management table (see FIG. 12) using a terminal ID "01aa" of the request source terminal (terminal 10aa) that has requested the login as a search key and extracts terminal IDs of candidates for the destination terminal that can have a telephone call with the request source terminal (terminal 10aa) by reading the terminal IDs (Step S27). In addition, the terminal extracting unit 54 searches the terminal management table (see FIG. 11) using each of the extracted terminal IDs as a search key and extracts a destination name corresponding to the terminal ID by reading the destination name. Here, terminal IDs ("01ab", "01ba", . . . , "01db", . . . ) of the destination terminals (10ab, 10ba, . . . , 10db, . . . ) corresponding to the terminal ID "01aa" of the request source terminal (terminal 10aa) and terminal names ("Japan Tokyo Office terminal AB", "Japan Osaka Office terminal BA", . . . "U.S. Washington Office terminal DB", . . . ) corresponding thereto are extracted.

Next, the transmission/reception unit 51 of the management system 50 reads data (data of a destination list range 1100-1 part illustrated in FIG. 22) of the destination list range from the storage unit 6000 through the storing/reading processing unit 59 (Step S28) and transmits the destination list range and "destination list information (a destination list range, a terminal ID, and a destination name)" including the terminal ID and the destination name extracted by the terminal extracting unit 54 to the request source terminal (terminal 10aa) (Step S29). In this way, in the request source terminal (terminal 10aa), the transmission/reception unit 11 receives the destination list information, and the storing/reading processing unit 19 stores the destination list information in the volatile storage unit 1100 (Step S30).

In this way, according to this embodiment, the destination list information is not managed by each terminal 10, but the management system 50 integrally manages the destination list information of all the terminals. Thus, also in a case where a new terminal 10 is included in the transmission system 1, a case where a terminal 10 of a new model replacing the terminal 10, which has already been included, is included, or a case where the display or the like of the destination list range is changed, such cases can be responded together by the management system 50 side, and accordingly, labor required for changing the destination list information on each terminal 10 side can be omitted.

The terminal state acquiring unit 55 of the management system 50 searches the terminal management table (see FIG. 11) using the terminal IDs ("01ab", "01ba", . . . , "01db", . . . ) of candidates for the destination terminal that are extracted by the terminal extracting unit 54 as a search key and reads the corresponding operation state for each of the terminal IDs extracted by the terminal extracting unit 54, thereby acquiring the operation states of the terminals (10ab, 10ba, . . . , 10db, . . . ) as destination candidates (Step S31).

Next, the transmission/reception unit 51 transmits the "terminal state information" including the terminal ID "01ab" as the search key used in Step S27 described above and the operation state "offline" of the corresponding destination terminal (terminal 10ab) to the request source terminal (terminal 10aa) through the communication network (Step S32). In addition, as part of the same Step S32, the transmission/reception unit 51 individually transmits the remaining "terminal state information" such as "terminal state information" including the terminal ID "01ba" and the operation state "online (Calling)" of a corresponding destination terminal (terminal 10ba) and the like to the request source terminal (terminal 10aa).

Next, the storing/reading processing unit 19 of the request source terminal (terminal 10aa) sequentially stores the terminal state information received from the management system 50 in the volatile storage unit 1100 (Step S33). Accordingly, by receiving each terminal state information, the request source terminal (terminal 10aa) can acquire the current-time point operation states of the terminal 10ab and the like, which are candidates for the destination terminal, that can have a telephone call with the request source terminal (terminal 10aa).

Next, the destination list generating unit 20 of the request source terminal (terminal 10aa) generates a destination list on which the states of the terminals 10 as the destination candidates are reflected based on the destination list information and the terminal state information stored in the volatile storage unit 1100 and controls timing at which the destination list is displayed on the display 120 illustrated in FIG. 2 by the display control unit 16 (Step S34).

As above, as illustrated in FIG. 22, a destination list having a state in which an icon 1100-3a and the like, on which each destination name 1100-2 or the like and each state information are reflected, are displayed in the destination list range 1100-1 is displayed on the display 120aa.

Referring back to FIG. 21, the terminal extracting unit 54 of the management system 50 searches the destination list management table (see FIG. 12) using a terminal ID "01aa" of the request source terminal (terminal 10aa) that has requested login as a search key and extracts terminal IDs of other request source terminals each having the terminal ID "01aa" of the request source terminal (terminal 10aa) described above registered as a candidate for the destination terminal (Step S35). In the destination list management table illustrated in FIG. 12, the extracted terminal IDs of the other request source terminals are "01ab", "01ba", and "01db".

Next, the terminal state acquiring unit 55 of the management system 50 searches the terminal management table (see FIG. 11) using the terminal ID "01aa" of the request source terminal (terminal 10aa) that has requested the login as a search key and acquires the operation state of the request source terminal (terminal 10aa) that has requested the login (Step S36).

Then, the transmission/reception unit 51 transmits "terminal state information" in which the terminal ID "01aa" and the operation state "online" of the request source terminal (terminal 10aa) that are acquired in Step S36 described above to the terminals (10ba and 10db) having the operation state of "online" in the terminal management table (see FIG. 11) among the terminals (10ab, 10ba, and 10db) relating to the terminal IDs ("01ab", "01ba", and "01db") extracted in Step S35 described above (Steps S37-1 and S37-2). When the transmission/reception unit 51 transmits the terminal state information to the terminals (10ba and 10db), the IP addresses of the terminals managed by the terminal management table illustrated in FIG. 11 are referred to based on the terminal IDs ("01ba" and "01db"). In this way, the terminal ID "01aa" and the operation state "online" of the request source terminal (terminal 10aa) that has requested the login can be transmitted to other destination terminals (10db and 10ba) that can have a telephone call with the request source terminal (terminal 10aa) that has requested the login as the destination.

Also at another terminal 10, similar to Step S21 described above, when a user turns the power switch 109 illustrated in FIG. 3 to the On state, the operation input receiving unit 12 illustrated in FIG. 4 accepts power on and executes a process similar to the process of Steps S22 to S38-1 and S38-2 described above, and thus, the description thereof will not be presented.

Subsequently, the process executed in a case where a terminal requests the start of communication with another terminal will be described with reference to FIG. 23. In FIG. 23, all the processes of transmitting/receiving various kinds of management information by using the management information session sei are illustrated. In this embodiment, the request source terminal (terminal 10aa) can have a telephone call with at least one of the terminals (10aa, 10bb, 10cb, and 10db) of which the operation state is "online", and the communication state is "None" based on the terminal state information received in Step S32 described above among the terminals 10 as candidates for the destination. Thus, hereinafter, a case will be described in which a user using the request source terminal (terminal 10aa) selects to start a telephone call with destination terminals (terminals 10bb, 10cb, and 10db).

First, when the user using the request source terminal (terminal 10aa) selects the destination terminal (terminal 10bb), the destination terminal (terminal 10cb), and the destination terminal (terminal 10db) by pressing the operation button 108 illustrated in FIG. 2, the operation input receiving unit 12 illustrated in FIG. 4 receives a request for starting a telephone call with the terminal 10bb, the terminal 10cb, and the terminal 10db (Step S41). Then, the transmission/reception unit 11 of the terminal 10aa transmits start request information including the terminal ID "01aa" of the request source terminal (terminal 10aa), the terminal ID "01bb" of the destination terminal (terminal 10bb), the terminal ID "01cb" of the destination terminal (terminal 10cb), the terminal ID "01db" of the destination terminal (terminal 10db), and the change request information "Invite" indicating requesting the start of a telephone call to the management system 50 (Step S42). In this way, the transmission/reception unit 51 of the management system 50 receives the start request information described above and acquires the IP address "1.2.1.3" of the request source terminal (terminal 10aa) that is a transmission source.

Then, the state managing unit 53, based on the terminal ID "01aa" of the request source terminal (terminal 10aa), the terminal ID "01bb" of the destination terminal (terminal 10bb), the terminal ID "01cb" of the destination terminal (terminal 10cb), and the terminal ID "01db" of the destination terminal (terminal 10db) included in the start request information, changes a field part of the communication state of each record in which the terminal ID "01aa", the terminal ID "01bb", the terminal ID "01cb", or the terminal ID "01db" is included in the terminal management table (see FIG. 11) (Step S43).

Here, the process of Step S43 will be described in detail with reference to FIG. 24. In this embodiment, the state managing unit 53 changes the communication state of the terminal 10 based on a communication state change rule illustrated in a state transition diagram illustrated in FIG. 36. For example, in a case where the change request information "Cancel" is received, when the communication state of the terminal 10 is "Ringing" or "Calling", the communication state is changed to "None", and, when the communication state of the terminal 10 is "Accepted", the communication state is maintained to be "Accepted". In this embodiment, in order to change the state using the state managing unit 53, while an example using the state change management table (see FIGS. 16, 17, and 18) is described, the method of changing the state is not limited thereto. In such a case, there may be a rule in the management system program that enables the state managing unit 53 to change the communication state based on the communication state transition rule represented in the state transition diagram of FIG. 36.

Figure 5:
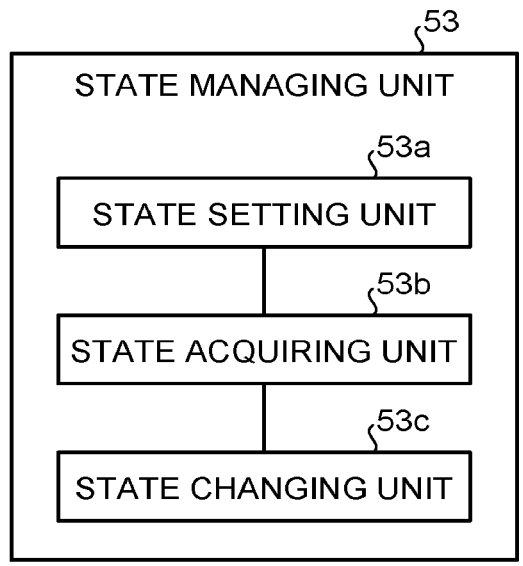
FIG. 5 is a functional block diagram that illustrates a state managing unit 53 illustrated in FIG. 4 in detail.
Figure 6:
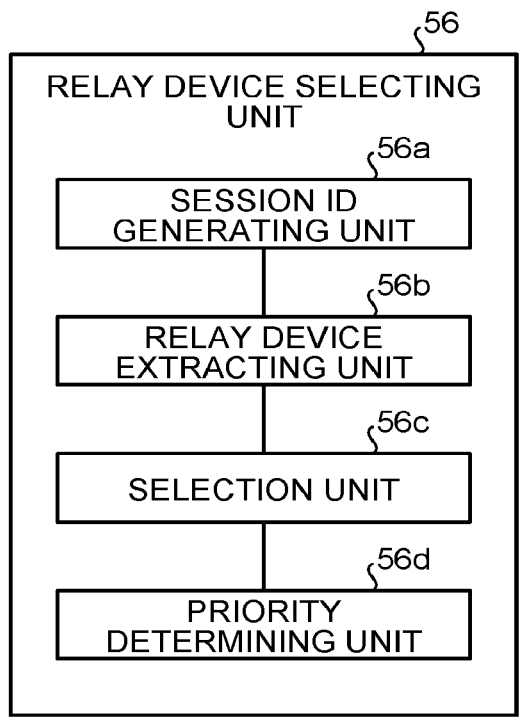
FIG. 6 is a functional block diagram that illustrates a relay device selecting unit 56 illustrated in FIG. 4 in detail.

First, the state acquiring unit 53b of the state managing unit 53 illustrated in FIG. 5 acquires the communication states of terminals managed in the terminal management DB (Step S43-1). In this case, the change request information "Invite" received by the transmission/reception unit 51 is determined to be specific change request information by the change request information determining unit 63 in advance. Based on this, the state acquiring unit 53 acquires not only the communication state of the request source terminal (terminal 10aa) but also the communication states of the destination terminals (terminals 10bb, 10cb, and 10db). In this case, the state acquiring unit 53b searches the terminal management table (see FIG. 11) using the terminal ID "01aa" of the request source terminal (terminal 10aa) as a search key and acquires the communication state "None" of the request source terminal (terminal 10aa) that has requested the start of a telephone call. Similarly, the communication state "None" of the destination terminal (terminal 10bb), the communication state "None" of the destination terminal (terminal 10cb), and the communication state "None" of the destination terminal (terminal 10db) are acquired.

Next, the state changing unit 53c of the state managing unit 53 acquires the before-change state information of the request source terminal and the destination terminals corresponding to the change request information "Invite" (Step S43-2). In this case, the state changing unit 53c searches the state change management table (see FIG. 17) using the change request information "Invite" and the terminal information "request source" as a search key and acquires the before-change state information "None" of the request source terminal. Similarly, the state changing unit 53c searches the state change management table (see FIG. 17) using the change request information "Invite" and the terminal information "destination" as search keys and acquires the before-change state information "None" of the destination terminals.

Next, the state changing unit 53c compares the communication state acquired by the state acquiring unit 53b with the before-change state information acquired by the state changing unit 53c and determines whether or not the commutation state and the before-change state information are identical (Step S43-3). In this case, the state changing unit 53c compares the communication state "None" of the request source terminal (terminal 10aa) acquired by the state acquiring unit 53b with the before-change state information "None" of the request source terminal acquired by the state changing unit 53c and determines whether or not these are identical. Similarly, the state changing unit 53c respectively compares the communication state of the destination terminal (terminal 10bb), the communication state of the destination terminal (terminal 10cb), and the communication state of the destination terminal (terminal 10db) acquired by the state acquiring unit 53b with the before-change state information of the destination terminals acquired by the state changing unit 53c and determines whether or not these are identical.

In a case where the communication state and the before-change state information of the request source terminal are determined to be identical, and all the communication states of the destination terminals and the before-change state information are determined to be identical in Step S43-3 (Yes in Step S43-3), the state changing unit 53c acquires the change information of the request source terminal and the destination terminals corresponding to the change request information "Invite" (Step S43-4). In this case, the state changing unit 53c searches the state change management table (see FIG. 17) using the change request information "Invite" and the terminal information "request source" as search keys and acquires change information "Calling" of the request source terminal. Similarly, the state changing unit 53c searches the state change management table (see FIG. 17) using the request information "Invite" and the terminal information "destination" as search keys and acquires change information "Ringing" of the destination terminals.

Next, based on the terminal ID "01aa" of the request source terminal (terminal 10aa), the terminal ID "01bb" of the destination terminal (terminal 10bb), the terminal ID "01cb" of the destination terminal (terminal 10cb), and the terminal ID "01db" of the destination terminal (terminal 10db), the state changing unit 53c changes a field part of the communication state of each record in which the terminal ID "01aa", the terminal ID "01bb", the terminal ID "01cb", or the terminal ID "01db" is included in the terminal management table (see FIG. 11) (Step S43-5). In this case, the field part of the communication state of the record in which the terminal ID "01aa" is included in the terminal management table is changed to "Calling" based on the acquired change information of the request source terminal. Similarly, a field part of the communication state of a record in which the terminal ID "01bb", a field part of the communication state of a record in which the terminal ID "01cb" is included, and a field part of the communication state of a record in which the terminal ID "01db" is included in the terminal management table are changed to "Ringing" based on the acquired change information of the destination terminals. In addition, in order to execute call control of communication between the request source terminal (terminal 10aa) and the destination terminals (terminals 10bb, 10cb, and 10db), the determining unit 61 determines a countermeasure (see Steps S48-1, S48-2, and S48-3) indicating transmission of the start request information to each destination terminal.

On the other hand, in a case where the communication state and the before-change state information of the request source terminal are determined not to be identical, or the communication state and the before-change state information of any one of the destination terminals are determined not to be identical in Step S43-3 (No in Step S43-3), the state changing unit 53c does not change the field part of the communication state of each record in which the terminal ID "01aa", the terminal ID "01bb", the terminal ID "01cb", or the terminal ID "01db" is included in the terminal management table (see FIG. 11). The reason for this is that one side of the request source terminal (terminal 10aa) and the destination terminals (terminals 10bb, 10cb, and 10db) is not in the state being able to start a telephone call. In addition, the determining unit 61 determines a countermeasure indicating the generation of a predetermined error message and the transmission thereof to the source request terminal (terminal 10aa). Subsequently, the transmission/reception unit 51 generates a predetermined error message and transmits the generated error message to the source request terminal (terminal 10aa), thereby completing the process.

Next, referring back to FIG. 23, for a case where a countermeasure indicating the transmission of the start request information to each destination terminal is determined by the determining unit 61, a subsequent process will be described. First, the session ID generating unit 56a generates a session ID "se1" used for identifying a session (telephone call data session sed) used for executing communication with each destination terminal requested by the request source terminal (terminal 10aa) (Step S44). When the session ID is generated, the session managing unit 57 stores the session ID "se1" and the number "3" of destination terminals in the volatile storage unit 5100. The number of destination terminals is used for determining whether or not the change request information "Reject" has been received from all the destination terminals later in a case where the change request information "Reject" indicating rejection of the start of communication is received.

Subsequently, the relay device selecting unit 56 of the management system 50, based on the relay device management DB 5001 and the relay device selection management DB, selects a relay device 30 used for relaying a telephone call between the request source terminal (terminal 10aa) and the destination terminals (terminals 10bb, 10cb, and 10db) (Step S45).

Here, the process of Step S45 will be described in detail with reference to FIG. 38.

First, the relay device extracting unit 56b extracts the terminal ID "01aa" of the request source terminal (terminal 10aa), the terminal ID "01bb" of the destination terminal (terminal 10bb), the terminal ID "01cb" of the destination terminal (terminal 10cb), and the terminal ID "01db" of the destination terminal (terminal 10db) included in the start communication information transmitted from the request source terminal (10aa) (Step S201).

Subsequently, the relay device extracting unit 56b searches the relay device selection management table (see FIG. 15) based on the terminal ID "01aa", the terminal ID "01bb", the terminal ID "01cb", and the terminal ID "01db" that have been extracted, thereby extracting relay device IDs ("111a1, 111a2, 111e1, and 111e2", "111b1, 111b2, 111e1, and 111e2", "111c1, 111c2, 111e1, and 111e2", and "111d1, 111d2, 111e1, and 111e2") respectively corresponding to the terminals (10aa, 10bb, 10cb, and 10db) (Step S202).

Subsequently, the relay device extracting unit 56b narrows downs the extracted relay device IDs corresponding to the terminals to relay device IDs ("111e1 and 111e2") that are common to the terminals (Step S203).

Subsequently, the selection unit 56c narrows down the relay device IDs ("111e1 and 111e2") that have been narrowed down into relay device IDs each having the operation state of "online" by referring to the operation states of the relay devices 30 managed in the relay device management table (FIG. 9) (Step S204). In the example illustrated in FIG. 9, since all the operation states of the relay devices 30 of the relay device IDs ("111e1 and 111e2") are "online", the narrowed-down relay device IDs are maintained to be "111e1 and 111e2".

Subsequently, the selection unit 56c narrows down the narrowed-down relay device IDs ("111e1 and 111e2") into a relay device ID having the acceptability/unacceptability information of "acceptable" by referring to the acceptability/unacceptability information of the relay devices 30 managed in the relay device management table (FIG. 9) (Step S205). In the example illustrated in FIG. 9, the relay device 30 having the relay device ID ("111e1") has the acceptability/unacceptability information of "unacceptable", and the relay device 30 having the relay device ID ("111e2") has the acceptability/unacceptability information of "acceptable", and accordingly, the narrowed-down relay device ID is "111e2".

As a result, in a case where there are remaining narrowed-down relay device IDs (Yes in Step S206), the selection unit 56c selects any one of the remaining relay device IDs (Step S207) and sets a relay device corresponding to the selected relay device ID as a relay device used for relaying a telephone call. In this embodiment, description for a case where the relay device 30e2 is selected by the selection unit 56c will be continued as below.

On the other hand, in a case where there is no narrowed-down relay device ID (No in Step S206), the selection unit 56c cannot select a relay device ID, and the start of a conference fails (Step S208).

When the process of selecting the relay device 30 is completed, the session managing unit 57 stores and manages the terminal ID "01aa" of the request source terminal (terminal 10aa), the terminal ID "01bb" of the destination terminal (terminal 10bb), the terminal ID "01cb" of the destination terminal (terminal 10cb), and the terminal ID "01db" of the destination terminal (terminal 10db), and the relay device ID "111e2" of the selected relay device in the field parts of the request source terminal ID, the destination terminal ID, and the relay device ID of a record in which the session ID "se1" is included in the session management table (see FIG. 13) of the nonvolatile storage unit 5000 (Step S46).

Next, the transmission/reception unit 51 illustrated in FIG. 4 transmits the session ID generated by the session ID generating unit 56a and the relay device connection information used for a connection to the relay device 30e2 selected by the selection unit 56c to the request source terminal (terminal 10aa) through the communication network (Step S47). In this relay device connection information, the IP address "1.1.1.4" of the relay device 30e2, authentication information, a port number, and the like may be included. In this way, the terminal 10aa can acquire the relay device connection information used for a connection to the relay device 30e2 that is used for relaying telephone call data in the execution of the session having the session ID of "se1".

Next, the transmission/reception unit 51 transmits the terminal ID "01aa" of the request source terminal (terminal 10aa), the change request information "Invite" indicating requesting for the start of a telephone call with the destination terminal, the start request information in which the session ID "se1" is included, the relay device connection information used for a connection to the relay device 30e2, and the IP address of the management system 50 to all the destination terminals (10bb, 10cb, and 10db) (Steps S48-1, S48-2, and S48-3). Accordingly, the transmission/reception unit 51 of each of the destination terminals (terminals 10bb, 10cb, and 10db) receives the start request information and acquires the relay device connection information used for a connection to the relay device 30e2 used for relaying telephone call data and the IP address "1.1.1.2" of the management system 50 that is the transmission source.

Subsequently, a process executed in a case where a user using the destination terminal (terminal 10db) that has received the start request information presses the operation button 108 illustrated in FIG. 2 and receives a response indicating permission for the start of communication with the request source terminal (terminal 10aa) will be described with reference to FIGS. 25 and 24. By using the operation button 108 of the destination terminal (terminal 10db), a response indicating the permission for the start of communication with the request source terminal (terminal 10aa) is received (Step S49). Next, the transmission/reception unit 11 of the destination terminal (terminal 10db) transmits start response information including the terminal ID "01db" of the destination terminal (terminal 10db), the terminal ID "01aa" of the request source terminal (terminal 10aa), the change request information "Accept" indicating the permission for the start of communication, and the session ID "se1" to the management system 50 (Step S50).

When the transmission/reception unit 51 of the management system 50 receives the start response information, the state managing unit 53 changes the field part of the communication state of each record in which the terminal ID "01aa" or the terminal ID "01db" are included in the terminal management table (see FIG. 11) based on the terminal ID "01aa" of the request source terminal (terminal 10aa) and the terminal ID "01db" of the destination terminal (terminal 10db) (Step S51).

Here, the process of Step S51 will be described in detail with reference to FIG. 24. First, when the transmission/reception unit 51 of the management system 50 receives the start response information, the state acquiring unit 53b of the state managing unit 53 illustrated in FIG. 5, similar to the process of Step S43-1, acquires the communication states of terminals managed in the terminal management table (see FIG. 11) (Step S51-1). In this case, the change request information "Accept" received by the transmission/reception unit 51 is determined to be the specific change request information by the change request information determining unit 63 in advance. Based on this, the state acquiring unit 53 acquires not only the communication state "Ringing" of the destination terminal (terminal 10db) but also the communication state "Calling" of the request source terminal (terminal 10aa).

Subsequently, the state changing unit 53c of the state managing unit 53, similar to the process of Step S43-2, acquires the before-change state information "Calling" and "Accepted" of the request source terminal corresponding to the change request information "Accept" managed in the state change management table (see FIG. 17). Similarly, the state changing unit 53c acquires the before-change state information "Ringing" of the destination terminal corresponding to the change request information "Accept" managed in the state change management table (see FIG. 17) (Step S51-2).

Next, the state changing unit 53c compares the communication state acquired by the state acquiring unit 53b with the before-change state information acquired by the state changing unit 53c and determines whether or not these are identical (Step S51-3). In this case, the state changing unit 53c determines whether or not the communication state "Calling" of the request source terminal (terminal 10aa) acquired by the state acquiring unit 53b is identical to any one of the before-change state information "Calling" and "Accepted" of the request source terminal acquired by the state changing unit 53c. Similarly, the state changing unit 53c determines whether or not the communication state "Ringing" of the destination terminal (terminal 10db) acquired by the state acquiring unit 53b is identical to the before-change state information "Ringing" of the destination terminal acquired by the state changing unit 53c.

In a case where it is determined that the communication state and the before-change state information of the request source terminal are identical, and the communication state and the before-change state information of the destination terminal are identical in Step S51-3 (Yes in Step S51-3), the state changing unit 53c acquires the change information of the request source terminal and the destination terminal corresponding to the response information "Accept" (Step S51-4). In this case, the state changing unit 53c searches the state change management table (see FIG. 17) using the response information "Accept", the terminal information "request source" representing a request source terminal, and the before-change state "Calling" representing the communication state of the request source terminal before change as search keys and acquires the change information "Accepted" of the request source terminal. Similarly, the state changing unit 53c searches the state change management table (see FIG. 17) using the response information "Accept", the terminal information "destination" representing a destination terminal, and the before-change state "Ringing" representing the communication state of the destination terminal before change as search keys and acquires the change information "Accepted" of the destination terminal.

Next, the state changing unit 53c, based on the terminal ID "01aa" of the request source terminal (terminal 10aa) and the terminal ID "01db" of the destination terminal (terminal 10db) included in the start response information, changes the field part of the communication state of each record in which the terminal ID "01aa" or the terminal ID "01db" is included in the terminal management table (see FIG. 11) (Step S51-5). In this case, the field part of the communication state of a record in which the terminal ID "01aa" is included in the terminal management table is changed to "Accepted" based on the acquired change information of the request source terminal. Similarly, the field part of the communication state of a record in which the terminal ID "01db" is included in the terminal management table is changed to "Accepted" based on the acquired change information of the destination terminal. In addition, the determining unit 61, in order to execute call control of communication between the request source terminal (terminal 10aa) and the destination terminal (terminal 10db), determines a countermeasure (see Step S52) indicating the transmission of the start response information to the request source terminal (terminal 10aa).

On the other hand, in a case where it is determined that the communication state and the before-change state information of the request source terminal (10aa) are not identical or the communication state and the before-change state information of the destination terminal (terminal 10db) are not identical in Step S51-3 (No in Step S51-3), the state changing unit 53c does not change the field part of the communication state of a record in which the terminal ID "01aa" or the terminal ID "01db" is included in the terminal management table (see FIG. 11). In this case, the determining unit 61 determines a countermeasure indicating generation of a predetermined error message and transmission of the generated error message to the destination terminal (terminal 10db). Subsequently, the transmission/reception unit 51 generates the error message and transmits the generated error message to the destination terminal (terminal 10db), thereby completing the process.

Next, referring back to FIG. 25, a process executed in a case where the countermeasure indicating the transmission of start response information to each destination terminal is determined by the determining unit 61 will be described. The transmission/reception unit 51 transmits the start response information including the terminal ID "01db" of the destination terminal (terminal 10db), the change request information "Accept" indicating permission for the request for starting a telephone call with the destination terminal, and the session ID "se1" to the request source terminal (terminal 10aa) (Step S52). When this start response information is received, the request source terminal (terminal 10aa) transmits the session ID "se1" and the relay device connection information acquired in Step S47 to the relay device 30e2 by using the transmission/reception unit 11, thereby being connected to the relay device 30e2 (Step S53). On the other hand, the destination terminal (terminal 10db) transmits the session ID "se1" and the relay device connection information acquired in Step S48-1 to the relay device 30e2 by using the transmission/reception unit 11, thereby being connected to the relay device 30e2 (Step S54).

Subsequently, a process executed in a case where a user using the destination terminal (terminal 10bb) that has received the start request information in Step S48-2 presses the operation button 108 illustrated in FIG. 2 and receives a response indicating rejection of the start of communication with the request source terminal (terminal 10aa) will be described with reference to FIGS. 26 and 27. When the response indicating rejection of the start of communication with the request source terminal (terminal 10bb) is received by using the operation button 108 of the destination terminal (terminal 10bb) (Step S55), the transmission/reception unit 11 of the destination terminal (terminal 10bb) transmits start response information including the terminal ID "01bb" of the destination terminal (terminal 10bb), the change request information "Reject" indicating the rejection of the request for the start of communication, and the session ID "se1" to the management system 50 (Step S56).

When this start response information is received by the transmission/reception unit 51 of the management system 50, the state managing unit 53, based on the terminal ID "01aa" of the request source terminal (terminal 10aa) and the terminal ID "01bb" of the destination terminal (terminal 10bb), changes the field part of the communication state of a record in which the terminal ID "01aa" or the terminal ID "01bb" is included in the terminal management table (see FIG. 11) (Step S57).

Here, the process of Step S57 will be described in detail with reference to FIG. 27. First, when the transmission/reception unit 51 of the management system 50 receives this start response information, the determination unit 62 stores a reception number (response reception number) of the start response information of "Reject" received by the transmission/reception unit 51 in a session in which the session ID is represented as "se1" in the volatile storage unit 5100 (Step S57-1). In this case, the start response information "Reject" received from the destination terminal (terminal 10bb) is the start response information of "Reject" that is received first in the session in which the session ID "se" is represented, and accordingly, the session ID "se1" and the response reception number "1" are stored in the volatile storage unit 5100 in association with each other.

Next, the state acquiring unit 53b of the state managing unit 53 illustrated in FIG. 5, similar to the process of Step S43-1, acquires the communication states of terminals managed in the terminal management table (see FIG. 11) (Step S57-2). Here, the change request information "Reject" received by the transmission/reception unit 51 is determined to be the specific change request information by the change request information determining unit 63 in advance, and, based on this, the state acquiring unit 53 acquires not only the communication state "Ringing" of the destination terminal (terminal 10bb) but also the communication state "Accepted" of the request source terminal (terminal 10aa) (Step S57-2).

Subsequently, the state changing unit 53c of the state managing unit 53, similar to the process of Step S43-2, acquires the before-change state information "Calling" and "Accepted" of the request source terminal corresponding to the start response information "Reject" managed in the state change management table (see FIG. 18) and the before-change state information "Ringing" of the destination terminal (Step S57-3).

Next, the state changing unit 53c compares the communication state acquired by the state acquiring unit 53b with the before-change state information acquired by the state changing unit 53c and determines whether or not the commutation state and the before-change state information are identical (Step S57-4). In this case, the state changing unit 53c determines whether or not the communication state "Accepted" of the request source terminal (terminal 10aa) acquired by the state acquiring unit 53b is identical to any one of the before-change state information "Calling" and "Accepted" of the request source terminal acquired by the state changing unit 53c. Similarly, the state changing unit 53c determines whether or not the communication state "Ringing" of the destination terminal (terminal 10bb) acquired by the state acquiring unit 53b is identical to the before-change state information "Ringing" of the destination terminal acquired by the state changing unit 53c.

In a case where it is determined that the communication state and the before-change state information of the request source terminal are identical, and the communication state and the before-change state information of the destination terminal are identical in Step S57-4 (Yes in Step S57-4), the determination unit 62 determines whether all the plurality of destination terminals reject the request from the request source terminal (terminal 10aa) or some of the plurality of destination terminals reject the request from the request source terminal (terminal 10aa) (Step 57-5). Here, the determination unit 62 acquires the number "3" of destination terminals that are destinations of the request information transmitted by the request source terminal (terminal 10aa) from the volatile storage unit 5100 (see Step S44). Subsequently, the determination unit 62 acquires the reception number (response reception number) "1" of the start response information of "Reject" measured by a measurement unit from the volatile storage unit 5100 (see Step S57-1). Accordingly, the determination unit 62 determines that some of the plurality of destination terminals reject the request from the request source terminal (terminal 10aa).

When the determination described above is completed, the state changing unit 53c acquires the change information of the request source terminal and the destination terminal corresponding to the response information "Reject" (Step S57-6). In this case, the state changing unit 53c searches the state change management table (see FIG. 18) using the response information "Reject", the terminal information "request source" representing a request source terminal, determination information "part" representing a result of the determination made by the determination unit 62, and the before-change state "Accepted" representing the communication state of the request source terminal before change as search keys and acquires the change information "Accepted" of the request source terminal. In addition, the state changing unit 53c searches the state change management table (see FIG. 18) using the response information "Reject" and the terminal information "destination" representing a destination terminal as search keys and acquires the change information "None" of the destination terminal.

Next, the state changing unit 53c, based on the terminal ID "01aa" of the request source terminal (terminal 10aa) and the terminal ID "01bb" of the destination terminal (terminal 10bb), changes the field part of the communication state of a record in which the terminal ID "01aa" or the terminal ID "01bb" is included in the terminal management table (see FIG. 11) (Step S57-7). In this case, the field part of the communication state of the record in which the terminal ID "01aa" is included in the terminal management table is changed to "Accepted" based on the acquired change information of the request source terminal. Similarly, the field part of the communication state of a record in which the terminal ID "01bb" is included in the terminal management table is changed to "None" based on the acquired change information of the destination terminal. In addition, in order to execute call control of the communication between the request source terminal (terminal 10aa) and the destination terminal (terminals 10bb), the determining unit 61 determines a countermeasure (see Step S59) indicating transmission of the start request information to the request source terminal (terminal 10aa).

On the other hand, in a case where the communication state and the before-change state information of the request source terminal (terminal 10aa) are determined not to be identical, or the communication state and the before-change state information of the destination terminal (terminal 10bb) are determined not to be identical in Step S57-4 (No in Step S57-4), the state changing unit 53c does not change the field part of the communication state of each record in which the terminal ID "01aa" or the terminal ID "01bb" is included in the terminal management table (see FIG. 11). In such a case, the determining unit 61 determines a countermeasure indicating the generation of a predetermined error message and the transmission thereof to the destination terminal (terminal 10bb). Subsequently, the transmission/reception unit 51 generates this error message and transmits the generated error message to the destination terminal (terminal 10bb), thereby completing the process.

Next, referring back to FIG. 26, a process executed in a case where the start response information is transmitted to the request source terminal (terminal 10aa) by the determining unit 61 will be described. First, the session managing unit 57 removes the terminal ID "01bb" of the destination terminal (terminal 10bb) from the field part of the destination terminal of a record in which the session ID "se1" is included in the session management table (see FIG. 13) of the nonvolatile storage unit 5000 (Step S58). In addition, the transmission/reception unit 51 transmits the start response information including a terminal ID "01bb" of the destination terminal (terminal 10bb), response information "Reject" indicating rejection of the request for starting communication, and a session ID "se1" to the request source terminal (terminal 10aa) (Step S59). In this way, the request source terminal (terminal 10aa) can check that the request for starting communication with the request source terminal (terminal 10bb) has been rejected.

Subsequently, a process executed in a case where, after a request for starting communication is transmitted by the request source terminal (terminal 10aa), a request indicating cancellation of the request for starting communication is received according to the operation button 108 of the request source terminal (terminal 10aa) will be described with reference to FIGS. 28 and 24. When a request indicating cancellation of the request for starting communication is received according to the operation button 108 of the request source terminal (terminal 10aa) (Step S61), cancellation request information including the terminal ID "01aa" of the request source terminal (terminal 10aa), change request information "Cancel" indicating the cancellation of the request for starting communication, and a session ID "se1" are transmitted to the management system (Step S62).

When the transmission/reception unit 51 of the management system 50 receives the cancellation request information, the state managing unit 53, based on the terminal ID "01aa" of the request source terminal (terminal 10aa) and the terminal ID of the destination terminal included in the cancellation request information, changes the field part of the communication state of a record in which the terminal ID "01aa" or the terminal ID of the destination terminal is included in the terminal management table (see FIG. 11) (Step S63).

Here, the process of Step S63 will be described in detail with reference to FIG. 24. First, when the transmission/reception unit 51 of the management system 50 receives this change request information "Cancel", the state acquiring unit 53b of the state managing unit 53 illustrated in FIG. 5 acquires the communication states of terminals managed in the terminal management table (see FIG. 11) (Step S63-1). Here, the change request information "Cancel" received by the transmission/reception unit 51 is determined to be the specific change request information by the change request information determining unit 63 in advance, and, based on this, the state acquiring unit 53 acquires not only the communication state of the request source terminal (terminal 10aa) but also the communication state of each destination terminal (Step S63-1). In this case, the state acquiring unit 53b searches the terminal management table (see FIG. 11) using the terminal ID "01aa" of the request source terminal (terminal 10aa) as a search key and acquires the communication state "Accepted" of the request source terminal (terminal 10aa) that has requested the start of a telephone call. Next, the state acquiring unit 53b searches the session management table (see FIG. 13) using the session ID "se1" as a search key and acquires the terminal IDs "01db" and "01cb" of the destination terminals. Subsequently, the state acquiring unit 53b searches the terminal management table (see FIG. 11) using the terminal ID "01db" of the destination terminal (terminal 10db) and the terminal ID "01cd" of the destination terminal (terminal 10cb) as search keys and acquires the communication states "Accepted" and "Ringing" of the destination terminals.

Subsequently, the state changing unit 53c of the state managing unit 53, similar to the process of Step S43-2, acquires the before-change state information "Calling" and "Accepted" of the request source terminal and the before-change state information "Ringing" of the destination terminal corresponding to the change request information "Cancel" managed in the state change management table (see FIG. 17) (Step S63-2).

Next, the state changing unit 53c compares the communication state acquired by the state acquiring unit 53b with the before-change state information acquired by the state changing unit 53c and determines whether or not these are identical (Step S63-3). In this case, the state changing unit 53c determines whether or not the communication state "Accepted" of the request source terminal (terminal 10aa) acquired by the state acquiring unit 53b is identical to any one of the before-change state information "Calling" and "Accepted" of the request source terminal acquired by the state changing unit 53c. Similarly, the state changing unit 53c determines whether or not the communication state "Accepted" of the destination terminal (terminal 10db) and the communication state "Ringing" of the destination terminal (terminal 10cb) acquired by the state acquiring unit 53b are identical to the before-change state information "Ringing" of the destination terminal acquired by the state changing unit 53c.

In a case where it is determined that the communication state and the before-change state information of the request source terminal are identical, and the communication state and the before-change state information of the destination terminal are identical in Step S63-3 (Yes in Step S63-3), the state changing unit 53c acquires the change information of the request source terminal and the destination terminal corresponding to the change request information "Cancel" (Step S63-4). In this case, the state changing unit 53c searches the state change management table (see FIG. 18) using the change request information "Cancel", the terminal information "request source" representing a request source terminal, and the before-change state "Accepted" representing the communication state of the request source terminal before change as search keys and acquires the change information "Accepted" of the request source terminal. Similarly, the state changing unit 53c searches the state change management table (see FIG. 17) using the change request information "Cancel" and the terminal information "destination" representing a destination terminal as search keys and acquires the change information "None" of the destination terminal.

Next, the state changing unit 53c, based on the terminal ID "01aa" of the request source terminal (terminal 10aa) and the terminal ID "01cb" of the destination terminal (terminal 10cb), changes the field part of the communication state of each record in which the terminal ID "01aa" or the terminal ID "01cb" is included in the terminal management table (see FIG. 11) (Step S63-5). In this case, the field part of the communication state of a record in which the terminal ID "01aa" is included in the terminal management table is changed to "Accepted" based on the acquired change information of the request source terminal. Similarly, the field part of the communication state of a record in which the terminal ID "01cb" is included in the terminal management table is changed to "None" based on the acquired change information of the destination terminal. In addition, the determining unit 61, in order to execute call control of communication between the request source terminal (terminal 10aa) and the destination terminal (terminal 10cb), determines a countermeasure (see Steps S65-1 and S65-2) indicating the transmission of information representing the removal of the request for communication with the destination terminal (terminal 10cb) to the request source terminal (terminal 10aa) and the destination terminal (terminal 10cb).

In a case where it is determined that the communication state and the before-change state information of the request source terminal (terminal 10aa) are not identical or the communication state and the before-change state information of the destination terminal (terminal 10bb) are not identical in Step S63-3 (No in Step S63-3), the state changing unit 53c does not change the field part of the communication state of a record in which the terminal ID of the request source terminal or the terminal ID of the destination terminal is included in the terminal management table (see FIG. 11). In this embodiment, since the communication state "Accepted" of the destination terminal (terminal 10db) and the before-change state "Ringing" of the destination terminal are different from each other, the field part of the communication state of a record in which the terminal ID "01db" of the destination terminal (terminal 10db) is included is not changed. The reason for this is that the request for communication has already been permitted by the destination terminal (terminal 10db), the request for communication cannot be cancelled. In this case, the determining unit 61 determines a countermeasure indicating generation of an error message indicating no cancellation of the request for communication with the destination terminal (terminal 10db) and transmission of the generated error message to the request source terminal (terminal 10aa). Subsequently, the transmission/reception unit 51 transmits the error message to the destination terminal (terminal 10aa), thereby completing the process.

Next, referring back to FIG. 28, a process executed in a case where a countermeasure indicating the transmission of information indicating the removal of the communication request according to the determining unit 61 to the request source terminal (terminal 10aa) and the destination terminal (terminal 10cb) is determined will be described. First, the session managing unit 57 removes the terminal ID "01cb" of the destination terminal (terminal 10cb) from the field part of the destination terminal of a record in which the session ID "se1" is included in the session management table (see FIG. 13) of the nonvolatile storage unit 5000 (Step S64).

Next, the transmission/reception unit 51 transmits cancellation information including the session ID "SE1" and information indicating removal of the request for communication with the destination terminal (terminal 10cb) to the request source terminal (terminal 10aa) and the destination terminal (terminal 10cb) (Steps S65-1 and S65-2). In this way, the request source terminal (terminal 10aa) and the destination terminal (terminal 10cb) can check that the request for starting communication between the request source terminal (terminal 10aa) and the destination terminal (terminal 10cb) has been removed.

Subsequently, a process of the relay device 30e2 starting relay of telephone call data transmitted and received between the request source terminal (terminal 10aa) and the destination terminal (terminal 10db) will be described with reference to FIG. 29. FIG. 29 illustrates the processes of transmitting and receiving various kinds of management information using the management information session sei.

First the request source terminal (terminal 10aa) transmits relay request information including the terminal ID "01aa" of the request source terminal (terminal 10aa), the session ID "se1" and change request information "Join" indicating a request for the start of relay to the management system 50 at predetermined timing after a connection with the relay device 30e2 (see Step S53) by using the transmission/reception unit 11 (Step S71-1).

When this relay request information is received by the transmission/reception unit 51 of the management system 50, the state managing unit 53, based on the terminal ID "01aa" of the request source terminal (terminal 10aa) included in the relay request information, changes the field part of the communication state of a record in which the terminal ID "01aa" is included in the terminal management table (see FIG. 11) (Step S72-1).

Here, the process of Step S72-1 will be described in detail with reference to FIG. 30. First, the state acquiring unit 53b of the state managing unit 53 illustrated in FIG. 5 acquires the communication states of terminals managed in the terminal management DB (Step S72-1-1). In this case, the change request information "Join" received by the transmission/reception unit 51 is determined not to be the specific change request information by the change request information determining unit 63 in advance. Based on this, the state acquiring unit 53 acquires only the communication state of the request source terminal (terminal 10aa). In this case, the state acquiring unit 53b searches the terminal management table (see FIG. 11) using the terminal ID "01aa" of the request source terminal (terminal 10aa) as a search key and acquires a communication state "Accepted" of the request source terminal (terminal 10aa) that has requested the start of relay.

Next, the state changing unit 53c of the state managing unit 53 acquires before-change state information corresponding to the change request information "Join" (Step S72-1-2). In this case, the state changing unit 53c searches the state change management table (see FIG. 16) using the change request information "Join" as a search key and acquires before-change state information "Accepted".

Next, the state changing unit 53c compares the communication state acquired by the state acquiring unit 53b with the before-change state information acquired by the state changing unit 53c and determines whether or not these are identical (Step S72-1-3). In this case, the state changing unit 53c compares the communication state "Accepted" of the request source terminal (terminal 10aa) acquired by the state acquiring unit 53b with the before-change state information "Accepted" acquired by the state changing unit 53c and determines whether or not these are identical.

In a case where the communication state and the before-change state information of the request source terminal are determined to be identical in Step S72-1-3 (Yes in Step S72-1-3), the state changing unit 53c acquires change information corresponding to the change request information "Join" (Step S72-1-4). In this case, the state changing unit 53c searches the state change management table (see FIG. 16) using the change request information "Join" as a search key and acquires change information "Busy".

Next, the state changing unit 53c, based on the terminal ID "01aa" of the request source terminal (terminal 10aa), changes the field part of the communication state of a record in which the terminal ID "01aa" is included in the terminal management table (see FIG. 11) (Step S72-1-5). In this case, the field part of the communication state of the record in which the terminal ID "01aa" is included in the terminal management table is changed to "Busy" based on the acquired change information. In order to execute call control of communication, the determining unit 61 determines a countermeasure (see Step S73-1) indicating transmission of a request for starting relay to the relay device 30e2.

On the other hand, in a case where it is determined that the communication state and the before-change state information of the request source terminal are not identical in Step S72-1-3 (No in Step S72-1-3), the state changing unit 53c does not change the field part of the communication state of a record in which the terminal ID "01aa" is included in the terminal management table (see FIG. 11). In this case, the determining unit 61 determines a countermeasure indicating generation of a predetermined error message and transmission of the generated error message to the request source terminal (terminal 10aa). Subsequently, the transmission/reception unit 51 transmits the error message to the request source terminal (terminal 10aa), thereby completing the process.

Next, referring back to FIG. 29, a process executed in a case where a countermeasure indicating the transmission of a request for starting relay to the relay device 30e2 is determined by the determining unit 61 will be described. First, the management system 50 transmits relay start request information including the terminal ID "01aa" of the request source terminal (terminal 10aa) and the session ID "se1" to the relay device 30e2 (Step S73-1). When this relay start request information is received, the relay device 30e2 transmits relay start permission information including notification information "OK" indicating the permission for the start of relay to the management system (Step S74-1). When this response is received, the transmission/reception unit 51 of the management system 50 transmits this relay start permission information to the request source terminal (terminal 10aa) (Step S75-1). In this way, a telephone call data session sed between the request source terminal (terminal 10aa) and the relay device 30e2 is set up (Step S76-1).

Meanwhile, the destination terminal (terminal 10*db*) transmits relay request information including the terminal ID "01db" of the destination terminal (terminal 10*db*), the session ID "se1", and the change request information "Join" indicating a request for the start of relay to the management system 50 by using the transmission/reception unit 11 at predetermined timing after a connection with the relay device 30*e*2 (see Step S54) (Step S71-2).

Subsequently, processes similar to Steps S72-1, S73-1, S74-1, and S75-1 are executed by the management system 50 and the relay device 30*e*2, whereby a telephone call data session sed between the destination terminal (terminal 10*db*) and the relay device 30*e*2 is set up (Steps S72-2, S73-2, S74-2, S75-2, and S76-2). When a telephone call data session sed between the request source terminal (terminal 10*aa*) and the relay device 30*e*2 and a telephone call data session sed between the destination terminal (terminal 10*aa*) and the relay device 30*e*2 are set up, the relay device 30*a* can relay three types of image data of low resolution, medium resolution, and high resolution and audio data between the terminals (10*aa* and 10*db*). In this way, the terminals 10*aa* and 10*db* can start a television conference.

Subsequently, the process of transmitting/receiving image data and audio data between the request source terminal (terminal 10*aa*) and the destination terminal (terminal 10*db*) for performing a telephone call of a television conference will be described with reference to FIGS. 4 and 31. In the process of one direction for transmitting image data and audio data from the terminal 10*aa* to the terminal 10*db* and the process of the opposite direction for transmitting image data and audio data from the terminal 10*db* to the terminal 10*aa*, the transmission/reception of image data and audio data, detection of a delay time to be described later, and the like are the same processes. Thus, the communication of the one direction will be described, but description of the communication of the opposite direction will not be presented.

First, the request source terminal (terminal 10*aa*) transmits image data of a subject that is captured by the imaging unit 14 and audio data of an audio input by the audio input unit 15*a* using an image/audio data session sed from the transmission/reception unit 11 to the relay device 30*e*2 through the communication network 2 (Step S81). In this embodiment, high-quality image data formed by three types of low resolution, medium resolution, and high resolution illustrated in FIG. 20 and audio data are transmitted. Accordingly, in the relay device 30*e*2, image data of three kinds of resolution and audio data are received by the transmission/reception unit 31.

Then, the data quality checking unit 33 searches the change quality management table (see FIG. 7) using the IP address "1.3.2.4" of the destination terminal (terminal 10*db*) as a search key and extracts an corresponding image quality of image data to be relayed, thereby checking the quality of an image of the image data to be relayed (Step S82). In this embodiment, the checked image quality of the image of the image data is a "high image quality" and is the same as the image quality of image data received by the transmission/reception unit 31. Accordingly, the relay device 30*a* transmits image data of the original image quality and audio data of the original audio quality to the destination terminal (terminal 10*db*) by using the image/audio data session sed (Step S83). In this way, the destination terminal (terminal 10*db*) receives the image data and the audio data using the transmission/reception unit 11, the image display control unit 16 can display an image based on the image data on the display 120, and the audio output unit 15*b* can output an audio based on the audio data.

Next, the delay detecting unit 18 of the terminal 10*db* detects a delay time in reception of image data received by the transmission/reception unit 11 every constant time (for example, every one second) (Step S84). In this embodiment, description will be continued for a case where the delay time is 200 (ms).

The transmission/reception unit 11 of the destination terminal (terminal 10*db*) transmits delay information representing a delay time of "200 (ms)" to the management system 50 through the communication network 2 by using the management information session sei (Step S85). Accordingly, the management system 50 can acquire the delay time and the IP address "1.3.2.4" of the terminal 10*db* that is a transmission source of the delay information.

Next, the delay time managing unit 60 of the management system 50 extracts a corresponding terminal ID "01db" by searching the terminal management table (see FIG. 11) using the IP address "1.3.2.4" of the destination terminal (terminal 10*db*) as a search key and stores and manages the delay time "200 (ms)" represented in the delay information in a field part of the delay time in each record having a terminal ID of "01db" in the session management table (see FIG. 13) (Step S86).

Next, the quality determining unit 58 extracts an image quality "medium image quality" of corresponding image data by searching the quality management table (see FIG. 14) using the delay time "200 (ms)" as a search key, thereby determining the "medium image quality" as the image quality (Step S87).

Next, the transmission/reception unit 51 extracts the IP address "1.1.1.4" of a corresponding relay device 30*e*2 by searching the relay device management table (see FIG. 9) using a relay device ID "111e" associated with the terminal ID "01db" as a search key in the session management table (see FIG. 13) (Step S88).

Then, the transmission/reception unit 51 transmits quality information representing the image quality "medium image quality" of image data determined in Step S87 to the relay device 30*e*2 through the communication network 2 by using the management information session sei (Step S89). In this quality information, the IP address "1.3.2.4" of the destination terminal (terminal 10*db*) used as the search key in Step S86 described above is included. In this way, in the relay device 30*e*2, the change quality managing unit 34 stores and manages the IP address "1.3.2.4" of the terminal 10 (here, the destination terminal (terminal 10*db*)) disposed at the destination and the image quality "medium image quality" of the image data to be relayed in the change quality management table (see FIG. 7) in association with each other (Step S90).

Next, the terminal 10*aa*, similar to Step S81 described above, transmits high-quality image data formed by three types of data of a low image quality, a medium image quality, and a high image quality to the relay device 30*e*2 by using the image/audio data session sed (Step S91). In this way, in the relay device 30*e*2, similar to Step S82 described above, the data quality checking unit 33 searches the change quality management table (see FIG. 7) using the IP address "1.3.2.4" of the destination terminal (terminal 10*db*) as a search key and extracts the image quality "medium image quality" of corresponding image data to be relayed, thereby checking the quality of the image of the image data to be relayed (Step S92).

In this embodiment, the checked image quality of the image data is the "medium image quality" and is lower than the image quality "high image quality" of the image data received by the transmission/reception unit 31, and accordingly, the data quality changing unit 35 suppresses the image quality of the image data from the "high image quality" to the "medium image quality", whereby the quality of the image of the image data is changed (Step S93). Then, the transmission/reception unit 31 transmits the image data of which the image quality has been changed to the "medium image quality" and audio data of which the sound quality has not been changed to the terminal 10db through the communication network 2 by using the image/audio data session sed (Step S94). In this way, in a case where a reception delay occurs in the destination terminal (terminal 10db) receiving image data, the relay device 30e2 changes the image quality, thereby a person participating in a television conference may not be caused to have a sense of discomfort.

Subsequently, a process of the destination terminal (terminal 10cb) participating in a telephone call data session after the setup of the telephone call data session between the request source terminal (terminal 10aa) and the destination terminal (terminal 10db) will be described with reference to FIG. 32. In FIG. 32, the processes of transmitting/receiving various kinds of management information are represented to use the management information session sei.

First, as the user using the request source terminal (terminal 10aa) presses the operation button 108 illustrated in FIG. 2, information indicating a request for notifying the destination terminal 10cb of a session ID for the destination terminal (terminal 10cb) to participate in a telephone call data session sed is received (Step S101). Next, the transmission/reception unit 11 of the request source terminal (terminal 10aa) transmits session ID notification request information including the terminal ID "01aa" of the request source terminal (terminal 10aa), the terminal ID "01cb" of the destination terminal (terminal 10cb), and the session ID "se1" to the management system 50 (Step S102). When the telephone call managing device 50 receives this session ID notification request information, the transmission/reception unit 51 transmits session ID notification information including the terminal ID "01aa" of the request source terminal (terminal 10aa) and the session ID "se1" to the terminal 10cb (Step S103).

When the session ID notification information is received, the destination terminal (terminal 10cb) accepts a participation request for the telephone call data session sed (Step S104). Here, as the user using the destination terminal (terminal 10cb) presses the operation button 108 illustrated in FIG. 2, an indication of requesting for participation in this telephone call data session is received. In this way, the transmission/reception unit 11 of the destination terminal (terminal 10cb) transmits session participation request information including the terminal ID "01cb" of the destination terminal (terminal 10cb), the change request information "Call" indicating a request for participation in the telephone call data session, and the session ID "se1" to the management system (Step S105).

When this session participation request information is received, the state managing unit 53 of the management system 50, based on the terminal ID "01cb" of the terminal (terminal 10cb) requesting the participation included in the session participation request information, changes a field part of the communication state of a record in which the terminal ID "01cb" is included in the terminal management table (see FIG. 11) (Step S106).

Here, the process of Step S106 will be described in detail with reference to FIG. 33. First, the state acquiring unit 53b of the state managing unit 53 illustrated in FIG. 5 acquires the communication states of terminals managed by the terminal management DB (Step S106-1). In this case, the change request information "Call" received by the transmission/reception unit 51 is determined not to be the specific change request information by the change request information determining unit 63 in advance. Based on this, the state acquiring unit 53 acquires only the communication state of the destination terminal (terminal 10cb). In this case, the state acquiring unit 53b searches the terminal management table (see FIG. 11) using the terminal ID "01cb" of the destination terminal (terminal 10cb) as a search key and acquires a communication state "None" of the terminal (terminal 10cb) requesting the participation.

Next, the state changing unit 53c of the state managing unit 53 acquires before-change state information of the destination terminal that corresponds to the change request information "Call" (Step S106-2). In this case, the state changing unit 53c searches the state change management table (see FIG. 16) using the change request information "Call" as a search key and acquires before-change state information "None".

Next, the state changing unit 53c compares the communication state acquired by the state acquiring unit 53b with the before-change state information acquired by the state changing unit 53c and determines whether or not these are identical (Step S106-3). In this case, the state changing unit 53c compares the communication state "None" of the terminal (terminal 10cb) acquired by the state acquiring unit 53b with the before-change state information "None" acquired by the state changing unit 53c and determines whether or not these are identical.

In a case where the communication state of the destination terminal and the before-change state information are determined to be identical in Step S106-3 (Yes in Step S106-3), the state changing unit 53c acquires change information corresponding to the change request information "Call" (Step S106-4). In this case, the state changing unit 53c searches the state change management table (see FIG. 16) using the change request information "Call" as a search key and acquires change information "Accepted".

Next, the state changing unit 53c, based on the terminal ID "01cb" of the terminal (terminal 10cb) requesting the participation, changes the field part of the communication state of a record in which the terminal ID "01cb" is included in the terminal management table (see FIG. 11) (Step S106-5). In this case, the field part of the communication state of the record in which the terminal ID "01cb" is included in the terminal management table is changed to "Accepted" based on the acquired change information of the destination terminal. In order to execute call control of communication between the request source terminal (terminal 10aa) and the destination terminals (terminals 10cb and 10db), the determining unit 61 determines a countermeasure (see Steps S107-1, S107-2, and S107-3) indicating transmission of information indicating permission of the participation request to the request source terminal (terminal 10aa) and the destination terminals (terminals 10bb and 10db).

On the other hand, in a case where it is determined that the communication state and the before-change state information of the terminal requesting the participation are determined not to be identical in Step S106-3 (No in Step S106-3), the state changing unit 53c does not change the field part of the communication state of a record in which the terminal ID "01cb" is included in the terminal management table (see FIG. 11). In this case, the determining unit 61 determines a countermeasure indicating generation of a predetermined error message and transmission of the generated error message to the destination terminal (terminal 10cb). Subsequently, the transmission/reception unit 51 transmits the error message to the destination terminal (terminal 10cb), thereby completing the process.

Next, referring back to FIG. 32, a process executed in a case where a countermeasure indicating the transmission of the information indicating the permission of the participation request to the request source terminal (terminal 10aa) and the destination terminals (terminals 10bb and 10cb) is determined by the determining unit 61 will be described. First, the session managing unit 57 adds the terminal ID "01cb" of the terminal (terminal 10cb) requesting for the participation in the field part of the destination terminal of a record in which the session ID (se1) is included in the session management table (see FIG. 13) of the nonvolatile storage unit 5000.

Next, the transmission/reception unit 51 of the management system 50 transmits the participation notification including the terminal ID "01cb" of the terminal (terminal 10cb) participating in the telephone call data session sed and the session ID "se1" to the request source terminal (terminal 10aa) and the destination terminal (terminal 10db) that have already started the telephone call data session sed (Steps S107-1 and S107-2). In this way, the request source terminal (terminal 10aa) and the destination terminal (terminal 10db) can acquire an indication representing that the destination terminal (terminal 10db) participates in the telephone call data session. In addition, the transmission/reception unit 51 of the management system 50 transmits a participation permission notification including the session ID "se1" participating in the telephone call data session sed and relay device connection information used for a connection with the relay device 30e2 to the destination terminal (terminal 10cb) starting the telephone call data session sed (Step S107-3).

When this participation permission notification is received, the terminal 10cb transmits the session ID "se1" and the relay device connection information included in the participation permission notification to the relay device 30e2 by using the transmission/reception unit 11, thereby being connected to the relay device 30e2 (Step S108). In addition, the terminal 10cb transmits relay request information including the terminal ID "01cb" of the terminal 10cb, the session ID "se1", and the change request information "Join" representing an indication of a request for starting relay to the management system 50 at predetermined timing after the connection with the relay device 30e2 by using the transmission/reception unit 11. Subsequently, similar processes are executed in Steps S72-1, S73-1, S74-1, and S75-1 by the management system 50 and the relay device 30e2, whereby a telephone call data session sed is set up between the terminal 10cb and the relay device 30e2. When this telephone call data session sed is set up, the relay device 30e2 can relay image data of three types of low resolution, medium resolution, and high resolution and audio data between the terminals (10aa, 10cb, and 10db). In this way, the terminals (10aa, 10cb, and 10db) can start a television conference.

Subsequently, a process of withdrawing the request source terminal (terminal 10aa) from a telephone call data session after the telephone call data session is set up between the request source terminal (terminal 10aa) and the destination terminals (terminals 10cb and 10db) will be described with reference to FIG. 34. FIG. 29 illustrates the process of transmitting/receiving various kinds of management information using the management information session sei.

First, as a user using the request source terminal (terminal 10aa) presses the operation button 108 illustrated in FIG. 2, a request for a withdrawal from the telephone call data session is received (Step S111). Then, the transmission/reception unit 11 of the request source terminal (terminal 10aa) transmits session withdrawal request information including the terminal ID "01aa" of the request source terminal (terminal 10aa), change request information "Leave" representing a request for a withdrawal from the telephone call data session, and the session ID "se1" to the management system 50 (Step S112).

When this session withdrawal request information is received, the state managing unit 53 of the management system 50, based on the terminal ID "01aa" of the request source terminal (terminal 10aa) included in the session withdrawal request information, changes a field part of the communication state of a record in which the terminal ID "01aa" is included in the terminal management table (see FIG. 11) (Step S113).

Here, the process of Step S113 will be described in detail with reference to FIG. 30. First, the state acquiring unit 53b of the state managing unit 53 illustrated in FIG. 5 acquires the communication states of terminals managed by the terminal management DB (Step S113-1). In this case, the change request information "Leave" received by the transmission/reception unit 51 is determined not to be the specific change request information by the change request information determining unit 63 in advance. Based on this, the state acquiring unit 53 acquires only the communication state of the request source terminal (terminal 10aa). In this case, the state acquiring unit 53b searches the terminal management table (see FIG. 11) using the terminal ID "01aa" of the request source terminal (terminal 10aa) as a search key and acquires the communication state "Busy" of the request source terminal (terminal 10aa).

Next, the state changing unit 53c of the state managing unit 53 acquires before-change state information corresponding to the change request information "Leave" (Step S113-2). In this case, the state changing unit 53c searches the state change management table (see FIG. 16) using the change request information "Leave" as a search key and acquires before-change state information "Busy".

Next, the state changing unit 53c compares the communication state acquired by the state acquiring unit 53b with the before-change state information acquired by the state changing unit 53c and determines whether or not these are identical (Step S113-3). In this case, the state changing unit 53c compares the communication state "Busy" of the request source terminal (terminal 10aa) acquired by the state acquiring unit 53b with the before-change state information "Busy" acquired by the state changing unit 53c and determines whether or not these are identical.

In a case where the communication state and the before-change state information of the terminal are determined to be identical in Step S113-3 (Yes in Step S113-3), the state changing unit 53c acquires change information corresponding to the change request information "Leave" (Step S113-4). In this case, the state changing unit 53c searches the state change management table (see FIG. 16) using the change request information "Leave" as a search key and acquires change information "None".

Next, the state changing unit 53c, based on the terminal ID "01aa" of the request source terminal (terminal 10aa), changes the field part of the communication state of a record in which the terminal ID "01aa" is included in the terminal management table (see FIG. 11) (Step S113-5). In this case, the field part of the communication state of a record in which the terminal ID "01aa" is included in the terminal management table is changed to "None" based on the acquired change information. In order to execute call control, the determining unit 61 determines a countermeasure indicating transmission of information indicating the permission of the withdrawal to each request source terminal.

On the other hand, in a case where it is determined that the communication state and the before-change state information of the request source terminal are not identical in Step S113-3 (No in Step S113-3), the state changing unit 53c does not change the field part of the communication state of a record in which the terminal ID "01aa" is included in the terminal management table (see FIG. 11). In this case, the determining unit 61 determines a countermeasure indicating transmission of a predetermined error message to the request source terminal (terminal 10aa). Subsequently, the transmission/reception unit 51 transmits the error message to the request source terminal (terminal 10aa), thereby completing the process.

Next, referring back to FIG. 34, for the case where the countermeasure indicating transmission of information indicating the permission of the withdrawal to each request source terminal is determined by the determining unit 61, a subsequent process will be described. First, the session managing unit 57 removes the terminal ID "01aa" of the request source terminal (terminal 10aa) from the field part of the request source terminal of a record in which the session ID "se1" is included in the session management table (see FIG. 13) of the nonvolatile storage unit 5000 (Step S114). The management system 50 transmits a notification indicating a request for withdrawing the session including the terminal ID "01aa" of the request source terminal (terminal 10aa) and the session ID "se1" to the relay device 30e2 (Step S115). In this way, the relay device 30e2 stops the telephone call data session with the request source terminal (terminal 10aa) and cuts off the connection with the request source terminal (terminal 10aa). Subsequently, the relay device 30e2 transmits a notification indicating the permission for the withdrawal request including the terminal ID "01aa" of the request source terminal (terminal 10aa) and the session ID "se1" to the management system 50 (Step S116).

When the notification indicating the permission for the withdrawal request is received by the management system 50, the transmission/reception unit 51 transmits session withdrawal permission information including the terminal ID "01aa" of the request source terminal (terminal 10aa), the change request information "Leave", the session ID "se1", and notification information "OK" indicating the permission for the withdrawal request to the request source terminal (terminal 10aa) (Step S117). When the session withdrawal permission information is received, the terminal 10aa accepts a power off request by pressing the power switch 109 illustrated in FIG. 2 (Step S118). When the power off request is accepted, the transmission/reception unit 11 transmits disconnection request information including the terminal ID "01aa" of the terminal 10aa and notification information indicating cut-off of the connection with the management system 50 to the management system 50 (Step S119).

When this disconnection request information is received by the transmission/reception unit 51 of the management system 50, the state managing unit 53, based on the terminal ID "01aa" of the request source terminal (terminal 10aa) included in the disconnection request information, removes recording of the field part of the communication state of a record in which the terminal ID "01aa" is included in the terminal management table (see FIG. 11) (Step S120). Subsequently, the transmission/reception unit 51 transmits disconnection permission information indicating the permission for the cut-off request to the request source terminal (terminal 10aa) (Step S121). In this way, the management system 50 stops the management data session with the request source terminal (terminal 10aa) and cuts off the connection with the request source terminal (terminal 10aa).

When the disconnection permission information is received, the request source terminal (terminal 10aa) turns off the power, thereby completing the process (Step S122). In addition, the terminal 10cb and the terminal 10db, similar to the process of Steps S111 to S121 for the terminal 10aa, are withdrawn from the telephone call data session sed, whereby a telephone call between the terminals can be completed.

FIG. 39 is a sequence diagram that illustrates a process of updating the acceptability/unacceptability information. First, the transmission/reception unit 91 of the maintenance system 100, based on a user operation input to the operation input receiving unit 93, generates an update request for updating the acceptability/unacceptability information and transmits the generated update request to the management system 50 (Step S211). Here, the update request includes the relay device ID of the relay device that is an update target for the acceptability/unacceptability information in addition to the acceptability/unacceptability information.

Subsequently, the update unit 64 of the management system 50 updates the acceptability/unacceptability information of the relay device ID included in the update request in the relay device management table (see FIG. 9) with the acceptability/unacceptability information included in the update request (Step S212).

Main Effects of Embodiment

As described above, according to this embodiment, the management system 50 manages communication states of terminals 10 communicating with the other terminals. When the change request information representing a request for changing the communication state is received from the terminal 10, the management system 50 changes the communication state of the terminal that is managed based on the received change request information and the communication states of the managed terminals. In this way, since the management system can acquire the communication states of the terminals, there is an effect of realizing effectively controlling connections between the terminals.

In addition, the management system 50 manages the communication states of the other terminals. When change request information representing a request for changing the communication state is received from the terminal 10, the management system 50 changes the communication states of the other terminals that are managed based on the received change request information and the communication states of the other managed terminals. In this way, since the management system 50 can manage the communication states of the other terminals, there is an effect of realizing effectively controlling connections between the terminals.

In a case where the change request information is determined to be the specific change request information representing a request for changing the communication states of the other terminals, the management system 50 acquires the communication states of the other terminals. In this way, according to the management system 50, there is an effect of realizing starting a telephone call according to the type of the change request information and changing the communication states of both terminals.

The management system 50 includes the state change management DB 5009 that is configured by the state change management table in which the change request information, the before-change state information, and the management information after change are managed to be associated with other. In this way, according to the management system 50, there is an effect of realizing changing the communication states based on the change request information received by the transmission/reception unit 11 and the communication states acquired by the state acquiring unit 53*b*.

In a case where the communication state of the terminal 10 is not a predetermined communication state corresponding to predetermined change request information, the management system 50 does not change the state information of the terminal 10. In addition, in a case where the communication states of the other terminals are not predetermined communication states corresponding to predetermined change request information, the management system 50 does not change the state information of the other terminals. In this way, according to the management system 50, there is an effect of realizing accurately managing the communication state of the terminal 10 and the communication states of the other terminals.

Based on predetermined change request information, the management system 50 transmits predetermined information used for changing the communication state to the terminal 10 and at least one of the other terminals. In this way, according to the management system 50, there is an effect of realizing controlling connections between the terminal 10 and the other terminals.

In the management system 50, a terminal as a request source receives the change request information indicating a request for starting communication with a terminal as a destination, and, in a case where there are a plurality of terminals as destinations, predetermined information indicating a request for starting communication is transmitted to the terminals as a plurality of destinations. In this way, according to the management system 50, there is an effect of realizing controlling a connection with a terminal as a destination using the terminal as a request source in a case where a telephone call is started at a different base.

In addition, in a case where change request information indicating that a terminal as a destination rejects the start of communication with a terminal as a request source is received as the predetermined change request information, the management system 50 determines whether or not the change request information indicating rejection of the start of communication has been received from all the terminals as a plurality of destinations and changes the state information of the terminal as the request source based on a result of the determination. In this way, according to the management system 50, in a case where a terminal as a destination receives change request information indicating rejection of the start of communication with a terminal as the request source, accurate management of the communication state of the terminal as the request source can be realized.

In a case where information that is based on a connection or disconnection between the terminal 10 and the management system is received, the management system 50 changes the state of the managed terminal 10 to a state representing the connection or disconnection. In this way, according to the management system 50, accurate management of the state of the terminal 10 at the time of a connection or disconnection between the terminal 10 and the management system can be realized.

By using the acceptability/unacceptability information included in the relay device management table, the management system 50 can intentionally form a situation in which a relay device is not used for a conference, and accordingly, a maintenance operation for the relay device can be performed. Described in more detail, since each relay device 30 is mirrored, when the acceptability/unacceptability information of one relay device 30 is set to "unacceptable", a new conference cannot be started, and only participation in the middle of an existing conference or end of the conference can be performed. Accordingly, as all the existing conferences end, a situation in which the relay device is not used for a conference can be formed, and thus, a maintenance operation for the relay device can be performed.

Supplements to Embodiment

In the embodiment described above, while a case has been described in which the user using the request source terminal (terminal 10*aa*) selects to start a telephone call with the destination terminals (terminals 10*bb*, 10*cb*, and 10*db*), however, the embodiment is not limited thereto. In such a case, the user using the request source terminal (terminal 10*aa*) may select the own terminal as a destination terminal. In a case where the own terminal is selected as a destination terminal, first, a telephone call data session sed is set up between the request source terminal (terminal 10*aa*) and the relay device 30. Subsequently, the request source terminal (terminal 10*aa*) designates a desired destination terminal, and information indicating a request for notifying this destination terminal of a session ID that is necessary for participation in the telephone data session sed is received (see Step S101), and, by executing the process of requesting participation in a session, a telephone call can be started. In addition, in a case where the request source terminal (terminal 10*aa*) selects the own terminal as the destination terminal, and the change request information "Invite" is transmitted, the management system 50 searches the state change management table (see FIG. 17) by using the terminal information "own terminal selection" as a search key, thereby changing the state of the request source terminal (terminal 10*aa*).

In the embodiment described above, as illustrated in FIG. 22, while the destination list range 1100-1 that is in a state in which the destination name 1100-2 and the like and the icon 1100-3*a* and the like are represented is configured to be displayed, the display is not limited thereto. Thus, only the destination name 1100-2 and the like and the icon 1100-3*a* and the like may be configured to be displayed without displaying the destination list range 1100-1.

In each embodiment described above, the management system 50 and the program providing system 90 may be built using a single computer or may be built using a plurality of computers by dividing the units (functions or means) and arbitrarily assigning the divided units to the computers. In addition, in a case where the program providing system 90 is built using a single computer, a program transmitted by the program providing system 90 may be transmitted with being divided into a plurality of modules or may be transmitted without being divided. Furthermore, in a case where the program providing system 90 is built using a plurality of computers, it may be configured such that the program is divided into a plurality of modules, and the modules are respectively transmitted from the computers.

A terminal program according to this embodiment, a relay device program, a recording medium having a transmission management program stored therein, an HD 204 in which the programs are stored, and the program providing system 90 including the HD 204 are used in a case where the terminal program, the relay device program and the transmission management program are provided as program products for a user or the like inside the country or outside the country.

In the embodiment described above, according to the change quality management table illustrated in FIG. 7 and the quality management table illustrated in FIG. 14, as an example of the quality of an image of image data relayed by the relay device 30, while the resolution of the image of the image data has been focused for the management, the quality of the image is not limited thereto. Thus, the management process may be performed with focusing on the depth of the image quality of the image data, the sampling frequency of the audio of the audio data, the bit length of the audio of the audio data, or the like as another example of the quality.

In the examples illustrated in FIGS. 9, 11, and 13, while the reception date and time is managed, the embodiment is not limited thereto, but at least reception time of the reception date and time may be managed.

In addition, in the embodiment described above, while the IP address of the relay device as illustrated in FIG. 9 and the IP address of the terminal as illustrated in FIG. 11 are managed, the embodiment is not limited thereto. Thus, the FQDN (fully qualified domain name) thereof may be managed as long as it is relay device specifying information used for specifying the relay device 30 on the communication network 2 or terminal specifying information used for specifying the terminal 10 on the communication network 2. In such a case, an IP address corresponding to an FQDN is acquired by a known DNS (domain name system) server. In addition, instead of "the relay device specifying information used for specifying a relay device 30 on the communication network 2", "relay device connection destination information representing a connection destination toward a relay device 30 on the communication network 2" or "relay device destination information representing a destination toward a relay device 30 on the communication network 2" may be represented. Similarly, instead of "the terminal specifying information used for specifying a terminal 10 on the communication network 2", "terminal destination information representing a connection destination toward a terminal 10 on the communication network 2" or "terminal destination information representing a destination toward a terminal 10 on the communication network 2" may be represented.

Figure 40:
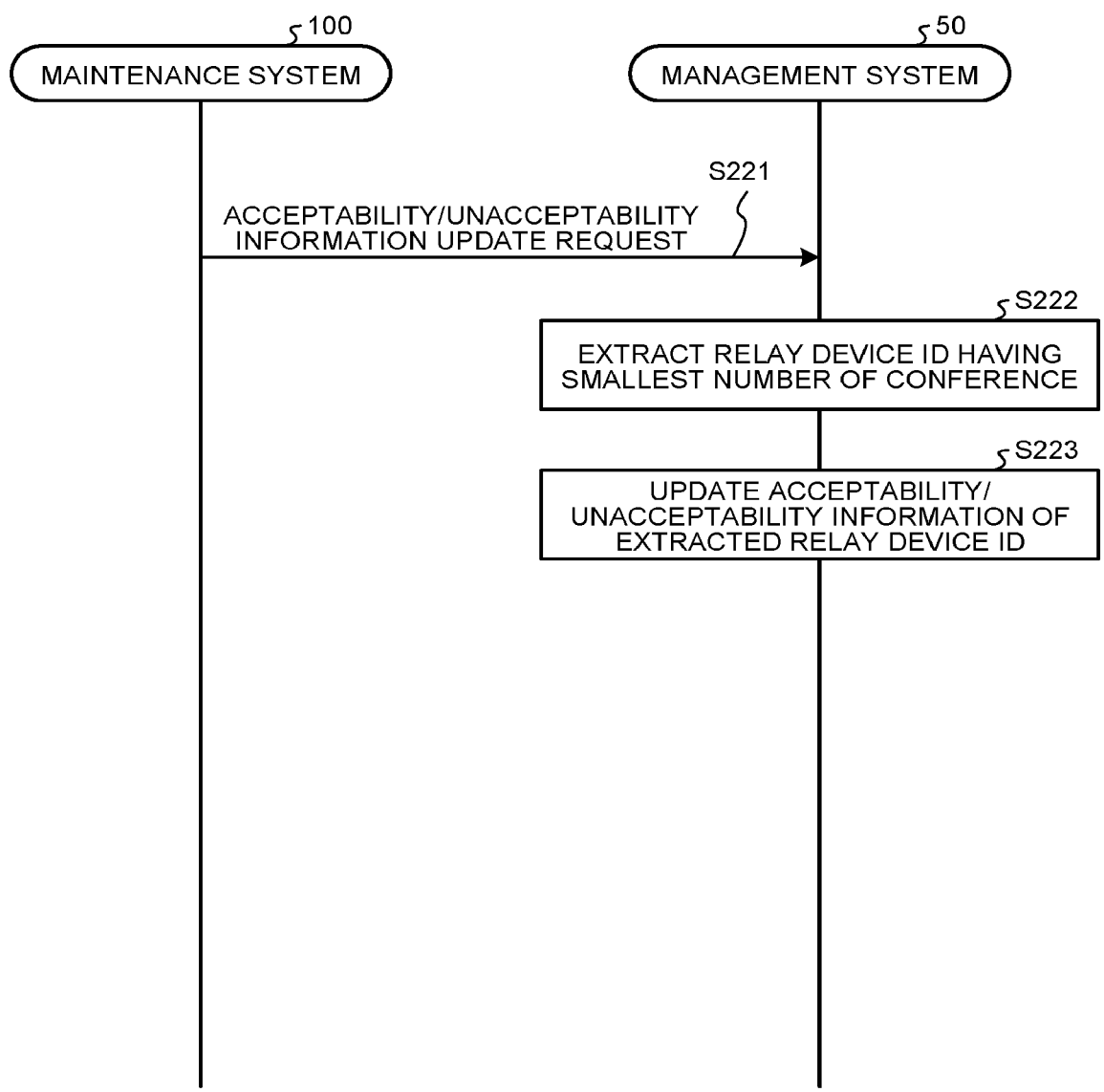
FIG. 40 is a sequence diagram that illustrates an update process for updating acceptability/unacceptability information.

The update process for updating the acceptability/unacceptability information according to the embodiment described above may be configured as illustrated in FIG. 40. FIG. 40 is a sequence diagram that illustrates the update process for updating the acceptability/unacceptability information. First, the transmission/reception unit 91 of the maintenance system 100, based on a user operation input to the operation input receiving unit 93, generates an update request for updating the acceptability/unacceptability information and transmits the update request to the management system 50 (Step S221).

Subsequently, the update unit 64 of the management system 50 calculates the number of sessions that can be accepted by each relay device ID based on the update request by referring to the session management table (see FIG. 13) (Step S222) and updates acceptability/unacceptability information of the relay device ID (for example, a relay device ID having a smallest number of sessions, a relay device ID having a smallest number of sessions among mirrored relay device IDs) according to the calculated number of sessions with the acceptability/unacceptability information included in the update request (Step S223).

In addition, the management system 50 may return the calculated number of sessions of each relay device ID to the maintenance system 100 and performs an update request for acceptability/unacceptability information based on the number of sessions of each relay device ID that is returned by the maintenance system 100.

Figure 41:
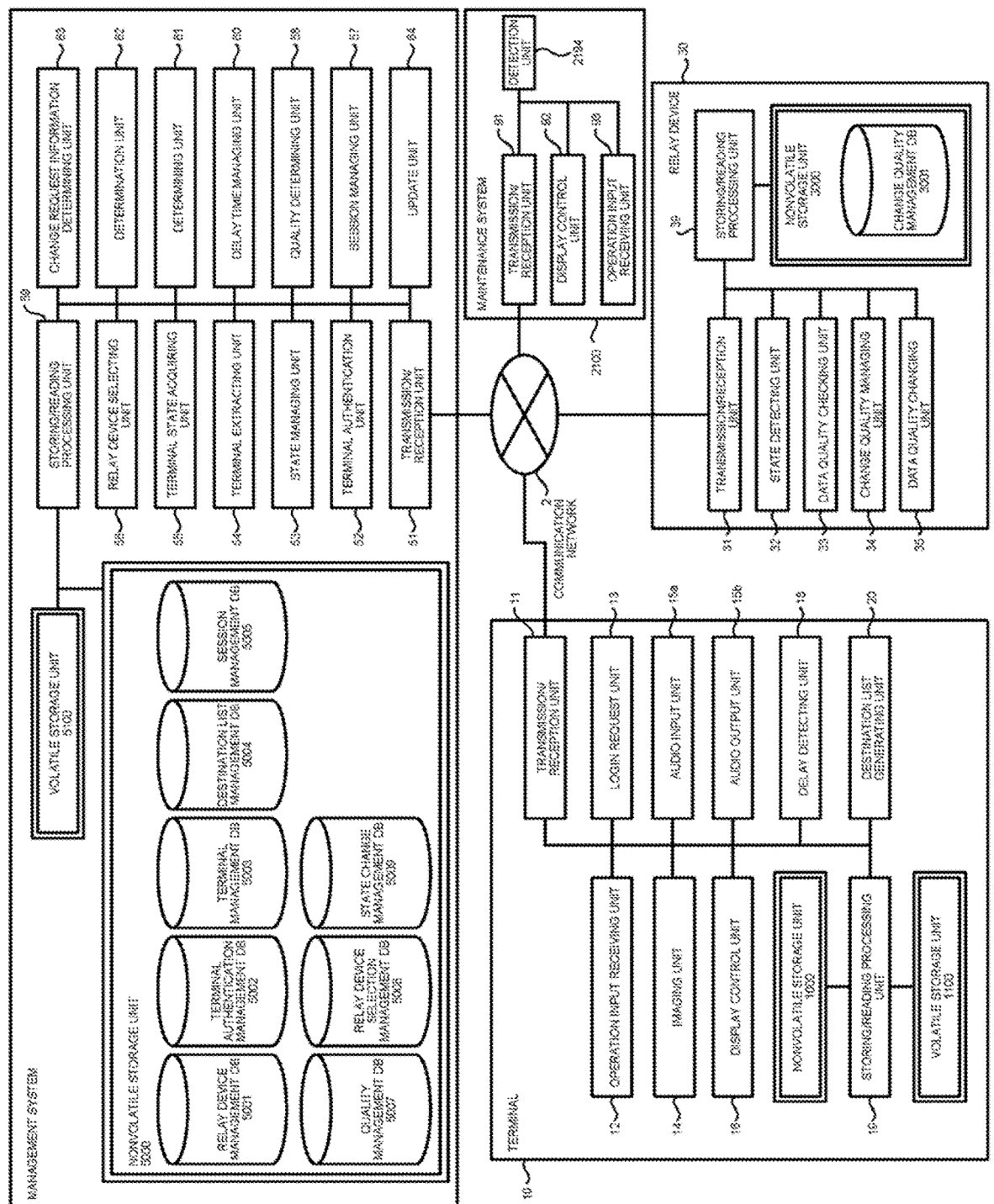
FIG. 41 is a functional block diagram of terminals, devices, and systems configuring a transmission system according to an embodiment.

The maintenance system 100 according to the embodiment described above may be configured as illustrated in FIG. 41. FIG. 41 is a functional block diagram of a maintenance system 2100 according to another embodiment. In the example illustrated in FIG. 41, the maintenance system 2100 includes a detection unit 2194, and the detection unit 2194 detects transmission timing (for example, a time set in advance or the like) of an update request. Then, the transmission/reception unit 91 transmits an update request based on the detection of the transmission timing.

In such a case, the update of the acceptability/unacceptability information in the relay device management table can be automated.

In this embodiment, "television conference" is used as a term that can be replaced by "video conference".

In the embodiment described above, while the case of the television conference system as an example of the transmission system 1 has been described, the embodiment is not limited thereto but may be a telephone system such as an IP (Internet protocol) telephone or an Internet telephone. In addition, the transmission system 1 may be a car navigation system. In such a case, for example, one terminal 10 corresponds to a car navigation device mounted in a vehicle, and the other terminal 10 corresponds to a management terminal, a management server of a management center managing the car navigation or a car navigation device mounted in another vehicle. Furthermore, the transmission system 1 may be an audio conference system or a PC (personal computer) screen sharing system.

In addition, the transmission system 1 may be a communication system of a mobile telephone. In such a case, for example, the terminal 10 corresponds to the mobile telephone. A display example of a destination list of such a case is illustrated in FIG. 35. In other words, the terminal 10 as a mobile telephone includes: a mobile telephone main body 10-1; a menu screen display button 10-2 disposed in the main body 10-1; a display unit 10-3 disposed in the main body 10-1, a microphone 10-4 disposed at a low portion of the main body 10-1; and a speaker 10-5 disposed in the main body 10-1. Among these, the "menu screen display button" 10-2 is a button used for displaying a menu screen on which icons representing various applications are displayed. The display unit 10-3 is configured as a touch panel, and a user can select a destination name so as to have a telephone call with a mobile telephone of the other party.

Furthermore, in the embodiment described above, as an example of the content data, while image data and audio data have been described, the embodiment is not limited thereto but may be touch data. In such a case a user's touch feeling on one terminal side is transmitted to the other terminal side. In addition, the content data may be smell data. In such a case, a smell (scent) of one terminal side is delivered to the other terminal side. Here, the content data may be at least one of the image data, the audio data, the touch data, and the smell data.

In the embodiment described above, while a case has been described in which a television conference is performed by the transmission system 1, the embodiment is not limited thereto. Thus, the transmission system may be used for a meeting, general conversations among family members or friends, or unidirectional presentation of information.

According to an embodiment, it is possible to form a situation in which a relay device is not used for a conference.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A management system, comprising:
a relay device selection memory to store transmission terminal identification information identifying a transmission terminal in association with relay device identification information identifying a relay device that is allowed to be used by the transmission terminal irrespective of a current operation state of the relay device;
a relay device managing memory including a relay device management table that stores the relay device identification information of the relay device in association with acceptability/unacceptability information representing acceptability/unacceptability of a new session using the relay device;
a receiver configured to receive particular transmission terminal identification information identifying a plurality of transmission terminals used for transmitting/receiving content data; and
processing circuitry configured to
determine, for each terminal of the plurality of transmission terminals, a list of all relay devices allowed to be used for the terminal, based on the relay device identification information stored by the relay device selection memory,
determine particular relay device identification information identifying at least one particular relay device that is on each of the determined lists and thus commonly allowed to be used for each terminal of the plurality of transmission terminals, and
select, as a relay device to relay content data, a relay device for which the acceptability/unacceptability information stored by the relay device managing memory represents being acceptable, among the determined particular relay device identification information identifying the at least one particular relay device that is commonly allowed to be used for each of the plurality of transmission terminals,
wherein the selected relay device will accept a new conference start request when the acceptability/unacceptability information of the selected relay device represents being acceptable, and will not accept the new conference start request when the acceptability/unacceptability information represents being unacceptable,
the receiver is further configured to receive an update request including relay device identification information of a certain relay device and acceptability/unacceptability information for the relay device identification information, the update request being transmitted from a maintenance system based on a user operation, and
the processing circuitry is further configured to update the acceptability/unacceptability information corresponding to the relay device identification information included in the update request, among the acceptability/unacceptability information stored by the relay device managing memory, to the acceptability/unacceptability information included in the update request.

2. The management system according to claim 1, wherein the relay device managing memory stores state information, representing an operation state of the relay device, in association with the relay device identification information, and
the processing circuitry is further configured to select the relay device based on the relay device identification information for which the acceptability/unacceptability information stored by the relay device managing memory represents being acceptable, and the state information represents currently performing an operation, among the determined particular relay device identification information.

3. The management system according to claim 1, further comprising a session managing memory to store the relay device identification information of the relay device in association with session identification information identifying a session in which the relay device is used,
wherein, when the update request is received, the processing circuitry is further configured to calculate a number of sessions in which each relay device having the relay device identification information is used, based on the session identification information stored by the session managing memory, and update the acceptability/unacceptability information of the relay device identification information based on the calculated number of sessions.

4. The management system according to claim 1, wherein the acceptability/unacceptability information represents whether handling a new conference is acceptable or unacceptable to the relay device.

5. A transmission system comprising a plurality of relay devices, a management system that manages the plurality of relay devices, and a maintenance system including a transmitter, the transmission system comprising:
a relay device selection managing memory to store transmission terminal identification information identifying a transmission terminal in association with relay device identification information identifying a relay device that is allowed to be used by the transmission terminal irrespective of a current operation state of the relay device;
a relay device managing memory including a relay device management table that stores the relay device identification information of the relay device in association with acceptability/unacceptability information representing acceptability/unacceptability of a new session using the relay device;
a receiver configured to receive particular transmission terminal identification information identifying a plurality of transmission terminals used for transmitting/receiving content data; and
processing circuitry configured to
determine, for each terminal of the plurality of transmission terminals, a list of all relay devices allowed to be used for the terminal, based on the relay device identification information stored by the relay device selection memory,
determine particular relay device identification information identifying at least one particular relay device that is on each of the determined lists and thus commonly allowed to be used for each terminal of the plurality of transmission terminals, and
select, as a relay device to relay the content data, a relay device for which the acceptability/unacceptability information stored by the relay device managing memory represents being acceptable, among the determined particular relay device identification information identifying the at least one particular relay device that is commonly allowed to be used for each of the plurality of transmission terminals, wherein the selected relay device will accept a new conference start request when the acceptability/unacceptability information of the selected relay device represents being acceptable, and will not accept the new conference start request when the acceptability/unacceptability information represents being unacceptable, the receiver is further configured to receive an update request including relay device identification information of a certain relay device and acceptability/unacceptability information for the relay device identification information, the update request being transmitted from a maintenance system based on a user operation, and the processing circuitry is further configured to update the acceptability/unacceptability information corresponding to the relay device identification information included in the update request, among the acceptability/unacceptability information stored by the relay device managing memory, to the acceptability/unacceptability information included in the update request.

6. The transmission system according to claim 5, wherein the relay device managing memory stores state information representing an operation state of the relay device, in association with the relay device identification information, and the processing circuitry is further configured to select the relay device based on the relay device identification information for which the acceptability/unacceptability information stored by the relay device managing memory represents being acceptable and the state information represents currently performing an operation, among the determined particular relay device identification information.

7. The transmission system according to claim 5, further comprising a session managing memory to store the relay device identification information of the relay device in association with session identification information identifying a session in which the relay device is used, wherein, when the update request is received, the processing circuitry is further configured to calculate a number of sessions in which each relay device having the relay device identification information is used, based on the session identification information stored by the session managing memory, and update the acceptability/unacceptability information of the relay device identification information based on the calculated number of sessions.

8. The transmission system according to claim 5, wherein the maintenance system further comprises circuitry configured to detect transmission timing of the update request, and the transmitter is further configured to transmit the update request based on detection of the transmission timing.

9. The transmission system according to claim 5, wherein the acceptability/unacceptability information represents whether handling a new conference is acceptable or unacceptable to the relay device.

10. A management method, comprising:

storing transmission terminal identification information identifying a transmission terminal in association with relay device identification information identifying a relay device that is allowed to be used by the transmission terminal irrespective of a current operation state of the relay device;

storing, in a relay device management table, the relay device identification information of the relay device in association with acceptability/unacceptability information representing acceptability/unacceptability of a new session of the relay device;

receiving particular transmission terminal identification information identifying a plurality of transmission terminals used for transmitting/receiving content data;

determining, for each terminal of the plurality of transmission terminals, a list of all relay devices allowed to be used for the terminal, based on the relay device identification information stored by the relay device selection memory;

determining particular relay device identification information identifying at least one particular relay device that is on each of the determined lists and thus commonly allowed to be used for each terminal of the plurality of transmission terminals;

selecting, as a relay device to relay content data, a relay device for which the acceptability/unacceptability information stored represents being acceptable, among the determined particular relay device identification information identifying the at least one particular relay device that is commonly allowed to be used for each of the plurality of transmission terminals, receiving an update request including relay device identification information of a certain relay device and acceptability/unacceptability information for the relay device identification information, the update request being transmitted based on a user operation; and updating the acceptability/unacceptability information corresponding to the relay device identification information included in the update request, among the stored acceptability/unacceptability information, to the acceptability/unacceptability information included in the update request, wherein the selected relay device will accept a new conference start request when the acceptability/unacceptability information of the selected relay device represents being acceptable, and will not accept the new conference start request when the acceptability/unacceptability information represents being unacceptable.

11. A non-transitory computer-readable recording medium with an executable program stored thereon, wherein the program instructs a computer to perform:

storing transmission terminal identification information identifying a transmission terminal in association with relay device identification information identifying a relay device that is allowed to be used by the transmission terminal irrespective of a current operation state of the relay device;

storing, in a relay device management table, the relay device identification information of the relay device in association with acceptability/unacceptability information representing acceptability/unacceptability of a new session of the relay device;

receiving particular transmission terminal identification information identifying a plurality of transmission terminals used for transmitting/receiving content data;

determining, for each terminal of the plurality of transmission terminals, a list of all relay devices allowed to be used for the terminal, based on the relay device identification information stored by the relay device selection memory;

determining particular relay device identification information identifying at least one particular relay device that is on each of the determined lists and thus commonly allowed to be used for each terminal of the plurality of transmission terminals;

selecting, as a relay device to relay content data, a relay device for which the acceptability/unacceptability information stored represents being acceptable, among the determined particular relay device identification information identifying the at least one particular relay device that is commonly allowed to be used for each of the plurality of transmission terminals, receiving an update request including relay device identification information of a certain relay device and acceptability/unacceptability information for the relay device identification information, the update request being transmitted based on a user operation; and updating the acceptability/unacceptability information corresponding to the relay device identification information included in the update request, among the stored acceptability/unacceptability information, to the acceptability/unacceptability information included in the update request, wherein the selected relay device will accept a new conference start request when the acceptability/unacceptability information of the selected relay device represents being acceptable, and will not accept the new conference start request when the acceptability/unacceptability information represents being unacceptable.

* * * * *